United States Patent
Franke

(10) Patent No.: US 9,943,980 B2
(45) Date of Patent: Apr. 17, 2018

(54) MULTI ZONE CEMENTITIOUS PRODUCT AND METHOD

(71) Applicant: David M. Franke, Kenosha, WI (US)

(72) Inventor: David M. Franke, Kenosha, WI (US)

(73) Assignee: Four Points Developments LLC, Neenah, WI (US)

( * ) Notice: Subject to any disclaimer, the term of this patent is extended or adjusted under 35 U.S.C. 154(b) by 427 days.

(21) Appl. No.: 14/577,835

(22) Filed: Dec. 19, 2014

(65) Prior Publication Data

US 2015/0115492 A1  Apr. 30, 2015

Related U.S. Application Data

(63) Continuation-in-part of application No. 13/843,598, filed on Mar. 15, 2013.

(51) Int. Cl.

| | |
|---|---|
| *B28B 3/02* | (2006.01) |
| *B28B 1/00* | (2006.01) |
| *B28B 3/12* | (2006.01) |
| *B28B 7/18* | (2006.01) |
| *B28B 7/28* | (2006.01) |
| *B28B 13/02* | (2006.01) |
| *B28B 19/00* | (2006.01) |
| *C04B 28/02* | (2006.01) |
| *C04B 111/00* | (2006.01) |

(52) U.S. Cl.
CPC .............. *B28B 1/008* (2013.01); *B28B 3/123* (2013.01); *B28B 7/183* (2013.01); *B28B 7/28* (2013.01); *B28B 13/023* (2013.01); *B28B 13/0225* (2013.01); *B28B 19/0015* (2013.01); *C04B 28/02* (2013.01); *C04B 2111/00612* (2013.01); *Y10T 428/24322* (2015.01); *Y10T 428/24355* (2015.01)

(58) Field of Classification Search
CPC .... B28B 1/008; B28B 13/0225; B28B 13/023
See application file for complete search history.

(56) References Cited

U.S. PATENT DOCUMENTS

| | | |
|---|---|---|
| 461,890 A | 10/1891 | Richardson |
| 1,049,410 A | 1/1913 | Sharples |
| 1,541,165 A | 6/1925 | Minache |
| 1,570,817 A | 1/1926 | Zottoli |
| 1,578,091 A | 3/1926 | Perkins et al. |
| 1,666,232 A | 4/1928 | Hollis |
| 1,794,572 A | 3/1931 | Wyatt |
| 1,900,833 A | 3/1933 | Maul et al. |
| 2,601,532 A | 6/1952 | Knighton |
| 3,286,418 A | 11/1966 | Radford |

(Continued)

*Primary Examiner* — James Sanders
(74) *Attorney, Agent, or Firm* — Andrew C. Landsman; Godfrey & Kahn, S.C.

(57) ABSTRACT

A multi-zone cementitious product, which includes a base zone made of a first cementitious material composition and forming a portion of the product. At least one facing zone is adjacent to and bonded to the base zone, the facing zone made of a second cementitious material composition and forming at least one exterior face of said product which is visible when the product is installed. A disrupted boundary layer is between the facing zone and the base zone, and includes material from both the facing zone and the base zone. The disrupted boundary layer bonds the facing zone to the base zone. The facing zone has a thickness sufficient to prevent the base zone from being visible when the product is installed.

12 Claims, 63 Drawing Sheets

(56) References Cited

U.S. PATENT DOCUMENTS

| | | |
|---|---|---|
| 3,955,907 A | 5/1976 | Yamasita et al. |
| 4,058,406 A | 11/1977 | Raponi |
| 4,357,289 A | 11/1982 | Jakobsson |
| 4,427,818 A | 1/1984 | Prusinski |
| 4,465,719 A | 8/1984 | Grice |
| 4,518,431 A | 5/1985 | Duvier, Jr. |
| 4,774,045 A | 9/1988 | Kushida et al. |
| 4,780,433 A | 10/1988 | Keller, Jr. |
| 4,789,319 A | 12/1988 | Garcia |
| 5,002,620 A | 3/1991 | King |
| 5,051,023 A | 9/1991 | Yoshida et al. |
| 5,062,610 A | 11/1991 | Woolford et al. |
| 5,211,895 A | 5/1993 | Jacklich, Sr. |
| 5,358,760 A | 10/1994 | Furlong et al. |
| 5,367,007 A | 11/1994 | Richards |
| 5,624,510 A | 4/1997 | Uchida |
| 5,797,238 A | 8/1998 | Berntsson et al. |
| 6,017,595 A | 1/2000 | Brenot et al. |
| 6,062,772 A | 5/2000 | Perkins |
| 6,068,803 A | 5/2000 | Weyand et al. |
| 6,183,168 B1 | 2/2001 | Woolford et al. |
| 6,213,754 B1 | 4/2001 | Doty et al. |
| 6,382,947 B1 | 5/2002 | Bryant |
| 6,616,874 B1 | 9/2003 | Lazar |
| 6,790,544 B2 | 9/2004 | Schmitz |
| 6,886,304 B1 | 5/2005 | Godi et al. |
| 7,666,340 B2 | 2/2010 | Everett et al. |
| 2003/0172849 A1 | 9/2003 | Collier |
| 2005/0046084 A1 | 3/2005 | Krause |
| 2007/0216058 A1 | 9/2007 | Carreras-Moldonado et al. |
| 2011/0304072 A1 | 12/2011 | Scurto et al. |
| 2012/0195696 A1 | 8/2012 | Matys et al. |

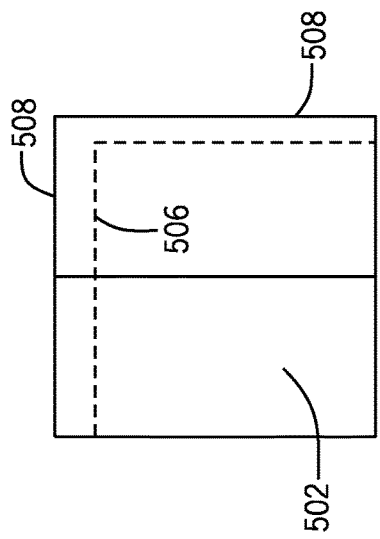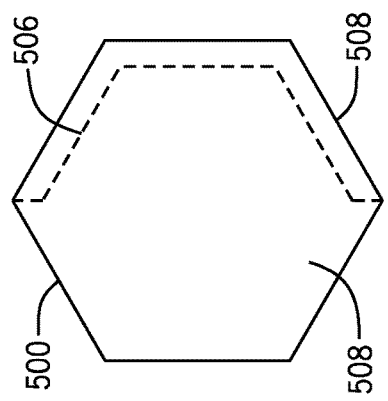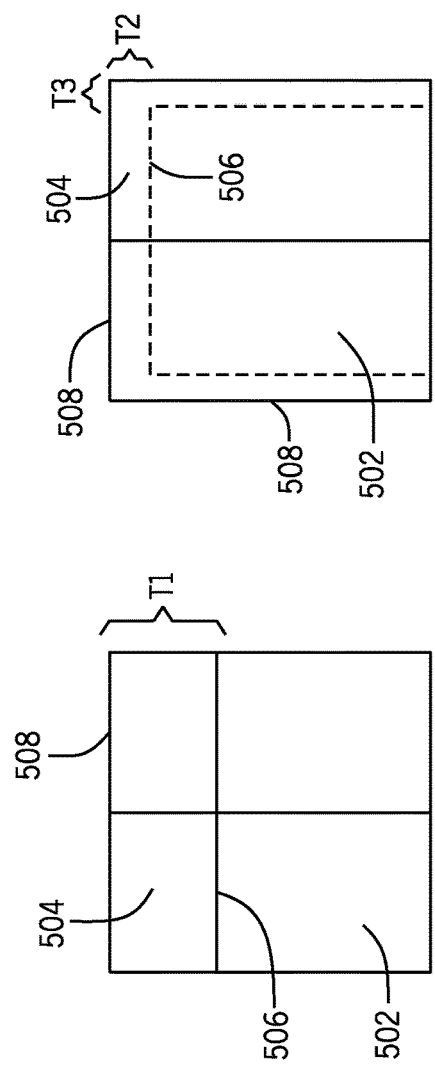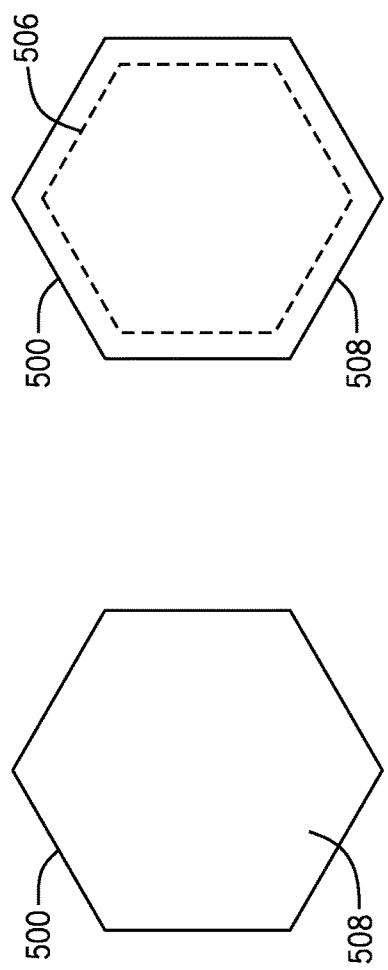

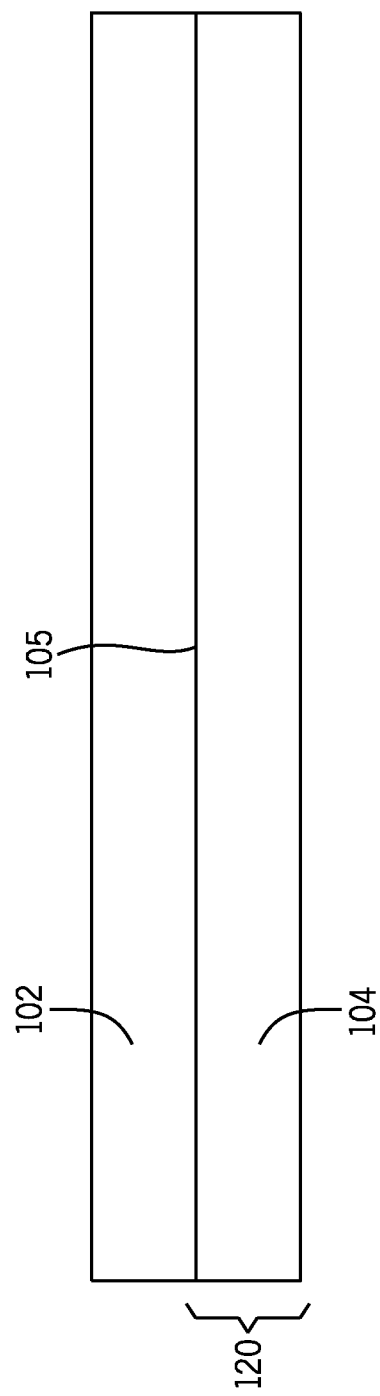
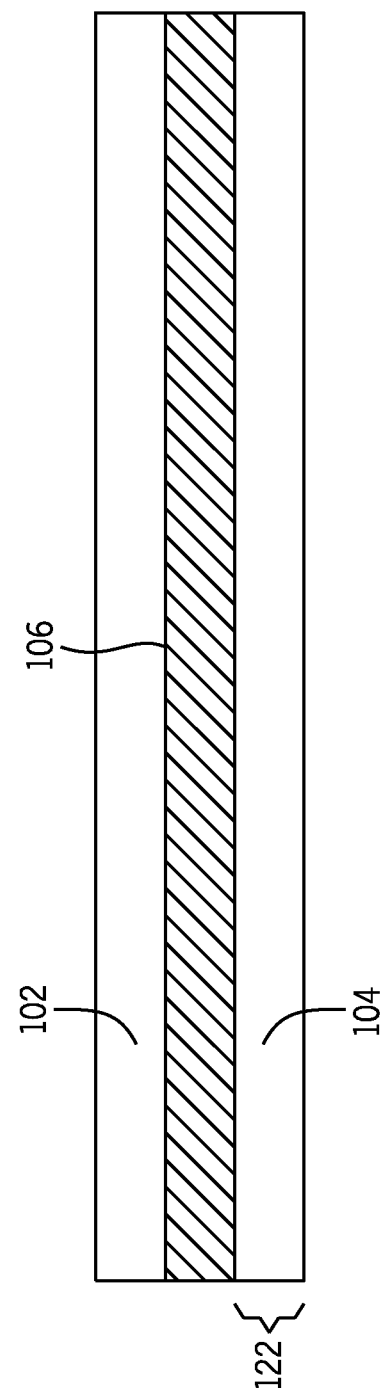

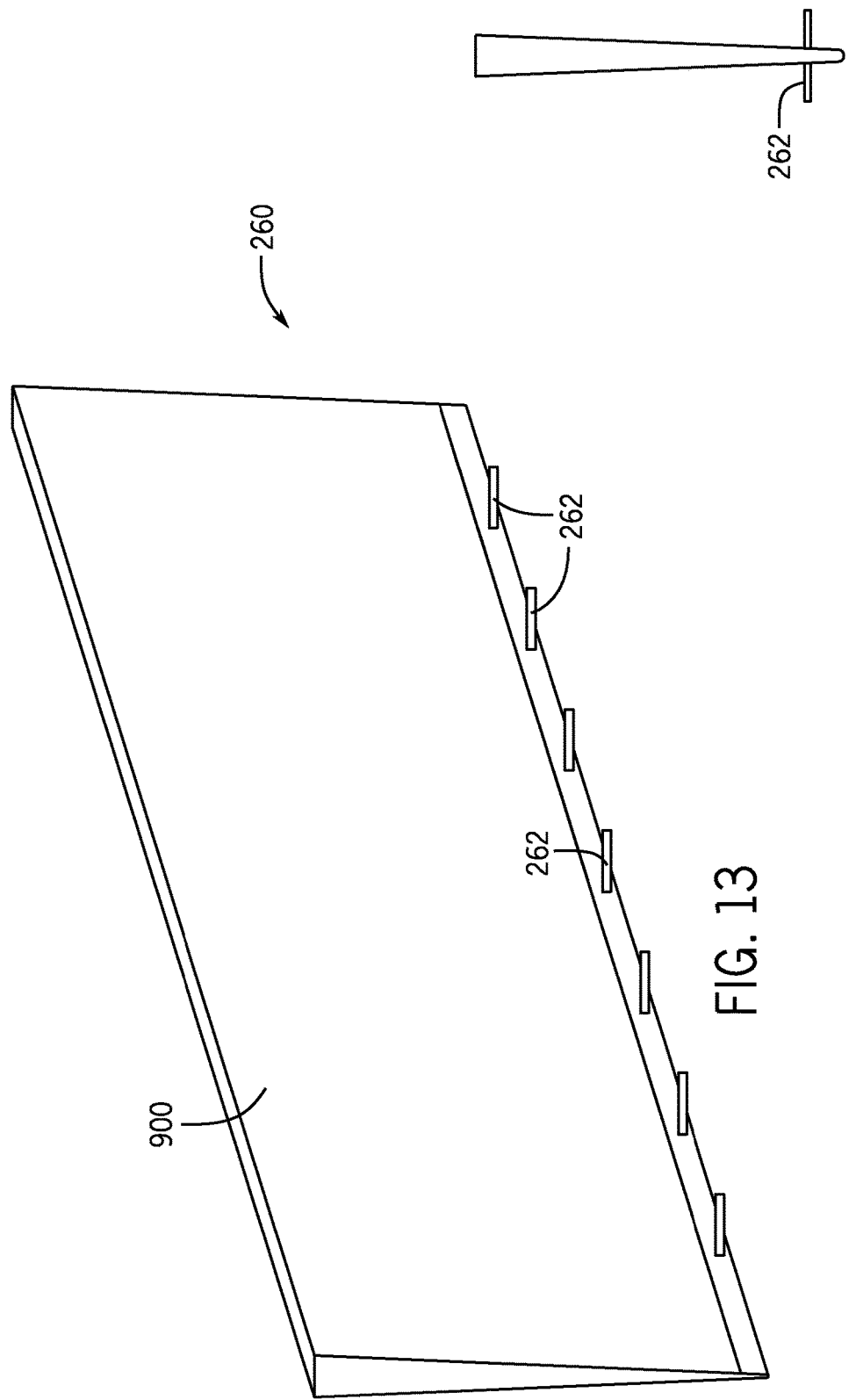

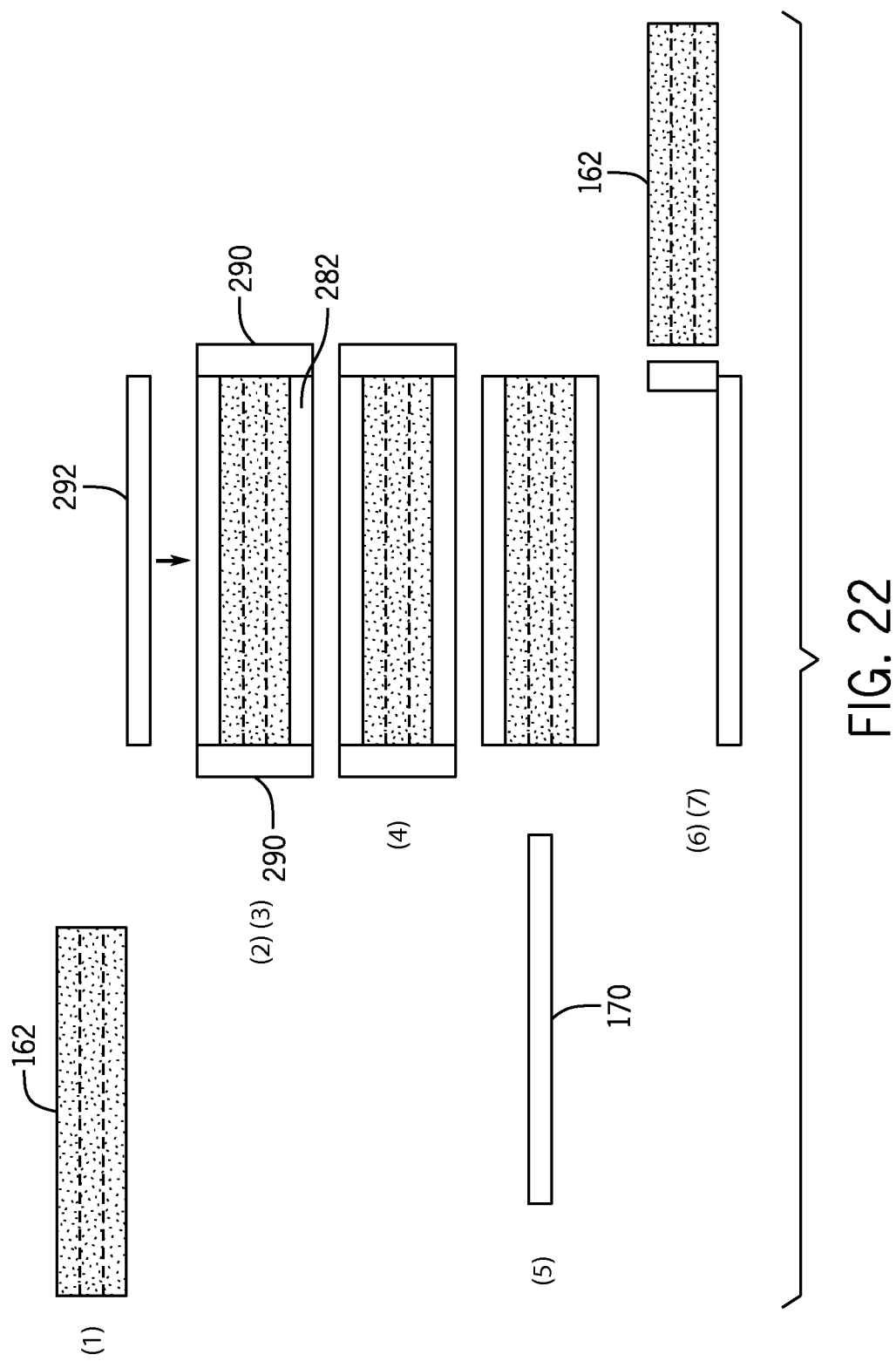

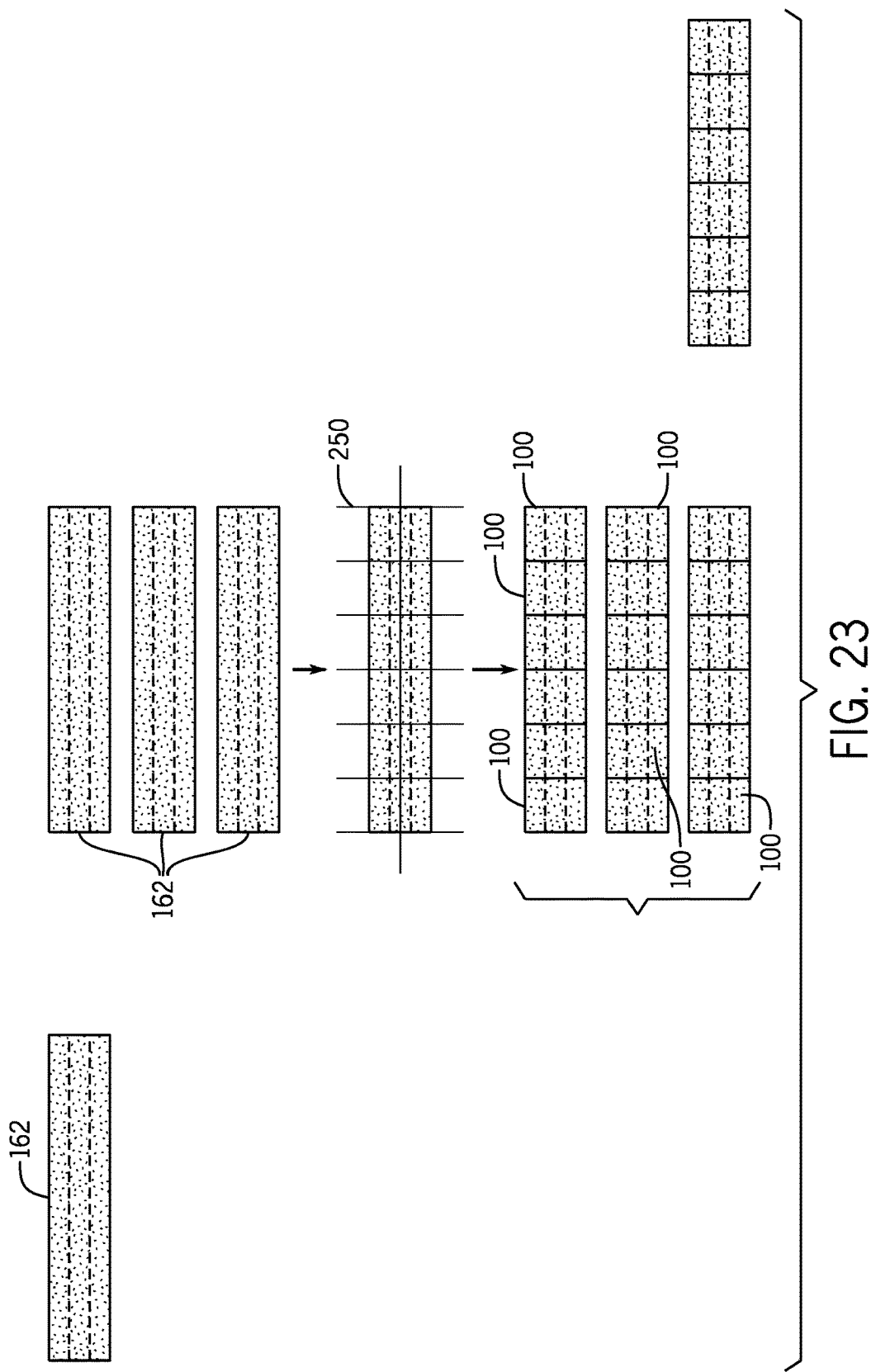

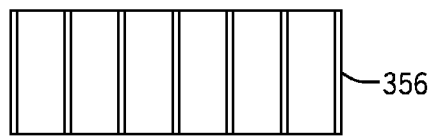
FIG. 27A1
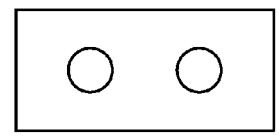
FIG. 27B1
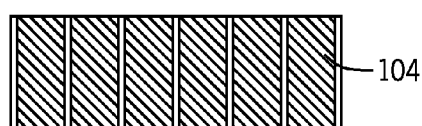
FIG. 27A2
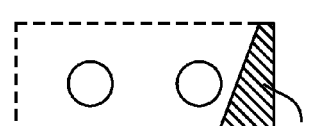
FIG. 27B2
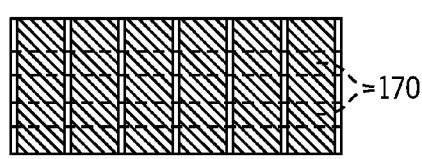
FIG. 27A3
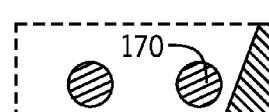
FIG. 27B3
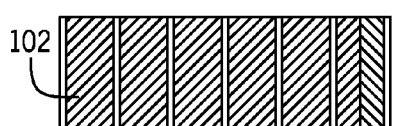
FIG. 27A4
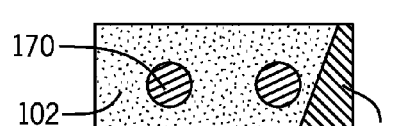
FIG. 27B4
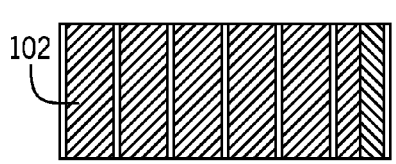
FIG. 27A5
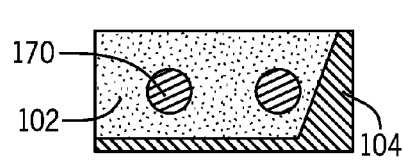
FIG. 27B5
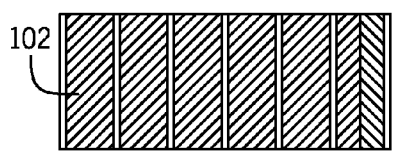
FIG. 27A6
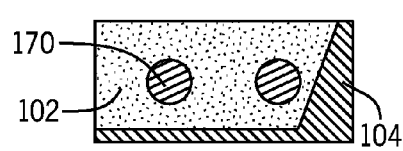
FIG. 27B6
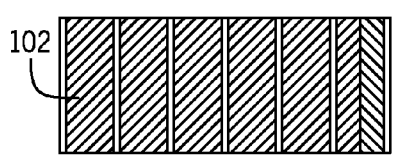
FIG. 27A7
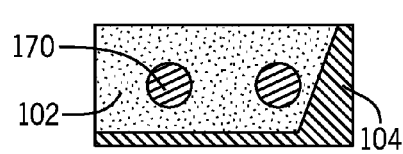
FIG. 27B7

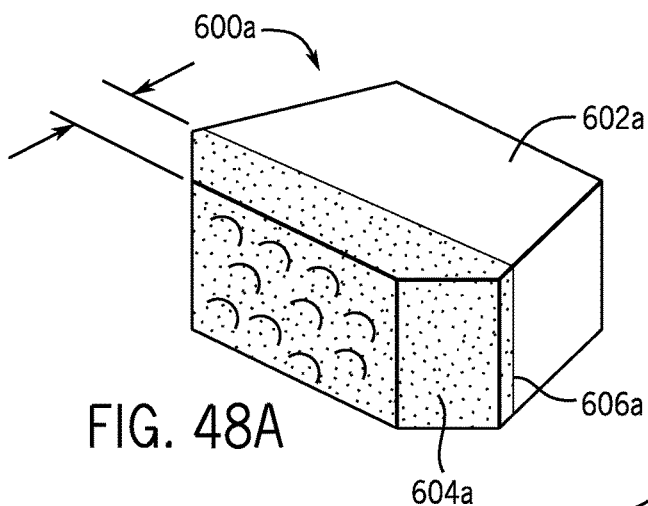
FIG. 48A
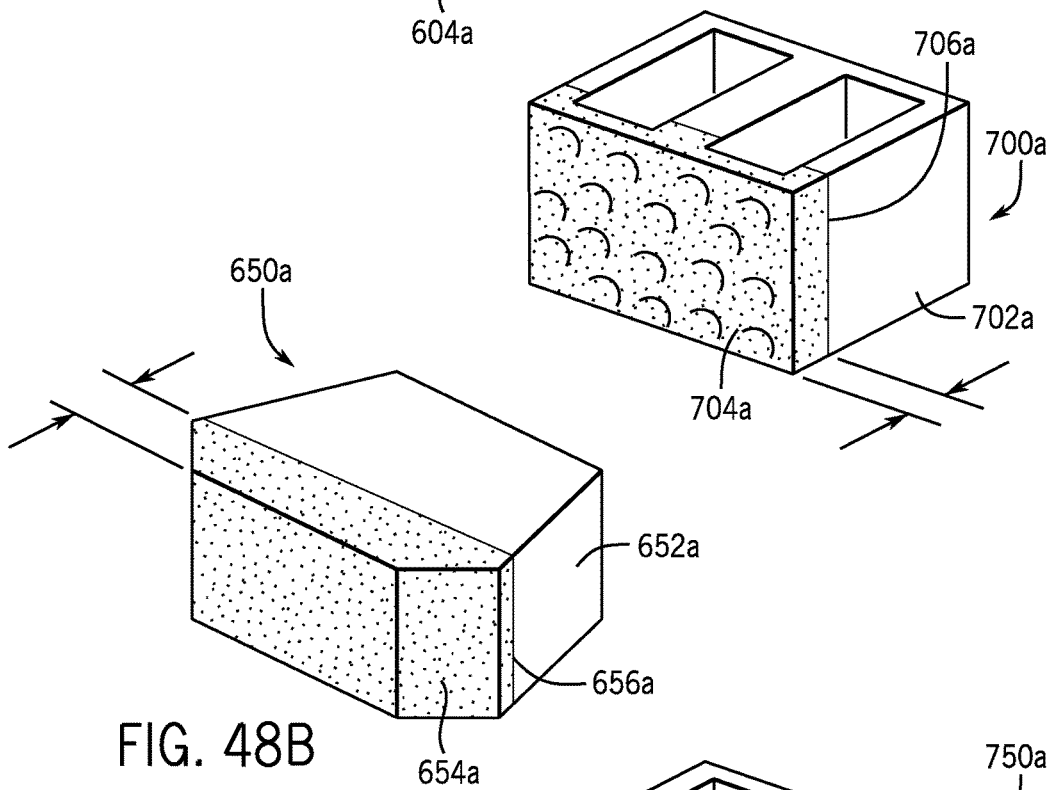
FIG. 48C
FIG. 48B
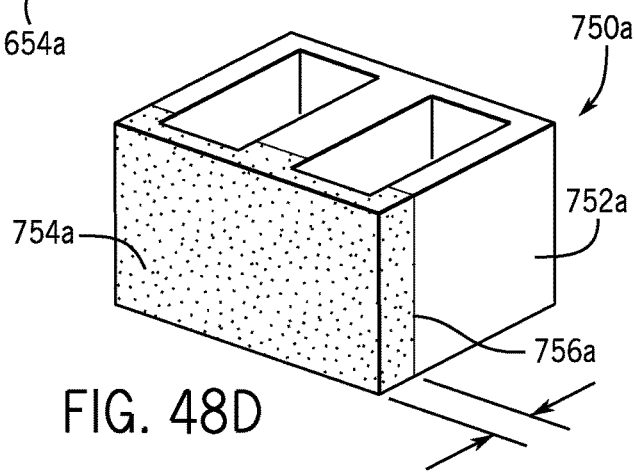
FIG. 48D

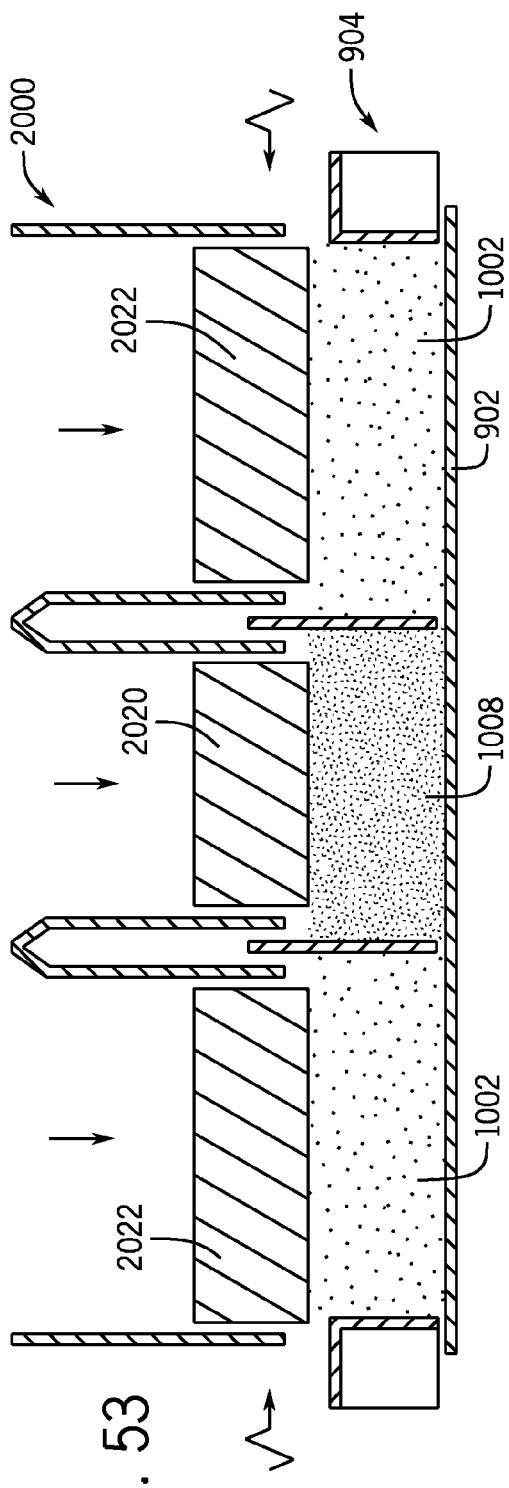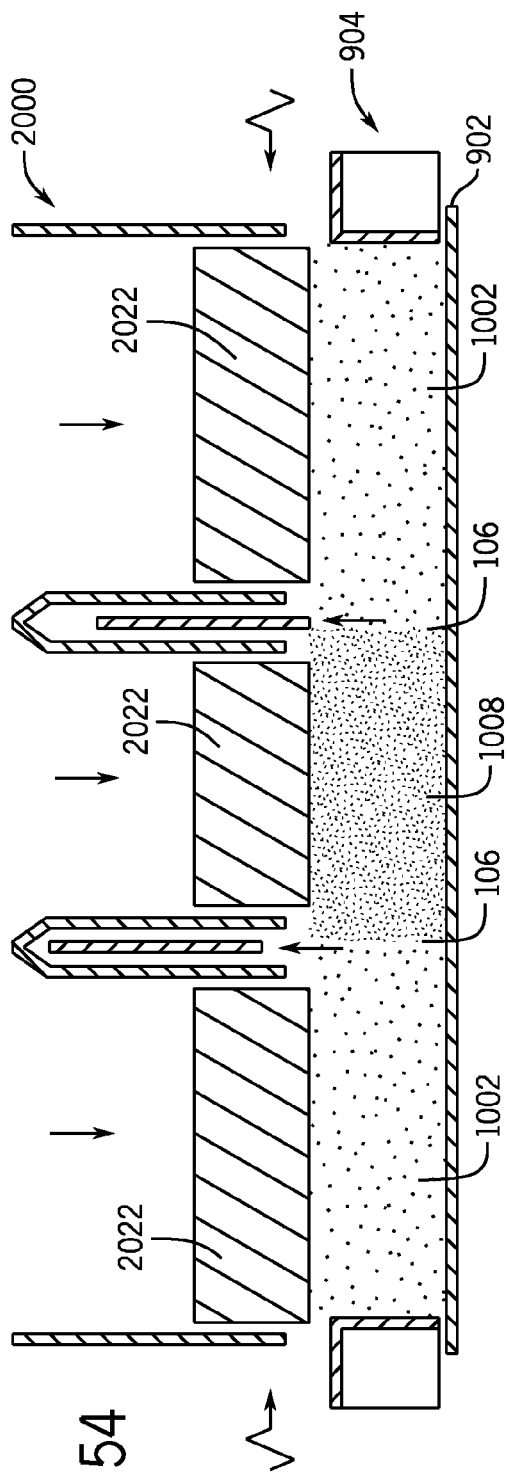

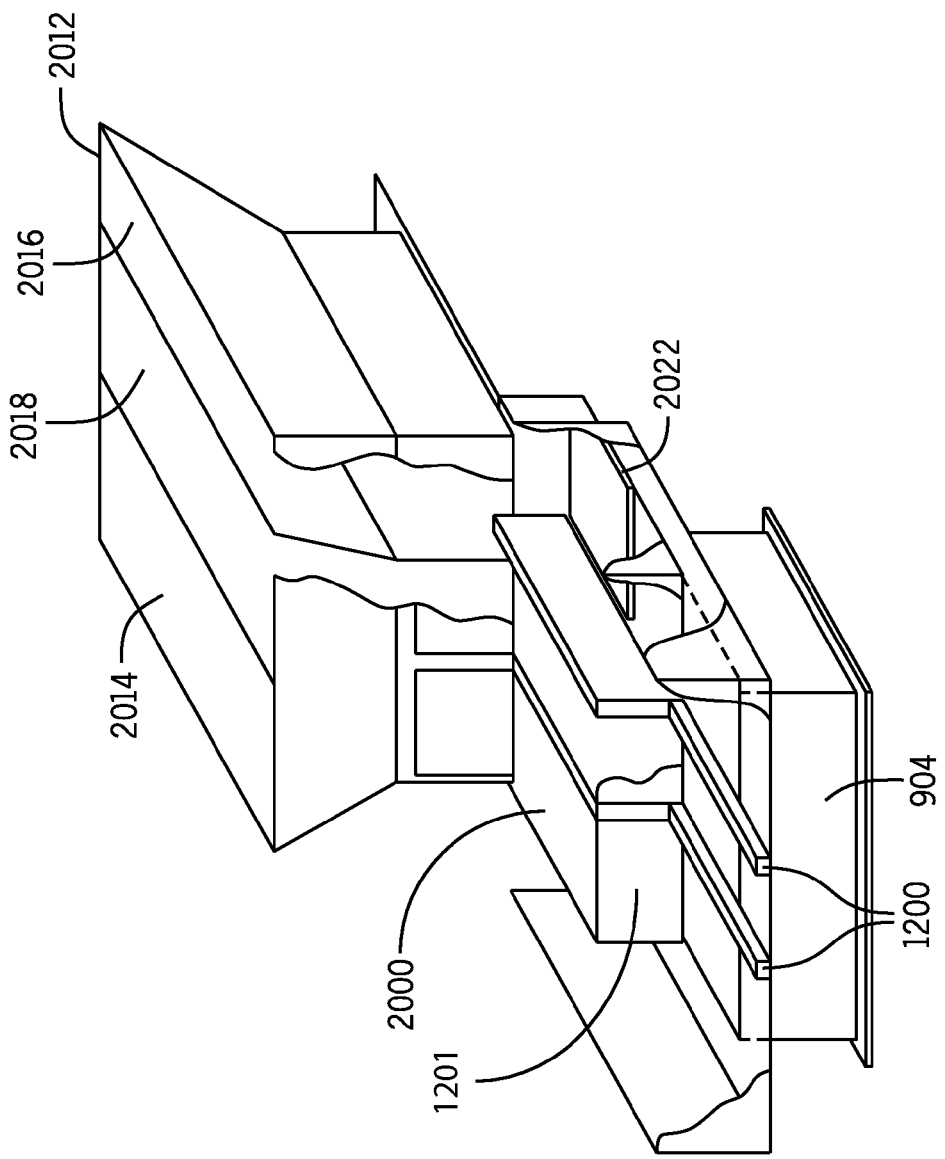

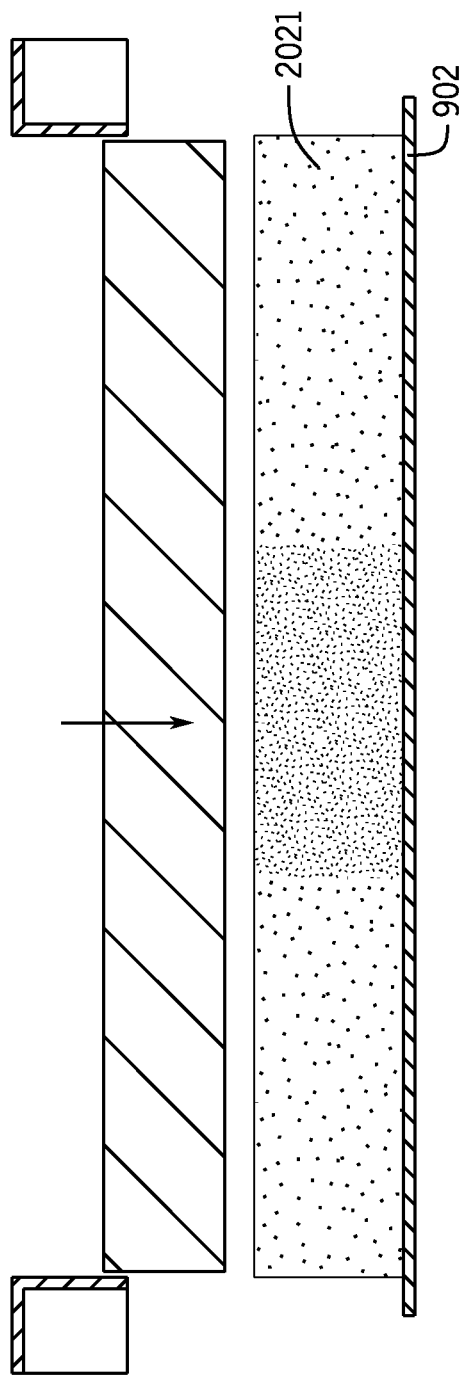

MULTI ZONE CEMENTITIOUS PRODUCT AND METHOD

CROSS REFERENCE TO RELATED APPLICATION

This application is a continuation-in-part of U.S. patent application Ser. No. 13/843,598, filed Mar. 15, 2013. All of the information in that application is hereby incorporated herein by reference in its entirety.

FIELD OF THE INVENTION

The present invention relates generally to the field of cementitious products. More particularly, the present invention relates to a multi-zone cementitious product having a plurality of zones, each zone having a different material composition and methods for producing it.

BACKGROUND

Cementitious products are used throughout the world in buildings, roads, and infrastructures in both structural and non-structural uses. Typical cementitious materials used in producing cementitious products include but are not limited to mixtures of cement, fly ash, water, sand, gravel, and/or rock. Of course, other components including plasticizers, water proofing agents, cross linking agents, dyes, colorants, pigments, etc. may also be added to the cementitious material depending upon the desired physical characteristics. Two basic categories of cementitious product production are used and are the "wet cast" and "dry cast" methods.

The wet cast method uses a fluid mixture of cementitious materials that is poured in place such as a road or driveway, poured into a form such as a bridge support or reinforced building support, or poured into a mold to produce artwork. Wet cast cementitious material is characterized by a medium to high slump; or water to cement ratios greater than approximately 0.35. Typically, a wet cast product is separated from its form or mold only after cementitious curing.

The dry cast method uses a viscous mixture of cementitious materials that is typically formed in molds or extruded under material densification techniques involving vibration, vacuum, and/or significant forming force. Most high volume cementitious building products such as brick, paver, block, retaining wall block, tile, etc. are manufactured using a dry cast method. Dry cast cementitious material is characterized by a negative slump, zero slump, or low slump; or water to cement ratios less than approximately 0.35. Typically, a dry cast product is separated from its form or mold after the forming process and cures in a separate location which in turn enables mass production of dry cast products without the material costs associated with having a mold that is used throughout the curing process.

Cementitious mixtures and resulting products may vary from lower cost—utilitarian products to higher cost—market preferred or aesthetic products. Typical cementitious products are the same material throughout, even though only a small portion of the products will be visible when they are finally installed. For example, facing bricks used in home construction may only have one or two sides visible after installation, but the entire brick is made of the relatively high cost material. There is a need, therefore to have a product wherein only the visible faces are made of the higher cost material, with lower cost material on the inside, or non-visible portions, of the product.

So called "composite" products are known in the art. Typical composite products either join a less expensive base material to a more expensive market preferred facing material by bonding cured base and cured facing components in a secondary operation or involve some composite products formed with base and/or facing materials using a high percentage of expensive resins, epoxies, or other non-cementitious binding materials. Thus, there is a need for an affordable—market preferred or aesthetic composite cementitious based product that does not use non-cementitious binders to hold the disparate materials together.

SUMMARY

The present invention relates to a machine for molding a multi-zone cementitious product, which includes a hopper having a plurality of hopper sections, each section being at least partially filled with cementitious material. The machine also includes a mold having at least one mold cavity and a feed carriage having a plurality of feed carriage cavities corresponding to the hopper sections, wherein the feed carriage is selectively aligned with the hopper and the mold. The feed carriage also includes at least one mold zone separator that is extended into the mold cavity to guide material from the feed carriage to particular locations within the mold cavity as material is transferred from the feed carriage into the mold cavity, and retracts back into the feed carriage once filling of the mold cavity is complete. The machine finally includes at least one compression ram and at least one vibrator that densifies the material within the mold cavity.

The present invention also relates to a method of using a mold machine to form multi-zone cementitious products including the steps of preparing first and second cementitious materials, providing a molding machine including a mold with at least one mold cavity, a hopper having at least a first and second hopper cavity, and a feed carriage having at least a first and second feed carriage cavity. Next, the feed carriage is aligned to the hopper so that first and second hopper cavities align with a first and second feed carriage cavity. Next, the first hopper cavity is filled with the first cementitious material, and the second hopper cavity is filled with the second cementitious material. The first and second cementitious materials are then transferred from the hopper into the feed cavities of the feed carriage. A transfer plate is inserted under the mold, and the feed carriage moves over the mold. Once the feed carriage is positioned over the mold, at least one zone separator is inserted into the mold cavity. Next, the first and second materials are deposited into the mold cavity, with the materials separated by the at least one zone separator. The zone separator is then removed from the mold cavity before the feed carriage returns to its position under the hopper. Next, a forming force is applied, with or without vibration, to the mold to form an uncured multi-zone cementitious product. Finally, the uncured multi-zone cementitious product is ejected from the mold onto the transfer plate, and the multi-zone cementitious product is sent for curing.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the

BRIEF DESCRIPTION OF THE DRAWINGS

FIGS. 7A-7C are front views of additional embodiments of a multi-zone cementitious product in accordance with the invention;

FIGS. 7D-7F are top views of the multi-zone cementitious products of FIGS. 7A-7C respectively;

FIGS. 10A-10B are side detail views of the multi-zone cementitious product of FIG. 1 showing a boundary before and after boundary disruption;

FIG. 13 is a perspective view of a zone separator in accordance with the invention;

FIG. 13A is a side view of the zone separator shown in FIG. 13;

FIG. 22 is a top schematic view of a vertical coining chamber in accordance with the invention;

FIG. 23 is a top schematic view of a multi-form slab cutter in accordance with the invention;

FIGS. 27A1-27A7 are top views of a multi-form process showing another method of making multi-zone cementitious product in accordance with the invention;

FIGS. 27B1-27B7 are front views of the multi-form process of FIGS. 27A1-27A7;

FIGS. 48A-D are perspective views of various embodiments of multi-zone split retaining wall blocks in accordance with the invention;

FIG. 53 is another schematic view of the retro-fitted typical mold machine of FIG. 49 showing mold zone separators in the extended position;

FIG. 54 is another schematic view of the retro-fitted typical mold machine of FIG. 49 showing mold zone separators in the retracted position;

FIG. 55 is a schematic view of the retro-fitted typical mold machine of FIG. 49 showing mold bars that prevent intermingling of overflow materials as the feed carriage returns to a position under the hopper;

FIG. 57 is another schematic view of the retro-fitted typical mold machine of FIG. 49 showing the multi-zone cementitious product being ejected from the mold;

DETAILED DESCRIPTION

Figure 1:
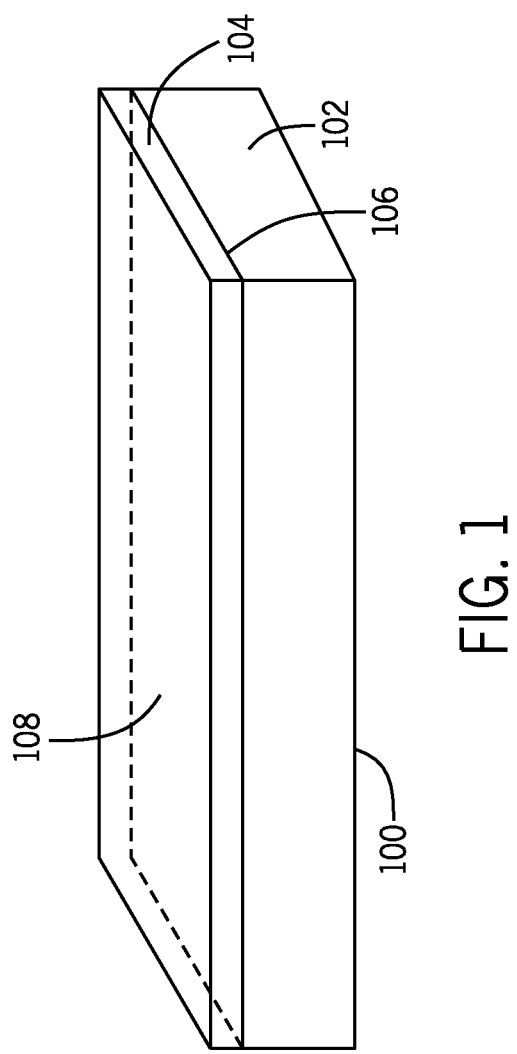
FIG. 1 is a perspective view of one embodiment of a multi-zone cementitious product in accordance with the invention.

FIGS. 1-4 show similar embodiments of a multi-zone cementitious product 100 in accordance with the invention. The multi-zone cementitious product 100 includes a plurality of material volume zones, each zone having a different material composition. The embodiments shown in FIGS. 1-4 are multi-zone cementitious products 100 having a base zone 102 and at least one facing zone 104.

The multi-zone cementitious product 100 would typically be used to provide preferred marketplace aesthetics or product characteristics with decreased material cost. Decreased material cost is achieved by having the preferred marketplace aesthetics or preferred product characteristics only in zones that are potentially visible when the multi-zone cementitious product 100 is installed rather than having a product made entirely of material having the preferred marketplace aesthetics and/or product characteristics.

Base zone 102 may be made of a lower cost, non-facing cementitious material having less preferred marketplace aesthetics while maintaining acceptable product characteristics and meeting performance standards. Facing zone 104, however, may be made of higher cost cementitious material with material added to the mixture to create a desired aesthetic effect or product characteristics. For example, the base zone 102 may include less expensive cementitious types or lower levels of more expensive cementitious types, less expensive or coarser aggregate types or lower levels or more expensive or finer aggregate types, less expensive color pigment types or lower levels of pigments, less expensive additive types or lower levels of expensive additives, or different water levels, and may further include other material. The facing zone 104, on the other hand, may include more expensive cementitious types or higher levels of more expensive cementitious types, more expensive or finer aggregate types or higher levels of finer aggregate types, more expensive color pigment types or higher levels of color pigments, more expensive additive types or higher levels of expensive additives, and different water levels, and may further include other differing material types or levels of those materials. Any cementitious product including zones of different material composition may be used without departing from the invention.

As shown, the multi-zone cementitious product 100 may be formed by any suitable wet cast or dry cast technique such as multi-forming, molding, or extrusion. During the formation process, each technique includes certain common steps that enable the creation of a multi-zone cementitious product 100 in accordance with the invention. Such steps include mixing more than one cementitious material composition, layering or segmenting the cementitious materials to create more than one zone of material, and vibrating and/or vacuum (densification), forming force (densification), and curing the cementitious product.

During formation of the multi-zone cementitious product 100, a boundary zone 106 forms between the base zone 102 and each of the facing zones 104. The boundary zone 106 is a cementitious material transition and forms a bonding layer between the base zone 102 and facing zone 104. In order to sufficiently bond the base zone 102 to the facing zones 104 without the addition of bonding agents such as polymer or adhesive, the boundary zone 106 must be disrupted, meaning the material in the base zone 102 is intermingled with the material in the facing zones 104. This disrupted boundary layer 106 enhances the bond between the base zone 102 and the facing zones 104. Such enhancement is necessary to ensure that the bond between the base zone 102 and facing zone 104 is strong.

FIG. 1 shows one embodiment of a multi-zone cementitious product 100 in accordance with the invention. The embodiment shown in FIG. 1 has a base zone 102 with a facing zone 104 deposited on one side, the top in FIG. 1, of the base zone. The boundary zone 106 forms between the base zone 102 and the facing zone 104. The facing zone 104 has a facing side 108 that forms an exterior surface of the facing zone and is preferably an exterior surface visible after product installation. The product 100 could be a masonry brick, or it could be a cementitious slab 100 which in use could be horizontally oriented such as a cementitious floor, or vertically oriented such as a cementitious wall.

Figure 2:
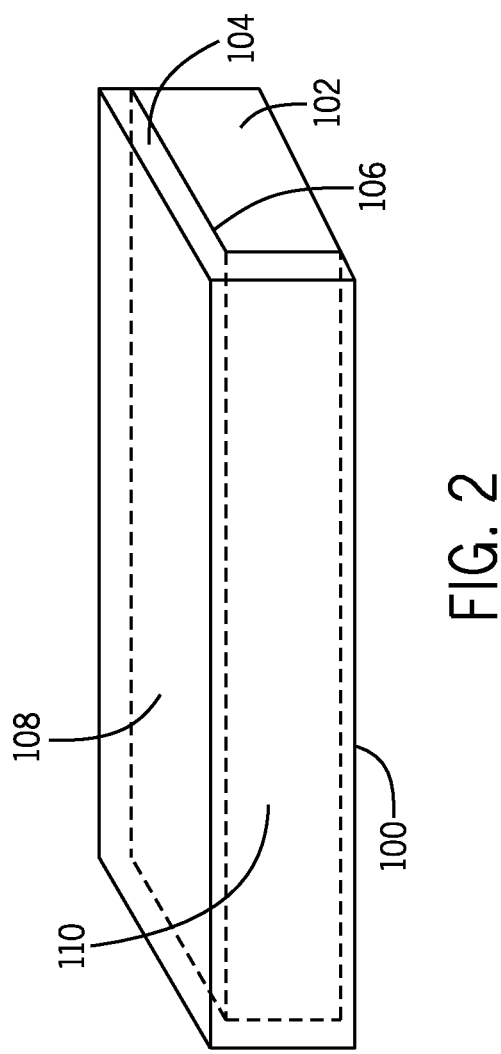
FIG. 2 is perspective view of another embodiment of a multi-zone cementitious product in accordance with the invention.
Figure 3:
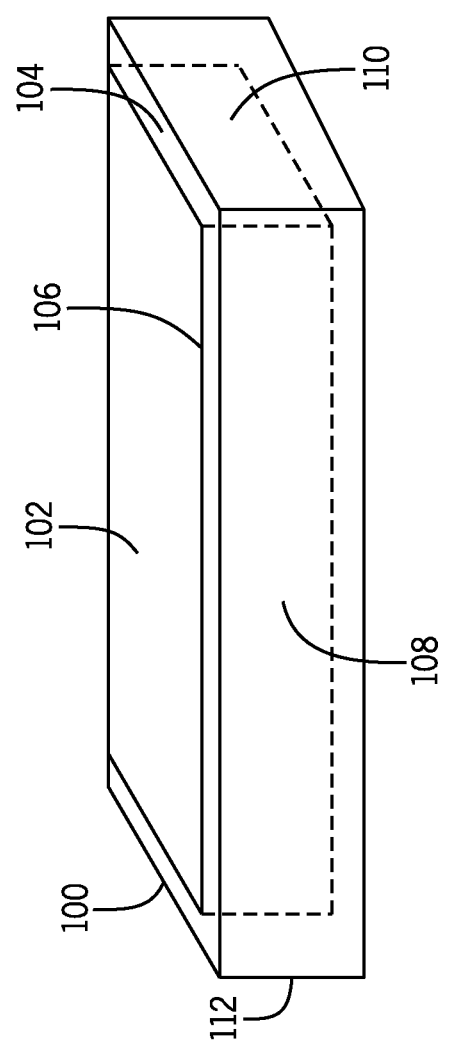
FIG. 3 is perspective view of another embodiment of a multi-zone cementitious product in accordance with the invention.

The embodiment shown in FIG. 2 has a facing zone 104 that wraps around two sides of the base zone 102 resulting in two adjacent facing sides 108, 110. In the embodiment shown, the two adjacent facing sides 108, 110 are the top and front of the multi-zone cementitious product 100, but the adjacent facing sides could be on any two adjacent sides without departing from the invention. FIG. 3 shows an embodiment having three adjacent facing sides 108, 110, 112. Additionally, embodiments having more or less adjacent facing sides or partial facing sides may be formed without departing from the invention.

Alternative embodiments of the present invention may include but are not limited to other cementitious products such as concrete block, pavers, retaining wall block, tile, roofing products, and other cementitious building products. Examples showing some alternative embodiments are shown in FIGS. 4-8.

Figure 4:
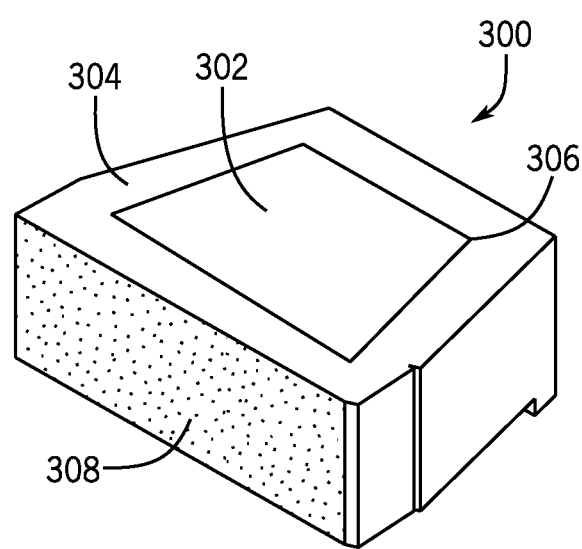
FIG. 4 is perspective view of another embodiment of a multi-zone cementitious product in accordance with the invention.

FIG. 4 shows an additional common embodiment of a multi-zone cementitious product in accordance with the present invention. FIG. 4 shows a cementitious retaining wall block 300 with base zone 302 surrounded by a perimeter facing zone 304, and having adjacent boundary zone 306 and facing sides 308. Of course, any configuration of facing sides may be used without departing from the invention.

Figure 5A:
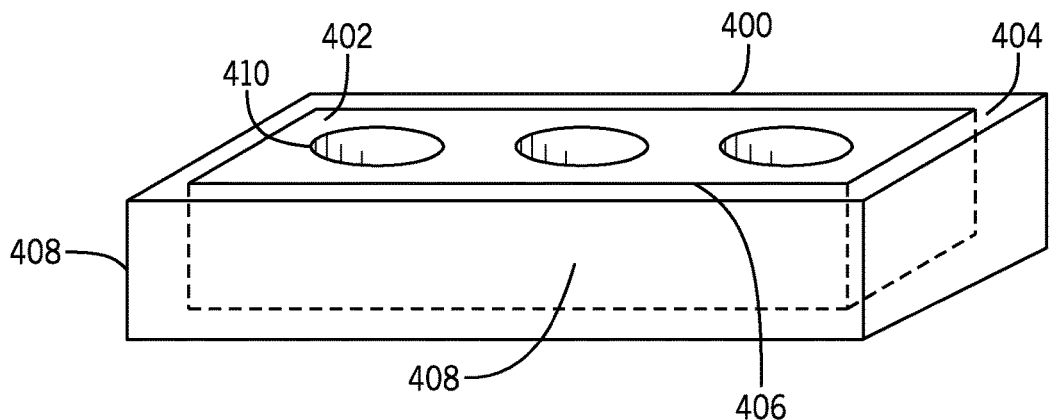
FIG. 5A is perspective view of another embodiment of a multi-zone cementitious product in accordance with the invention.
Figure 5B:
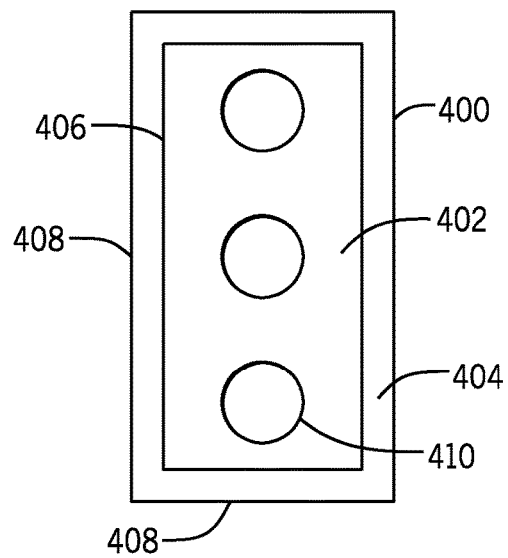
FIG. 5B is top view of the multi-zone cementitious product of FIG. 5A.
Figure 6D:
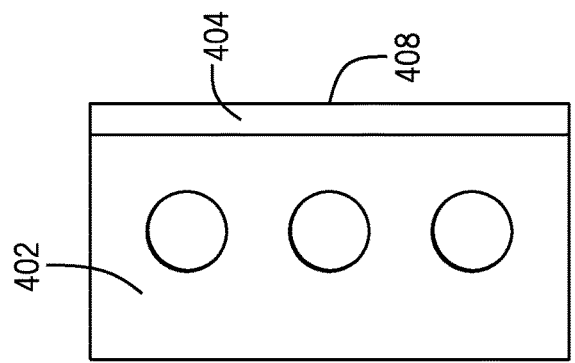
FIGS. 6A-6D are top views of additional embodiments of a multi-zone cementitious product in accordance with the invention.
Figure 6C:
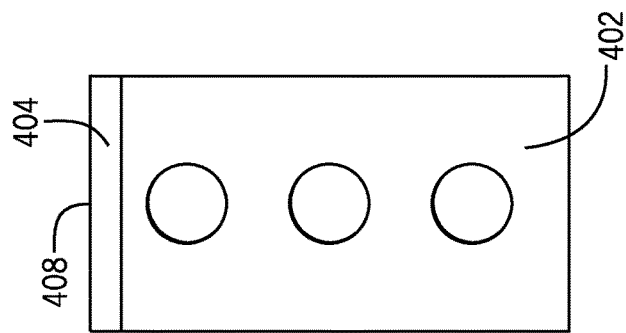
Figure 6B:
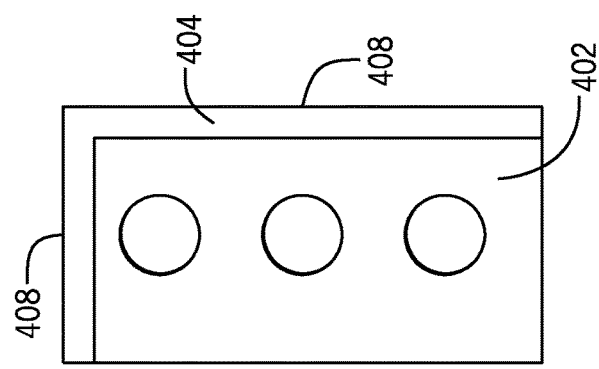
Figure 6A:
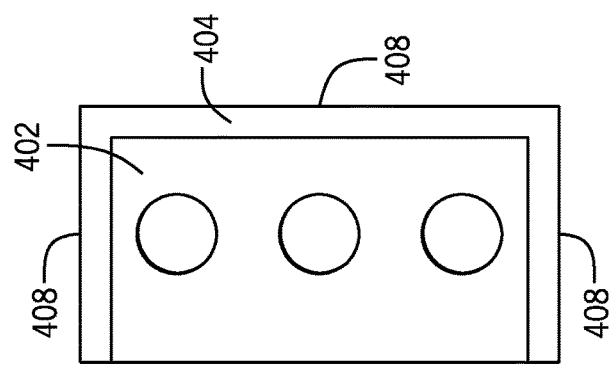

FIGS. 5A and 5B show other embodiments of a multi-zone cementitious product 400 in accordance with the invention, having a base zone 402, at least one facing zone 404, and boundary zone 406. Facing zones 404 form a perimeter around base zone 402, and facing side(s) 408 may be visible after product installation. Multi-zone cementitious product 400 may be made with or without core holes 410. FIGS. 6A-6D show some alternative embodiments of multi-zone cementitious product 400, each with one or more facing zones 404 forming less than a total perimeter around the base zone 402.

FIGS. 7A-7F show yet another embodiment of the invention of a multi-zone cementitious product 500 with base zone 502, at least one facing zone 504, and boundary zone 506. Facing side(s) 508 provide potential facing surfaces after product installation. FIGS. 7A and 7D show a multi-zone cementitious product 500 with a top facing zone 504 to provide facing side 508. Top facing zone 504 has a thickness T1 which allows the product top and product partial side surfaces of facing zone 504 to be used as visible surfaces after product installation.

FIGS. 7B and 7E show one top facing zone 504 providing top facing side 508 and other facing zones providing adjacent facing sides. One or more facing zones 504 enable adjacent facing zones to encase the perimeter around base zone 502. Facing sides 508 may or may not extend to entire length of the product 500 side. Top facing zone 504 has a thickness T2 which allows the top and side surfaces of facing zone 504 to be visible after product installation. Side facing zone has a thickness T3 which allows the side surfaces of facing zone 504 to be used as visible surfaces after product installation. Adjacent facing sides 508 may or may not extend the whole length of the product 500.

FIGS. 7C and 7F show a product 500 having one top facing zone 504 providing top facing side 508 and other facing zones providing adjacent facing sides. One or more facing zones 504 enable adjacent facing sides 508 to encase less than the perimeter around base zone 502. Adjacent facing sides 508 may or may not extend the whole length of the product 500.

Figure 8B:
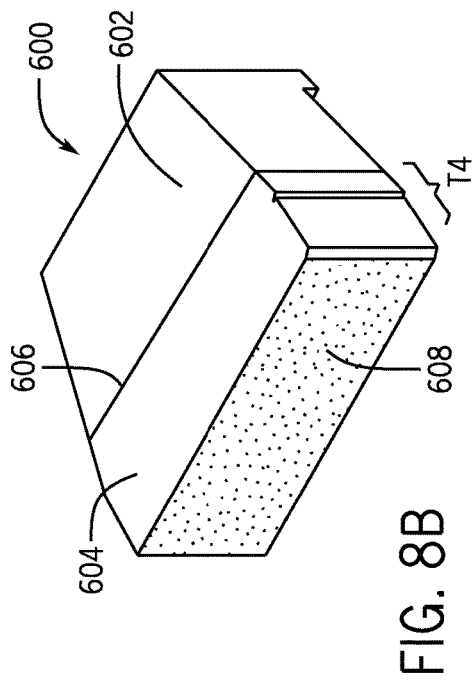
FIGS. 8A-8D are perspective views of additional embodiments of a multi-zone cementitious product in accordance with the invention.
Figure 8D:
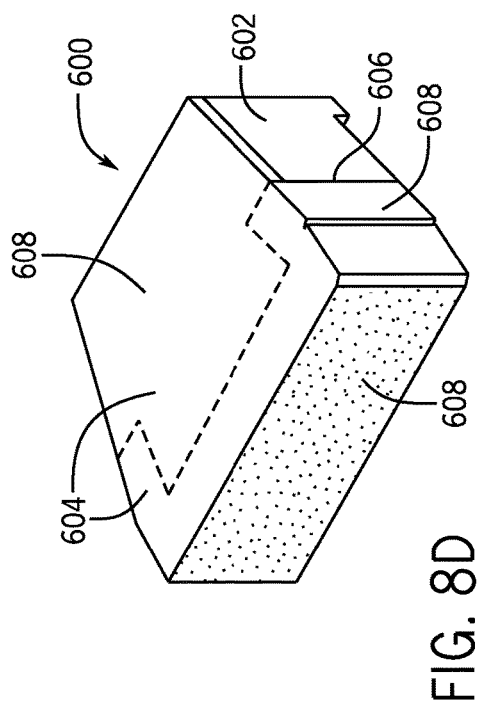
Figure 8A:
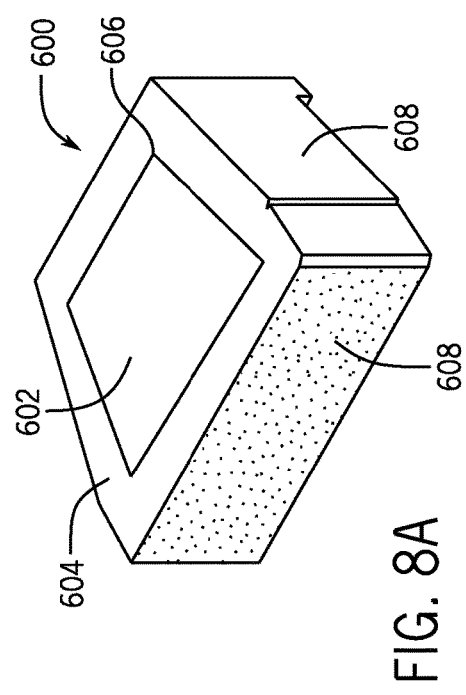
Figure 8C:
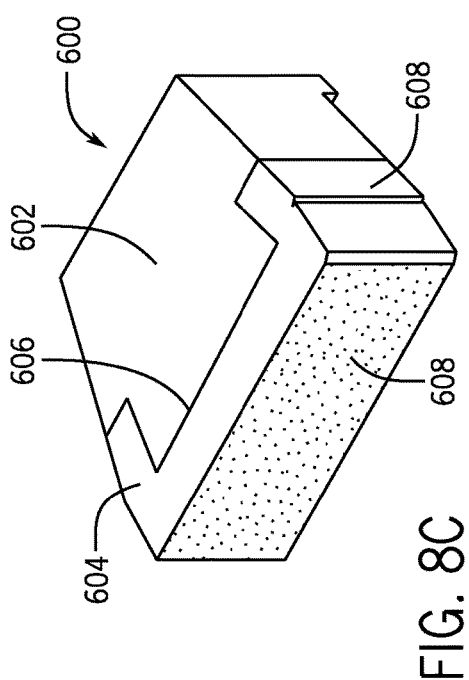

FIGS. 8A-8D show other embodiments of multi-zone cementitious products 600 in accordance with the invention having base zone 602, one or more facing zones 604, and a boundary zone 606. Facing sides 608 provide potential facing surfaces after product installation. FIG. 8A shows multi-zone cementitious product 600 with one or more facing zones 604 to provide facing sides 608 to provide a perimeter around base zone 602. FIG. 8B shows one side facing zone 604 providing facing side 608. Front facing zone has a thickness T4 which provides the product front and product partial top and product partial side surfaces of facing zone 604 to be visible after product installation. FIG. 8C shows one front facing zone providing front and adjacent facing sides 608. One or more facing zone 604 causes adjacent facing sides to encase less than the perimeter around base zone 602. Facing sides 608 may or may not extend the entire depth of the product side. FIG. 8D shows one top facing zone 604 providing product top facing side 608 and other facing zones providing adjacent facing sides. One or more facing zone 604 enables adjacent facing sides to provide product front facing sides and product side facing side to encase less than the perimeter around base zone 602. Facing sides 608 may or may not extend to whole depth of the product side.

Figure 9A:
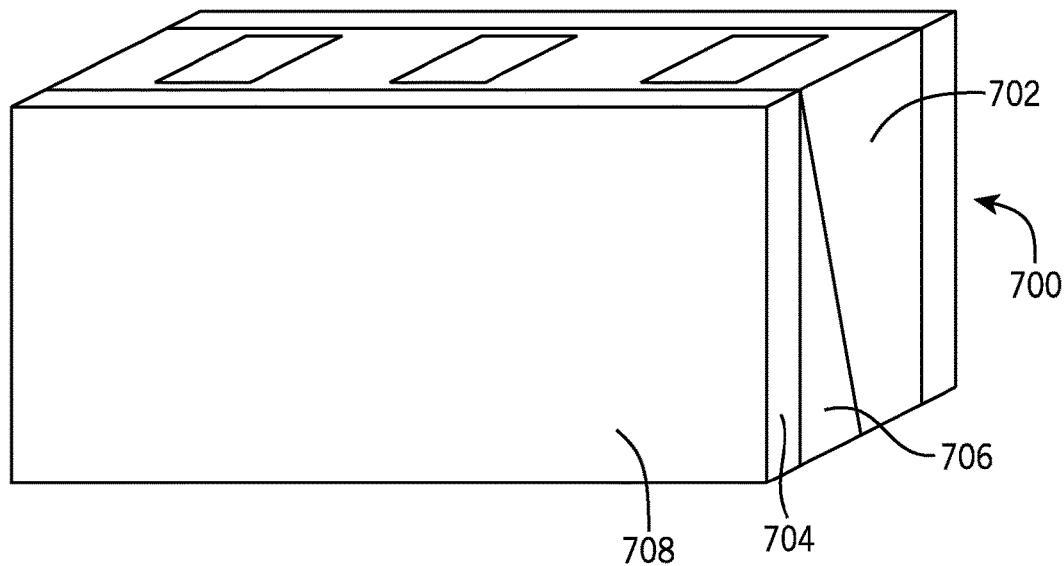
FIG. 9A is a perspective view of an additional embodiment of a multi-zone cementitious product in accordance with the invention.
Figure 9B:
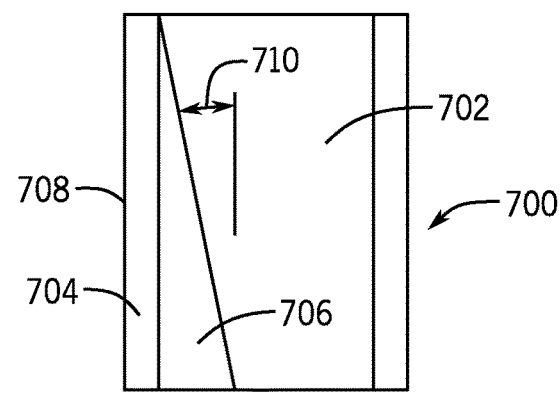
FIG. 9B is a side view of the multi-zone cementitious product shown in FIG. 9A.

FIGS. 9A-9B show another embodiment of the invention a multi-zone cementitious product 700 with base zone 702, facing zone 704, and boundary zone 706. Facing side 708 provides a facing surface after product installation. Facing zone 704 has a thickness sufficient to allow only material in facing zone 704 to show after product installation. As shown, boundary zone 706 has greater thickness at the bottom of the multi-zone cementitious product 700 than at the top of the product. Thus, the transition of the boundary zone 706 to the base zone 702 is disposed at an angle 710 with respect to the vertical plane of the product. The angle 710 provides enhanced bonding of the zones during vibration and densification of the product 700.

In each of the embodiments shown, the boundary zones 106, 206, 306, 406, 506, 606, 706 are achieved during the densification and/or forming process of the multi-zone cementitious product 100, 200, 300, 400, 500, 600, 700 using vibration, vacuum, and/or forming force and, if required, mechanically disrupting the surface of one zone prior to and/or concurrently with applying a second zone prior to curing. Vacuuming may be a step in the cementitious product forming process that reduces air pockets in the product and densifies the cementitious materials. Vibrating is a normal step in the cementitious product forming process that also reduces air pockets in the product and densifies the cementitious materials. However, in the present invention, the vibration step also aids in the creation of the boundary zone 106. Applying forming force is another normal step in the cementitious product forming process that also reduces air pockets in the product and densifies the cementitious materials. Like the vibration step described above, the application of forming force also aids creation of the boundary zone 106. In the present invention, zones of material may be deposited and formed at the same time or at different times. The formation of each zone may cause a film layer to form on any formed surface of the zone. The film layer is generally smooth and inhibits material bonding with an additional zone at the boundary layer.

FIGS. 10A-10B show detail views of a boundary zone 106 of FIG. 1, as an example. This description applies to all other embodiments as well. FIG. 10A shows base zone 102, facing zone 104, and boundary 105. Bonding between zone 102 and 104 is achieved and/or enhanced by disrupting the boundary 105 between zones to intermingle materials within base zone 102 and facing zone 104 to form a boundary zone 106 (see FIG. 10B). The facing zone 104 has an initial thickness 120 that decreases as a result of the formation of the boundary zone 106. After boundary disruption, facing zone 104 has a new and smaller thickness 122. Smaller thickness 122 is specifiable and should be designed to prevent undesirable physical features from revealing in the event of any chippage or other minor and normal damage that may occur to facing zone 104. For example, if base zone 102 contains a non-colored cementitious material composition and facing zone 104 contains a colored cementitious material composition, then smaller thickness 122 should be large enough to allow normal chipping of the facing zone 104 without exposing the boundary layer 106 or base zone 102. The example shown in FIGS. 10A-B is illustrative of the boundary between two zones, but additional zones may be layered one on top of another, each of which would have a boundary layer formed between them.

Disruption of the boundary 105 may be achieved by any suitable means including but not limited to preventing a film from forming at the boundary 105, removing a film at the boundary 105, physically moving or vibrating one zone with respect to another zone in a motion substantially parallel to the boundary 105, compacting the zones together, physically moving or vibrating the zones in a direction not parallel to the boundary 105. Of course, the techniques described may be used individually or in combination to achieve the level of disruption desired. The techniques described are simply examples, and other techniques for disrupting the boundary 105 may be used without departing from the invention.

Additionally, a bonding layer may be deposited between zones to enhance zone bonding. The bonding layer may include a number of materials including but not limited to cellulous fiber, polymer fiber, carbon fiber, glass fiber, and/or cementitious material having different material content and/or moisture content than the zones. The bonding layer may include any material that enhances zone bonding without departing from the invention. Of course, base zone 102 and facing zone 104 may also include additional materials that improve bonding of the zones.

Typical vibration processes include vibration in only the vertical axis, which enables the reduction of material voids during densification. In the present invention, however, vibration in multiple axes may be used to sufficiently disrupt boundaries 105 of differing orientations. The boundary layer 106 is best formed when direction of vibration and the direction of forming force is not parallel to the boundary layer. For example, in a cementitious product with vertical boundary layers 106, only vertical vibration and/or forming force may not be enough to adequately disrupt the boundary layer 106. In the present embodiment, this issue is overcome by forming the base zone 102 and facing zones 104 so that the boundary 105 is not parallel to the vibration direction.

Figure 11A:
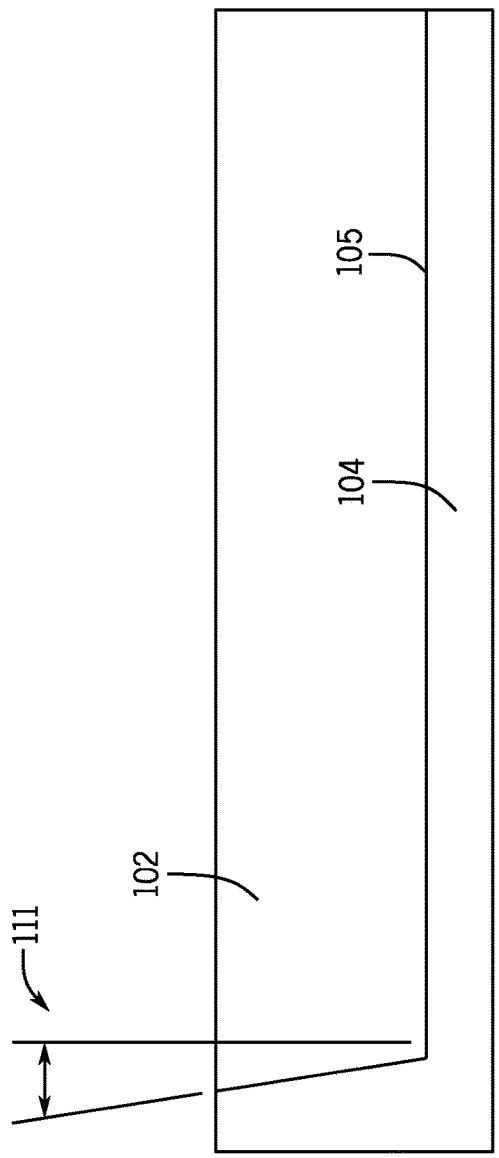
FIGS. 11A-11B are side views of another embodiment of the multi-zone cementitious product showing a boundary before and after boundary disruption.
Figure 11B:
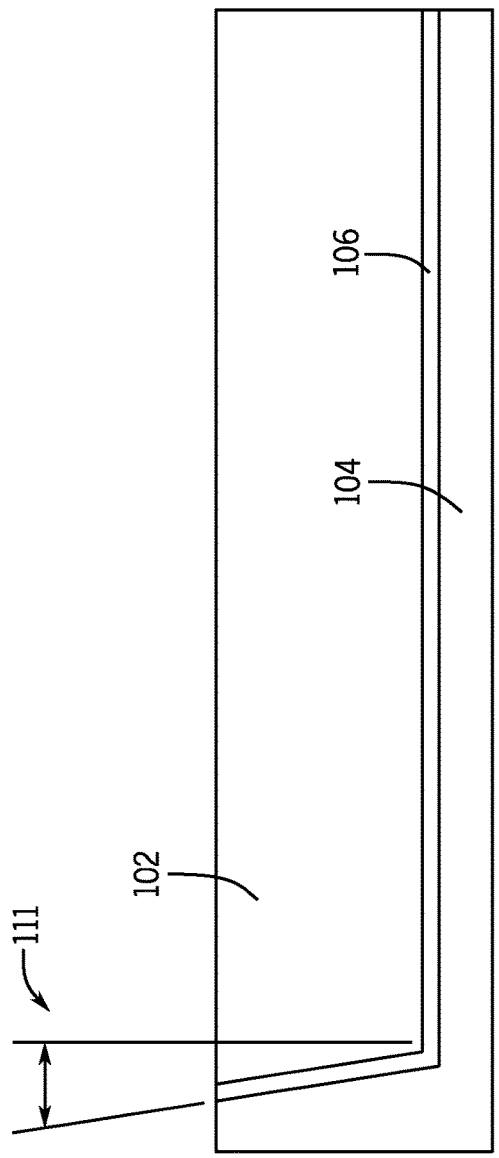
Figure 12A:
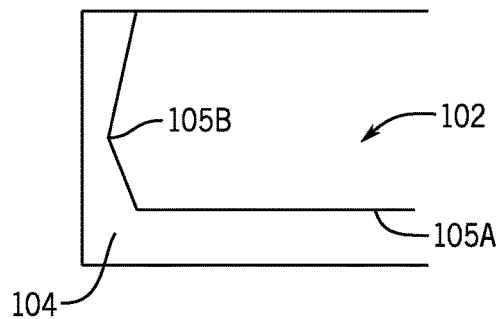
FIGS. 12A-12F are detail side views of additional embodiments of multi-zone cementitious products in accordance with the invention.
Figure 12B:
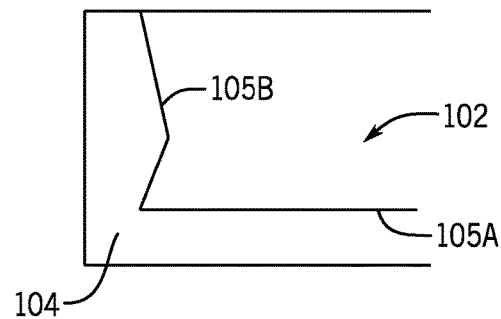
Figure 12C:
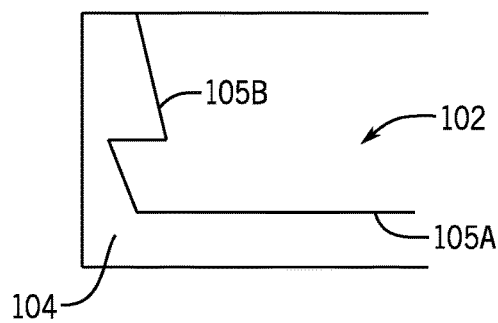
Figure 12D:
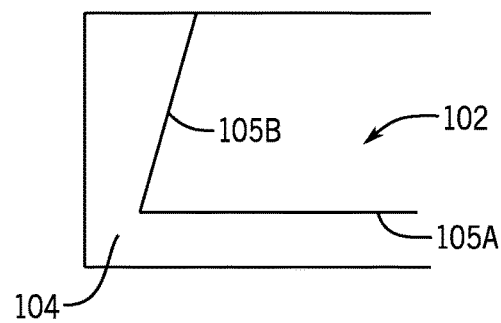
Figure 12E:
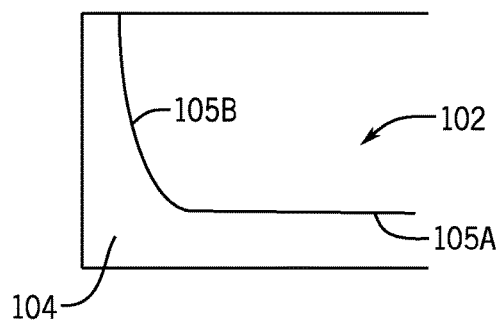
Figure 12F:
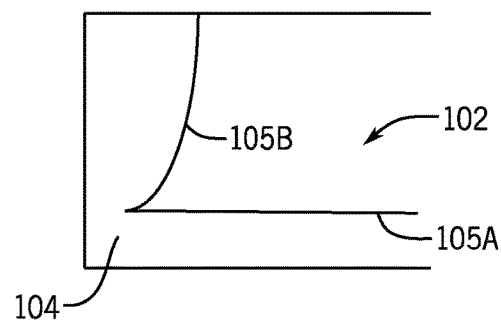

FIGS. 11A-B show one example of a non parallel boundary 105. FIG. 11A shows the multi-zone cementitious product 100 at an early stage of formation, prior to any vibration or densification. In the embodiment shown, facing zone 104 is added to a product forming cavity before base zone 102 is added on top of the facing zone. If both zones 102, 104 are loosely placed within the cavity, then initial vibration and forming force will adequately disrupt the boundary 105 to form the boundary zone 106. As the densities of the cementitious material compositions increases during vibration, vacuuming, or forming force densification, the disruption of the boundary 105 will be more effective if the boundary 105 is non-parallel to the direction of vibration and densification force. As shown, the facing zone 104 includes one side of the product. To allow sufficient bonding, an offset angle 111 is added to the boundary 105 so that it is non-parallel to a vertical vibration and densification force.

If facing zone 104 is slightly densified prior to adding base zone 102 then a film layer that could result from that densification may be mechanically disrupted to pierce the film layer, thereby exposing underlying cementitious material. Next, after base layer 101 is added in a low density manner, the whole product can be densified and formed. This technique of mechanically disrupting a layer to pierce the film layer may be used for zones in any orientation.

If zones are formed in a low density manner, a zone separator may be used as a barrier between zones to maintain zone integrity. The zone separator can then be withdrawn to prevent the formation of a film layer at the boundary prior to final vibration and/or final forming force. The zone separator may be made of any suitable material and may further include fingers, prongs, stakes, or any other form to further mechanically disrupt or rake the boundary 105.

Typically, product densification is achieved by four factors: vibration, vacuum, initial forming force, and final forming force. Disruption of boundary 105 may be achieved most easily when the vibration and/or forming force is perpendicular to the boundary. To achieve adequate disruption the relative direction of initial vibration and forming force could be from one or more directions and final vibration and/or forming force could be in one of more other directions.

FIGS. 12A-F show some illustrative embodiments of configurations of boundary 105. For example, in a cementitious product with a front and side forming the facing zones 104, the front boundary 105A will run perpendicular to the vertical vibration and/or forming force direction. The vertical boundary 105B, however, does not run parallel to the direction of vibration. Rather, the vertical boundary 105B has a profile that is not parallel to the direction of vibration, which provides for adequate disruption of the vertical boundary 105B. Of course, any configuration of boundary layer and/or vibration direction may be used without departing from the invention. Additionally, any suitable means for disrupting the boundary 105 may be used including but not limited to raking and/or mechanical displacement without departing from the invention.

It should be apparent that when the boundary zone 106 is formed, and the material from the base zone 102 intermingles with the facing zone 104, the desired aesthetic qualities of the facing zone and/or preferred product features may be degraded. Thus it is necessary that the facing zones 104 have a thickness such that the disrupted boundary layer 108 does not affect the exterior decorative face of the cementitious product 100. The thickness of the facing zone 104 will vary depending on the cementitious mixture of both the base zone 102 and the facing zone, as well as other factors including but not limited to vibration force, vibration amplitude, vibration time, vibration direction relative to boundary 105, forming force, forming force interval, forming force direction relative to boundary 105, mechanical disruption of the zones 104, 102, other disruption means, etc.

FIGS. 13 and 13A shows one embodiment of a raking tool 260. In the embodiment shown, the raking tool 260 is integral with a zone separator 900 and has prongs 262 protruding from the bottom end of the zone separator. The prongs 262 may be on either side or both sides of the zone separator 900 and may disrupt material on the base zone 102 and/or the facing zone 104. Relative placement and spacing of the prongs 262, the amount that the prongs protrude, and movement of the raking tool 260 may vary to suit any manufacturing process, product shape, and cementitious material used to make a multi-zone cementitious product 100 in accordance with the invention.

As described earlier, the multi-zone cementitious product, such as the product 100 shown in FIG. 1, may be formed by any suitable means, including but not limited to multi-forming, molding, or extrusion. Multi-forming products is a process wherein successive layers or segments of material are deposited onto a slab, thereby building a product in layers. The basic multi-forming process involves a series of conveyers, rollers, screeds, and/or skimmers that shape cementitious material as it moves from the beginning of the multi-former to the end.

Figure 14:
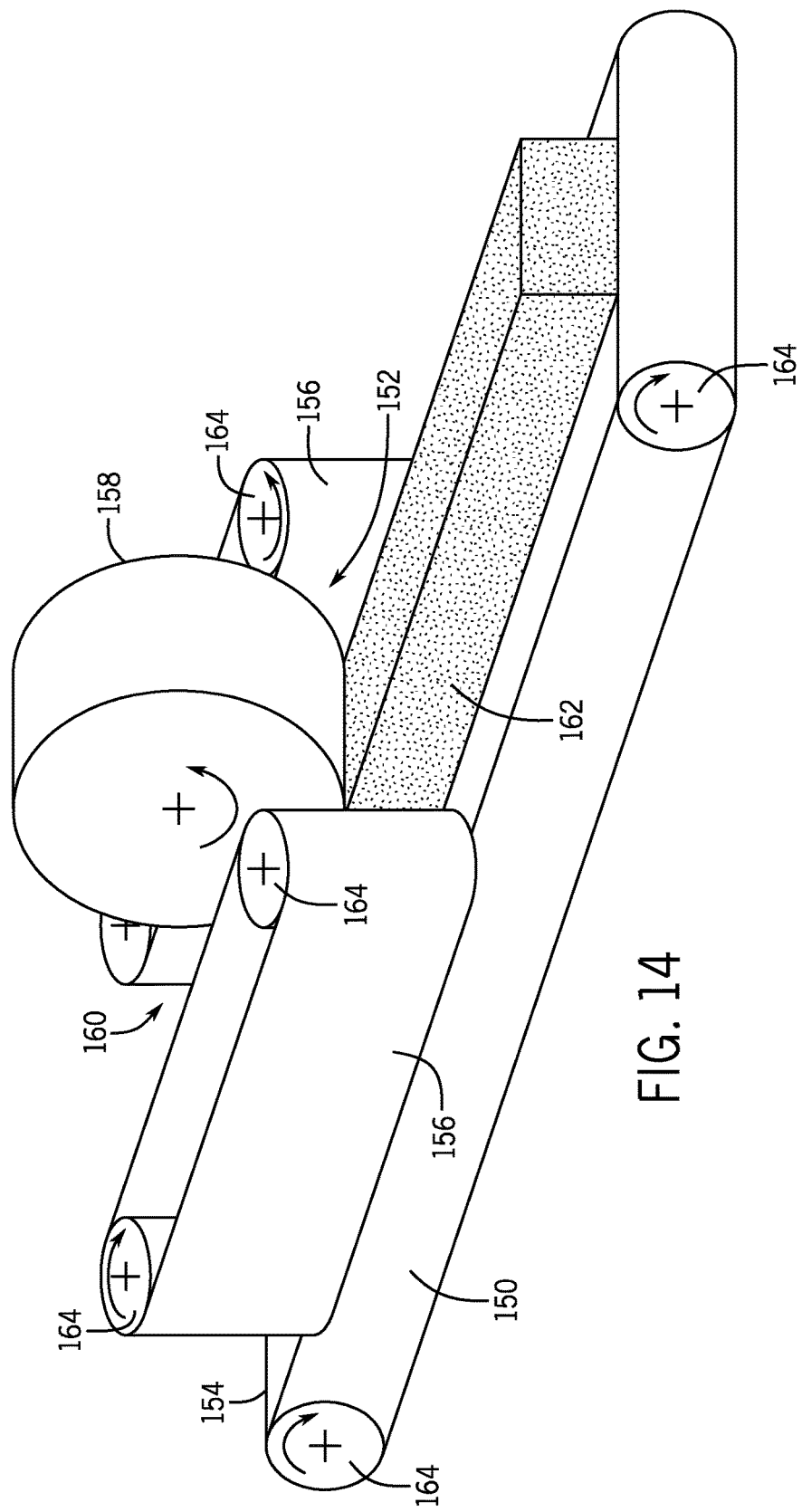
FIG. 14 is a partially schematic perspective view of a multi-form machine in accordance with the invention.

FIG. 14 shows a basic multi-forming machine 150 that can either produce a cementitious product or a cementitious slab to be used in one or more secondary processes to produce a cementitious product. Basic multi-forming machine 150 has a continuous "U" shaped channel 152 that contains, forms, and densifies cementitious materials deposited into the channel. A forming base conveyor 154 forms the bottom of the "U" and forms the base of the multi-zone cementitious product. Forming side conveyors 156 create the two sides of the "U" which form the sides of the multi-zone cementitious product. Finally, in the embodiment shown, a forming top roller 158 forms the top side of the multi-zone cementitious product. Alternative embodiments of a multi-forming machine 150 may replace the forming top roller 158 with one or more additional rollers, a screed, and/or skimmer.

A cementitious material input section 160 is supplied upstream of the forming top roller 158. Cementitious material is deposited onto the forming base conveyor 154, passing under the forming top roller 158, forming a slab 162. The formation of the slab 162 is controlled by the forming side conveyors 156 and the forming top roller 158. Rather than depositing the cementitious material directly onto the forming base conveyor 154, a transfer plate could be placed onto the forming base conveyor before the cementitious material is deposited thereon. The transfer plate could be used as a platform on which the slab 162 is formed and to transfer the slab and/or multi-zone cementitious product 100 to a curing accumulation system or storage thereby reducing stress on the product while it is in an uncured state. The transfer plate used within the multi-forming machine 150 and in any secondary process(es) could be thin such as a piece of sheet metal that could in turn be added on to a thicker/stiffer transfer plate. Further, the transfer plate could be wider than the slab 162 and lay in a gap between the forming base conveyor 154 and the forming side conveyors 156.

In the embodiment shown, the forming base and side conveyors 154, 156 include structural wear plates (not shown) that stiffen the conveyors between the conveyors' pulleys 164 to aid formation of the slab 162. The wear plates are adjustable along the length of the conveyor to provide compressive force during forming of the slab 162, and may provide clearance to release pressure on the slab 162 downstream so that it may be removed from the multi-forming machine 150. Additionally, sections of the structural wear plates may vibrate to enable belt vibration and cementitious densification. Similarly, the top forming roller 158 may vibrate to aid densification of the slab 162.

Figure 15:
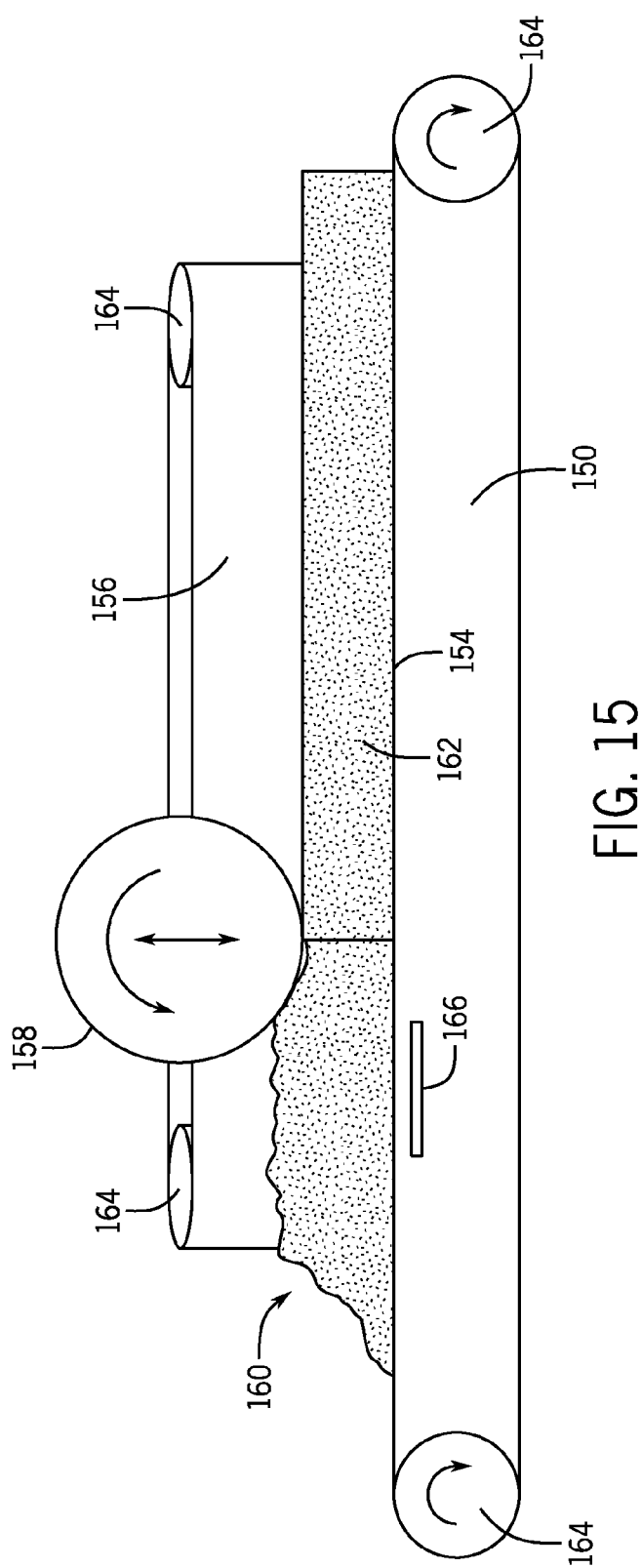
FIG. 15 is a partially schematic side view of the multi-form machine of FIG. 14.

FIG. 15 shows a side view of the multi-forming machine 150. As shown, vibration plate(s) 166 can be located underneath forming base conveyor 154 and/or inside or connected to the slab facing portion of the belt of forming side conveyors 156. Forming top roller 158 exerts pressures against slab 162 in order to create forming forces. The height of slab 162 is determined by one or more forming top rollers 158 which could be substituted with one or more screed, one or more skimmers, and/or one or more series of rollers encased within a belt to aid or provide forming pressure.

Figure 16B:
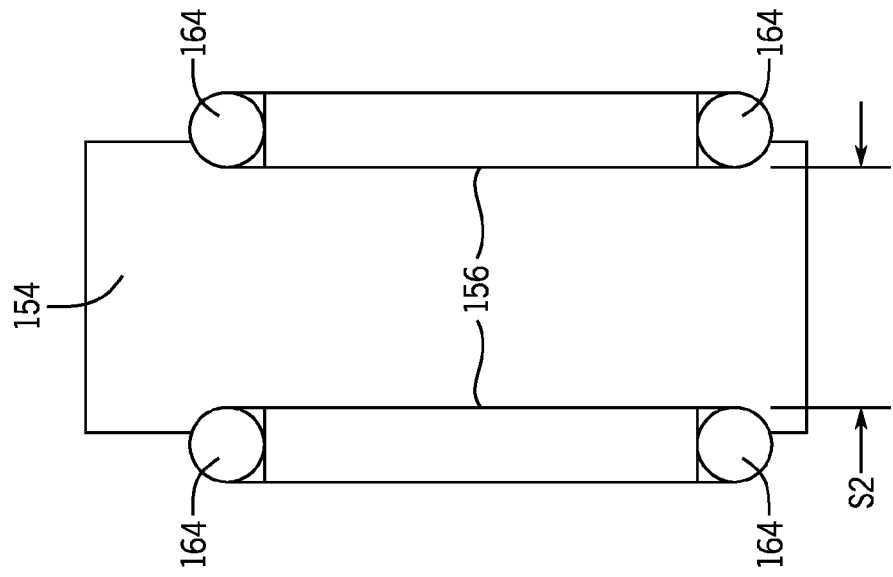
FIG. 16B is another top schematic view of the multi-form machine of FIG. 14 with side conveyors adjusted to a wide arrangement.
Figure 16A:
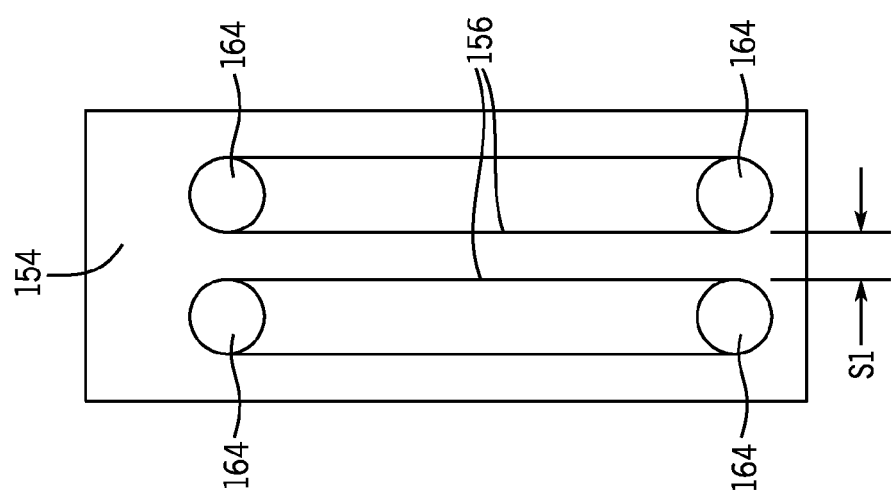
FIG. 16A is a top schematic view of the multi-form machine of FIG. 14 with side conveyors adjusted to a narrow arrangement.

As shown in FIGS. 16A and 16B, the distance between forming side conveyors 156 can be adjusted to determine the width of the slab 162. A smaller separation 51 is shown in FIG. 16A, whereas a larger separation S2 is shown in FIG. 16B. It should also be noted that the surface speed of the forming side conveyors 156 may be adjusted and could be either slower, the same, or faster than the surface speed of the forming base conveyor 154. Such adjustment allows for varying cementitious mix designs, textures, and other forming options.

Figure 17:
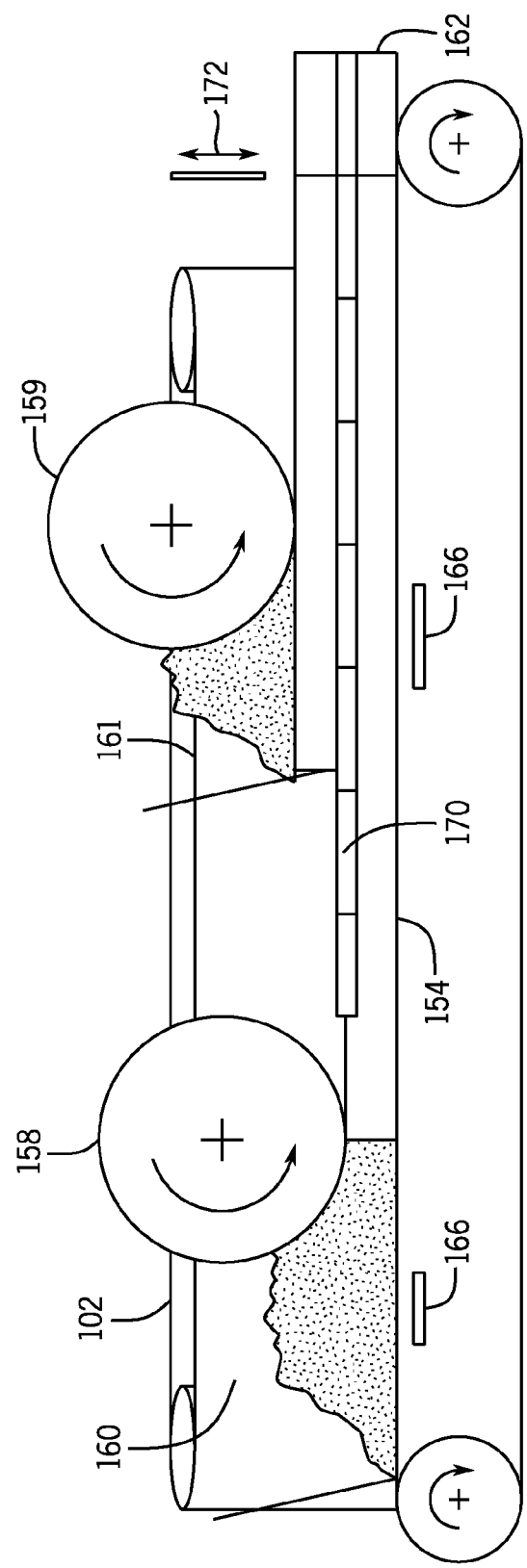
FIG. 17 is a side schematic view of another embodiment of a multi-form machine in accordance with this invention.

FIG. 17 shows a slab 162 being made on the multi-forming machine 150. In the embodiment shown, a first deposit of cementitious material is added to a first input section 160, wherein the cementitious material passes under a first forming top roller 158, which forms the bottom portion of the slab 162. In the embodiment shown, the first forming top roller 158 includes a profile that forms furrows in the bottom portion of the slab 162, to accommodate the emplacement of core mandrels 170 within the furrows. The first forming top roller 158 may also vibrate along with the bottom or side belts to aid densification of the slab 162. A small lengthwise gap is formed between core mandrels 170 that are lengthwise adjacent, to allow cutting of the slab 162 at the gaps.

After the core mandrels 170 are inserted onto the bottom portion of the slab 162, another second deposit of cementitious material is added to a second input section 161. The bottom portion of the slab 162 and the newly deposited cementitious material pass under a second forming top roller 159 to form the top portion of the slab 162. The slab 162 is then cut at the lengthwise gap between core mandrels by a slab cutter 172 and accumulated on a table or conveyer (not shown) to then complete one or more secondary operations on the formed products. Uncured "green" products are then processed elsewhere by either air curing the product or autoclave curing. It is also possible to support the core mandrels 170 from a transfer plate rather than laying the core mandrels on the bottom portion of the slab 162. In such a configuration, one cementitious material input with vibration and forming tools could force cementitious material between core mandrels to form the entire slab 162 instead of forming the bottom portion of the slab, then adding the core mandrels 170, then adding the top portion of the slab.

Figure 18:
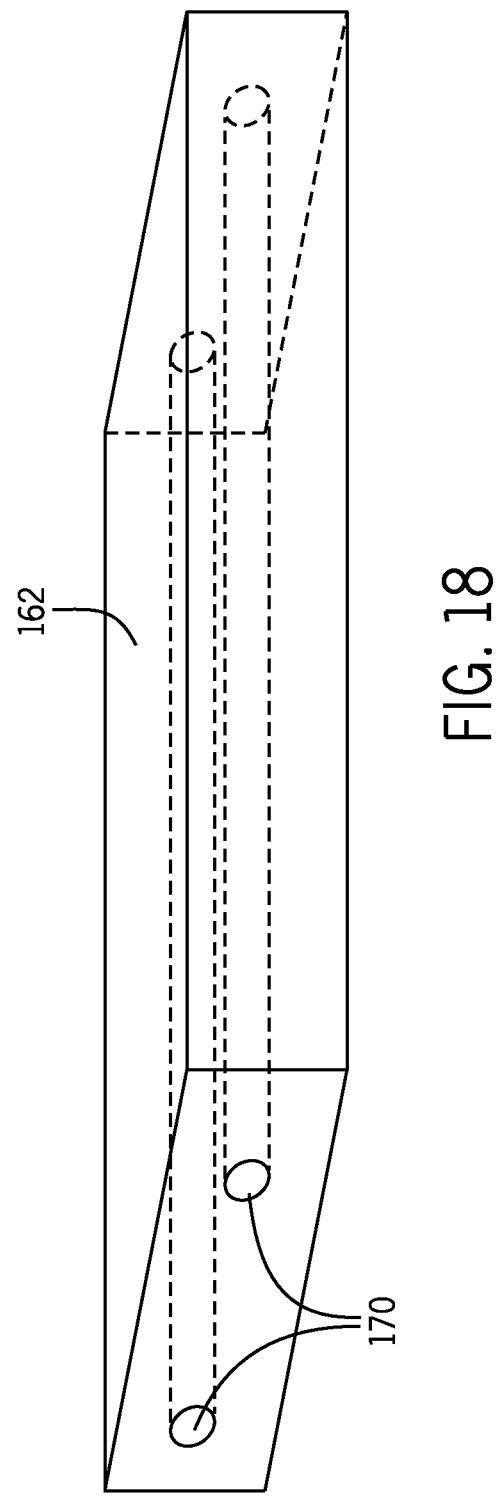
FIG. 18 is a perspective view of a multi-formed slab in accordance with the invention.

After slab 162 is formed, it must undergo secondary processes to form a final cementitious product. Such secondary processes may include but are not limited to: final densification using vibration, vacuum, and/or forming force; final forming force to enable negative, zero, or low slump cementitious material to be compressed to several thousand pounds per square inch; texturing; de-coring the slab 162 by removing the core mandrels 170; cutting the slab into individual products. FIG. 18 shows a slab 162 with mandrel core 170 within the slab.

Figure 19:
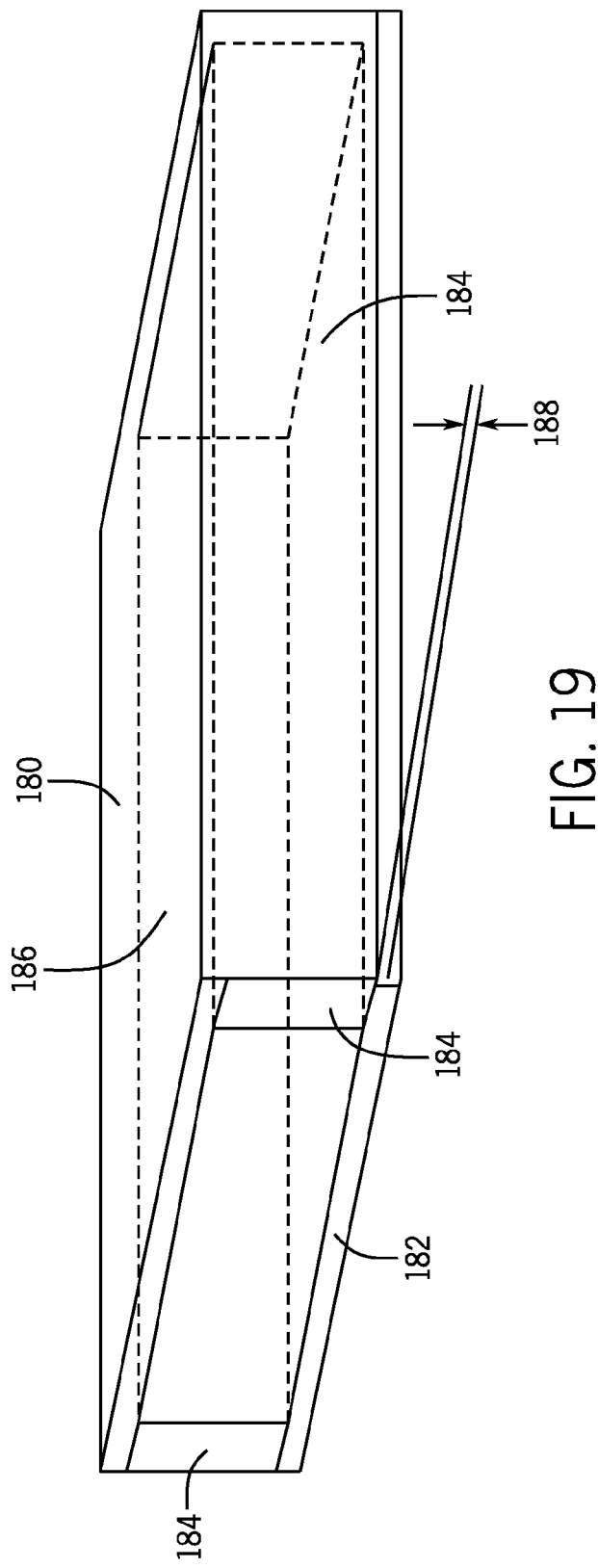
FIG. 19 is a schematic perspective view of a horizontal coining chamber in accordance with the invention.

FIG. 19 shows a horizontal coining chamber 180 which encases slab 162 and achieves final densification via vibration, vacuum, and/or forming force. Additionally, several types of texturing are possible. Chamber base 182 is stationary and chamber side walls 184 and chamber top 186 are moveable to allow for slab 162 insertion. Once inserted, chamber side walls 184 and chamber top 186 are then set for green product length and width dimensions. One end of the chamber 180 receives an end cap and the other end of the chamber receives a ram to supply final forming force. Chamber sides 184 may also adjust for smaller or larger product lengths and one or more spacers may be added on the chamber base 182 or chamber top 186 for smaller and larger product widths. A texture plate could be added on the chamber base 182, chamber top 186, and/or chamber side(s) 184 to create a texture on the slab 162. The texture plate could be stationary within the horizontal coining chamber 180 or move with the product. A gap 188 between chamber base 182 and chamber side walls 184 enables clearance for an overhanging transfer plate width.

Figure 20:
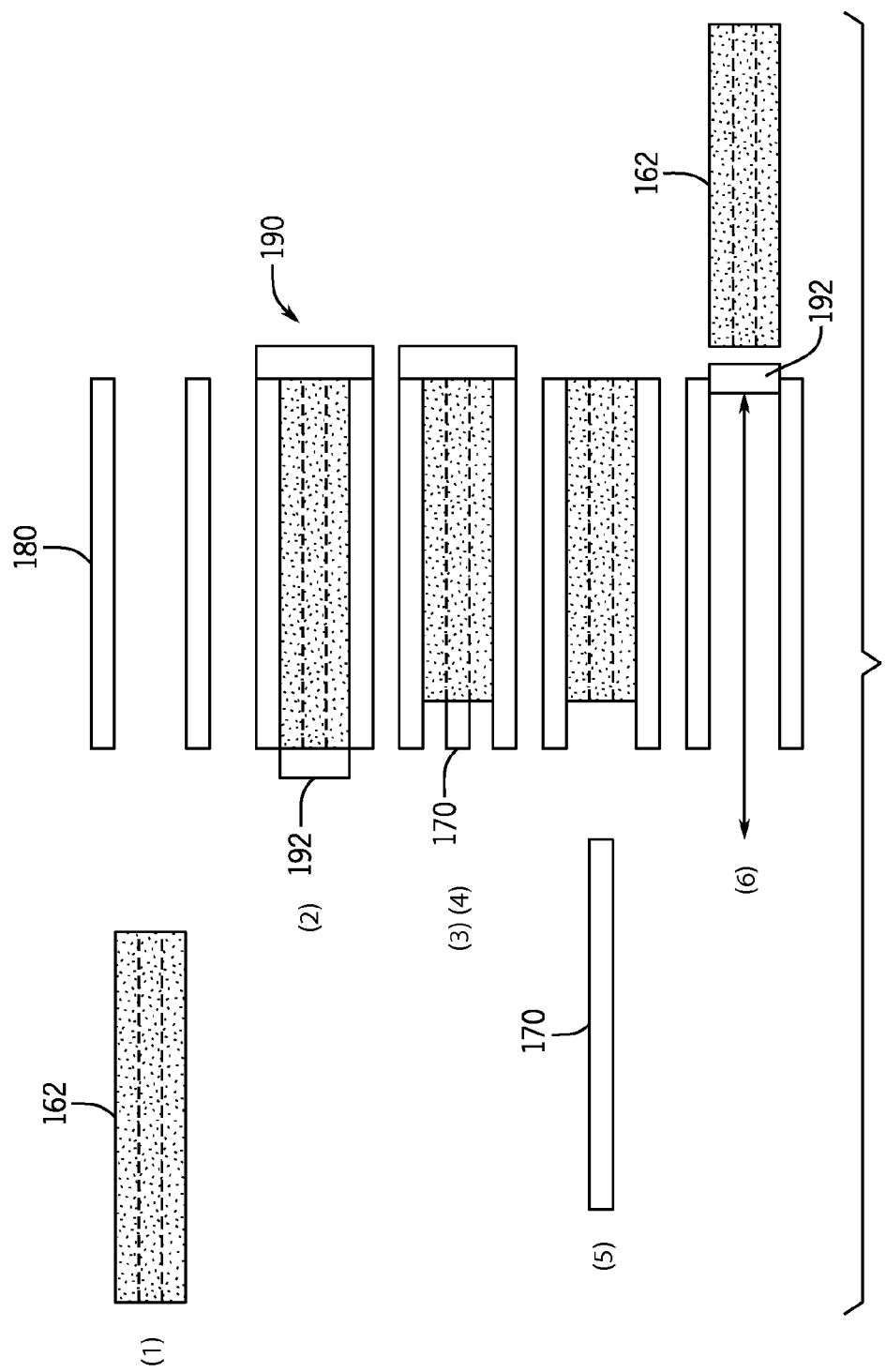
FIG. 20 is a top schematic view of a horizontal coining chamber in accordance with the invention.

FIG. 20 shows the operation of the horizontal coining chamber 180, which includes the following steps: (1) The slab 162 is inserted onto the chamber base 182, the chamber side walls 184, and chamber top (not shown) are adjusted for desired "wet" dimensions, (2) the chamber end cap 190 is placed over one end of the chamber and a ram 192 is placed within the other side of the chamber, (3) a combination of forming vibration, vacuum, and/or forcing force completed product slab densification, (4) the ram is withdrawn exposing the core mandrels 170 due to slab densification, (5) the end cap is withdrawn and the core mandrels are extracted (from either side), (6) the distance between the chamber side walls increases slightly and the slab is ejected from the chamber.

Figure 21:
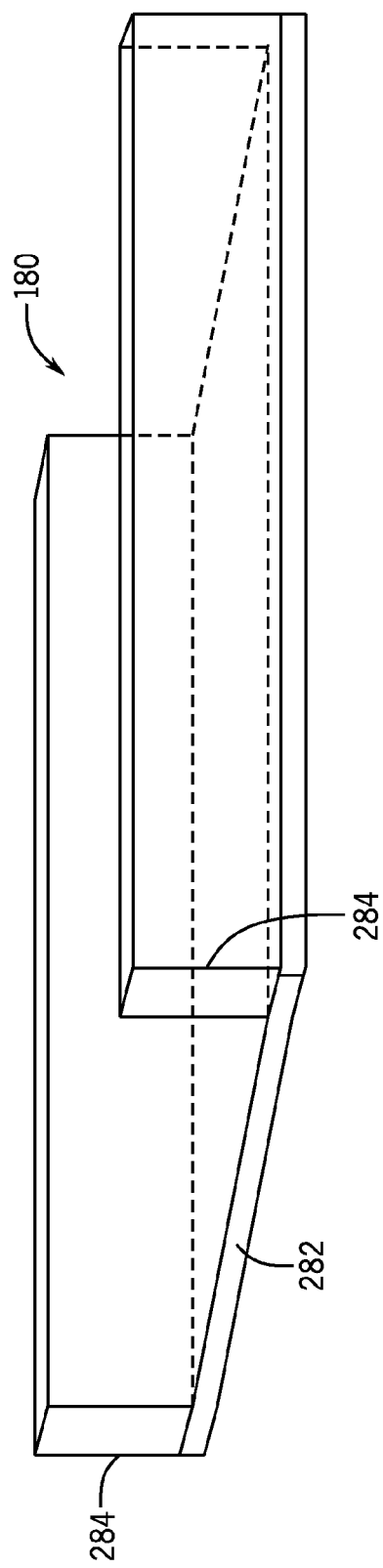
FIG. 21 is a schematic perspective view of a vertical coining chamber in accordance with the invention.

FIGS. 21-22 show a vertical coining chamber 280 and related operation. The vertical coining chamber 280 has a similar operation to the horizontal coining chamber 180 and includes the following steps: (1) the slab 162 is inserted onto the chamber base 282, (2) the chamber side walls 284 and end caps 290 are put in place for desired "wet" dimensions, (3) the ram 292 is inserted in the chamber and applies forming force, (4) a combination of forming vibration, vacuum, and/or forcing force is applied to complete slab densification, (5) one or more end cap is removed and the core mandrels 170 are extracted (slight force on the ram prevents fracturing of material during core mandrel withdrawal), (6) the ram is withdrawn and any remaining end cap is withdrawn, and (7) the distance between the chamber side walls increases slightly and the slab is ejected from the chamber.

FIG. 23 shows a cutting operation which could be used on slabs 162 ejected from the coining operation previously described. Slabs 162 are accumulated from the coining operation and sent through a cutter 250, producing products such as the product 100 shown in FIG. 1, from the slab 162. The green products may then be sent to another location for further curing. Cutter 250 may be any suitable slab cutting device including but not limited to a rotary cutter or wire cutter. The selection of cutter 250 may allow formation of desired textures on the surface of the product.

The multi-forming process above is particularly well suited to achieving a multi-zone cementitious product such as the product 100 shown in FIG. 1, in accordance with the invention. FIGS. 24A-24H and 25A-25H show two approaches to making a multi-zone cementitious product such as the product 100 shown in FIG. 1 using the multi-forming process. Both approaches show how an "L" shaped multi-zone cementitious product can be made. FIGS. 24A-24H show facing zones 104 on the top and one side of the slab 162. FIGS. 25A-25H show facing zones 104 on the bottom and one side of the slab 162.

Figure 24A:
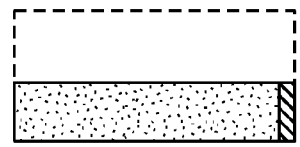
FIGS. 24A-24H are front views of a multi-form process showing one method of making a multi-zone cementitious product in accordance with the invention.
Figure 24B:
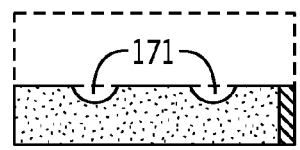
Figure 24C:
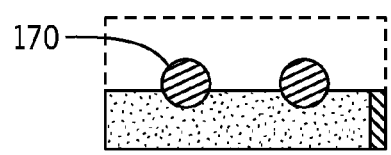
Figure 24D:
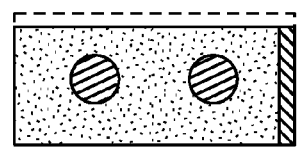
Figure 24E:
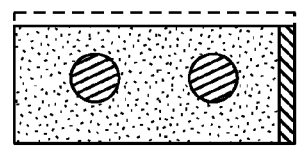
Figure 24F:
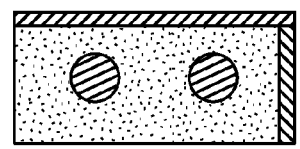
Figure 24G:
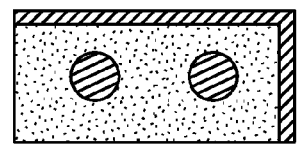
Figure 24H:
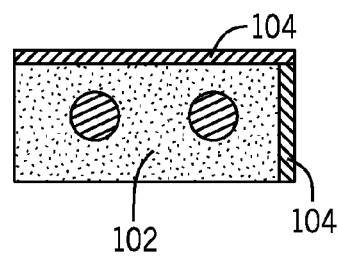

Turning first to FIGS. 24A-24H, the steps of forming a multi-zone cementitious product such as the product 100 shown in FIG. 1 are shown with relation to how material is built up in a multi-forming process to make a finished product. The first step, shown in FIG. 24A, is to add material for the bottom and one side facing zone 104 onto the forming base conveyor 154. Second, as shown in FIG. 24B, furrows 171 are formed into the material to prep for the addition of core mandrels 170. Third, as shown in FIG. 24C, the core mandrels 170 are placed into the furrows 171 and raking of materials may occur. Fourth, as shown in FIG. 24D, materials are added for the remainder of the slab 162 including one side facing zone 104, but not a top facing zone 104. Fifth, as shown in FIG. 24E, the material is prepped for the addition of a top facing zone 104. Sixth, as shown in FIG. 24F, material is added to form the top facing zone 104. Seventh, as shown in FIG. 24G, final sizing of the slab 162 is accomplished and is transferred to a different location for secondary operations. Finally, as shown in FIG. 24H, after secondary operations, the slab 162 is cut into individual products and is cured.

Figure 25A:
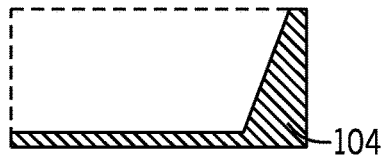
FIGS. 25A-25H are front views of another multi-form process showing another method of making a multi-zone cementitious product in accordance with the invention.
Figure 25B:
Figure 25C:
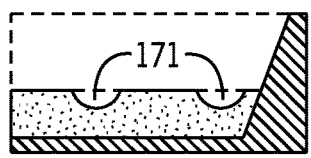
Figure 25D:
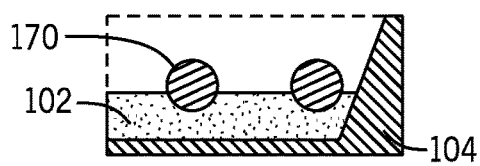
Figure 25E:
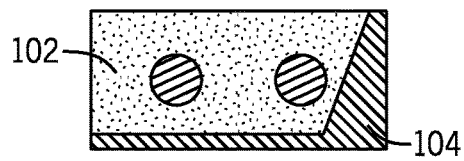
Figure 25F:
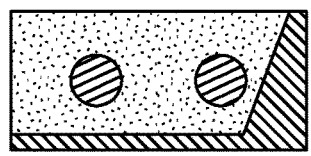
Figure 25G:
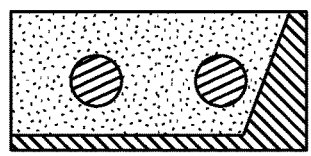
Figure 25H:
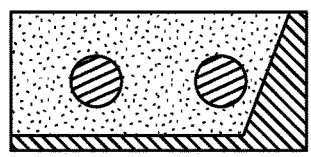

FIGS. 25A-25H show a similar process to the one shown in FIGS. 24A-24H, but depositing the facing zone first provides for some differences in the process. The first step, as shown in FIG. 25A, is to add facing material to form a bottom facing zone 104 and simultaneously form a side facing zone 104. Second, as shown in FIG. 25B, the surfaces of the facing zones 104 may be raked in preparation for the addition of a second material. Third, as shown in FIG. 25C, non-facing material is added on top of the facing zones 104 and the non-facing material has furrows 171 formed into the material to prep for the addition of core mandrels 170. Fourth, as shown in FIG. 25D, the core mandrels 170 are placed into the furrows 171, and the non-facing material may be raked to prepare for the addition of more non-facing material. Fifth, as shown in FIG. 25E, the remaining non-facing material is added to complete the slab 162. Sixth, as shown in FIG. 25F, the slab 162 undergoes densification and forming. Seventh, as shown in FIG. 25G, final sizing of the slab 162 is accomplished. Finally, as shown in FIG. 25H, the slab 162 is cut into individual products and is transferred to a different location for secondary operations and ultimately, curing.

Figure 26:
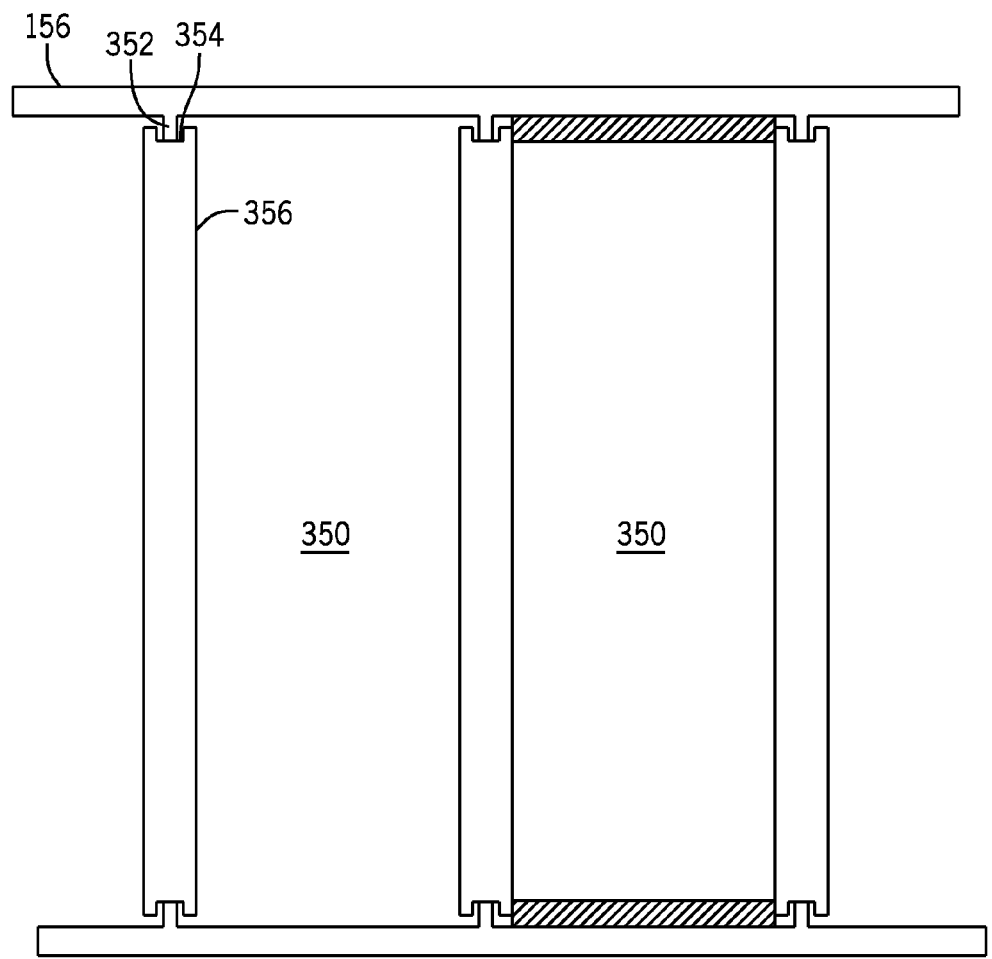
FIG. 26 is a partially schematic top view of a multi-form machine with buckets in according with the invention.

An alternative multi-forming technique is shown in FIGS. 26-27 wherein individual products are formed in "buckets" rather than forming a slab that must be cut in a later operation into individual products. FIG. 26 shows individual product buckets 350 which are formed by including locator protrusions 352 on forming side conveyors 156. The locator protrusions 352 mate with locator detents 354 at either end of bucket separator 356. As the forming base conveyor 154 and forming side conveyors 156 advance, the bucket separators advance 356 as well, essentially creating a moving mold cavity into which cementitious material may be deposited. As in the previous discussion of multi-forming techniques, a transfer plate (not shown) may be inserted onto the forming base conveyor 154 so that the products may be easily removed from the multi-forming machine 150. As the cementitious material exits the multi-forming machine 150 it is not a slab 162 as in the previously described multi-forming technique. Rather, the cementitious material exits the multi-forming machine 150 as essentially formed products. The cementitious material may exit the multi-forming machine 150 in groups of buckets 350 according to the length of the core mandrel(s) 170 that may span the group.

Of course, the products must undergo the same secondary operations previously described, but at the end of the secondary processes, there is no cutting step required. By eliminating the cutting step, tighter dimensional tolerance and more precise texturing can be achieved. Additionally, more coarse material may be used because there is no cutting step involved. If vertical coining is used to apply forming force, the ram 292 may be divided into individual rams that apply force to each product between bucket separators 356. If coarse material such as gravel were introduced to the slab 162, the larger aggregate would cause problems during the cutting step. As in the previously described multi-forming process, core mandrels 170 may be used with the bucket separators 356. For example, the core mandrels 170 may be inserted into each bucket 350. Alternatively, the bucket separators 356 may include holes that allow longer core mandrels 170 to pass through so that one set of mandrels 170 can be used for a group of buckets 350. In either example, each bucket 350 is individually densified, unlike a slab, where densification can be a continuous process as the slab passes through the multi-forming machine 150. After final densification and forming, the core mandrels 170 would be removed and a group of formed product would be sent on for curing. The bucket separators 356 would then be removed as curing permitted.

Another technique for forming a multi-zone cementitious product 100 in accordance with the invention is to form the product on a molding machine. The steps necessary for creating a multi-zone cementitious product 100 on a molding machine include: (1) mixing two or more cementitious materials, (2) transferring the mixtures into two or more hoppers or material holding areas near the mold, (3) supplying the mixtures to zoned sections in a mold cavity, (4) disrupting the boundary between the zoned sections, (5) densification of the materials by vibration, vacuum, and/or forming force, (6) ejecting green product from the mold, and (7) curing the product.

Some examples of material supply scenarios include: (1) two or more cementitious materials are supplied simultaneously and materials enter the mold cavity via gravity, agitation, and/or vibration, (2) two or more cementitious materials are supplied simultaneously and materials enter the mold cavity via a metering means, agitation, and/or vibration, (3) two or more cementitious materials are supplied alternately and materials enter the mold cavity via gravity, agitation, and/or vibration, and (4) two or more cementitious materials are supplied alternately and materials enter the mold cavity via a metering means, agitation, and/or vibration which is a controlled variation of (2) above. Of course material could be added to the mold in any other combination without departing from the invention.

Figure 28A:
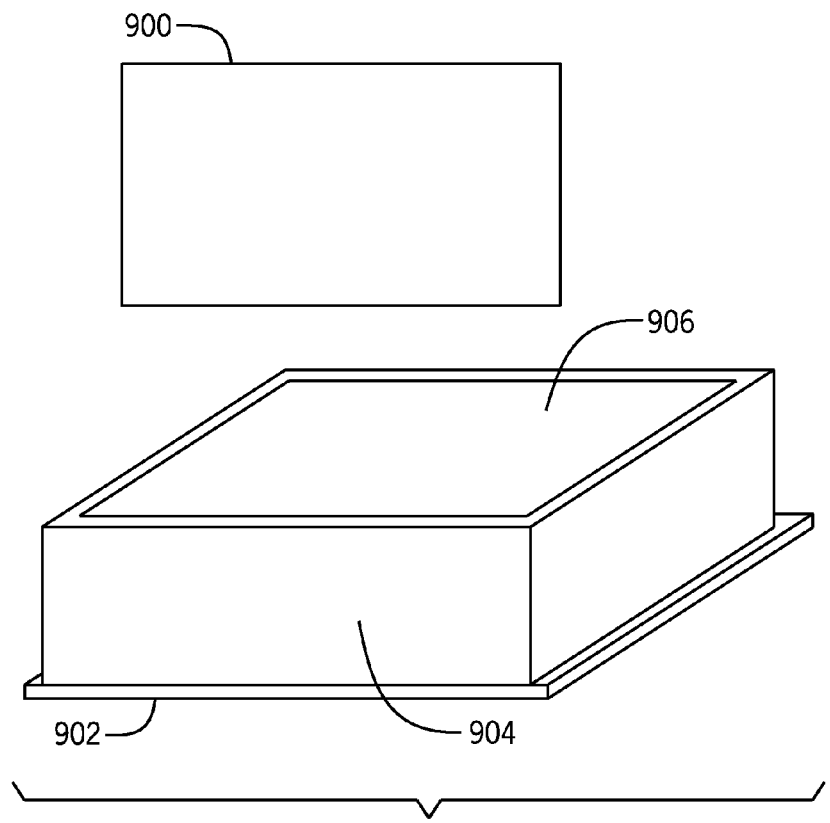
FIG. 28A is a perspective view of a mold in accordance with the invention.
Figure 28B:
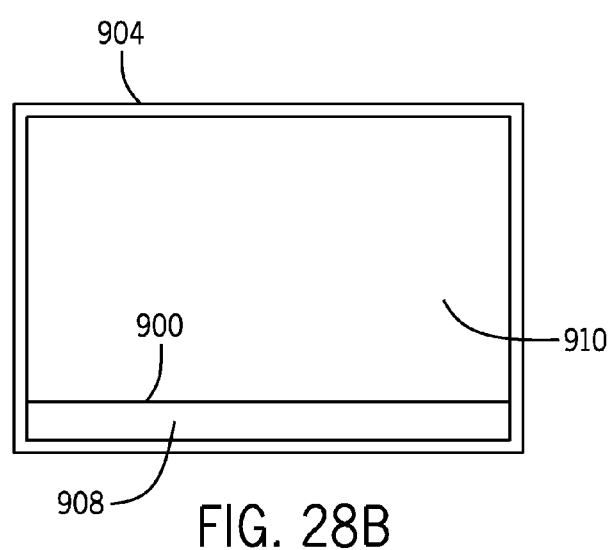
FIG. 28B is a top view of the mold shown in FIG. 28A.

Turning now to FIG. 28, a mold zone separator 900 is shown, which enables multi-zone molding. The product is formed on top of a product transfer plate 902 and then transferred on for curing. A product mold 904 has a mold cavity 906 into which the mold zone separator 900 is inserted and retracted. Mold zone separator 900 is supported by a transfer means (not shown) which locates the mold zone separator 900 above the mold cavity 906 prior to adding cementitious materials and removes mold zone separator prior to a ram head (not shown) being lowered onto cementitious materials in the filled mold 904 to provide forming force. Once mold zone separator 900 is inserted within the mold cavity 906, a facing mold cavity 908 and non-facing mold cavity 910 are created. Filling facing mold cavity 908 with cementitious facing material and filling non-facing mold cavity 910 with cementitious non-facing materials aids in producing a multi-zone cementitious product such as the product 100 shown in FIG. 1. Of course, more than one mold zone separator 900 may be used during multi-zone molding. Using more than one zone separator 900 may enable zone separation to be angled within the mold cavity such that some or all of the zone separators are not parallel to the direction of vibration and thus aid disruption of the boundary layer 106.

As is understood in the art, the embodiments described herein of the mold refer to one mold which is likely used as part of a larger mold having a plurality of cavities. The embodiments described here focus on only one such cavity but should not be taken to be limiting to one cavity molds only. Additionally, the zone separator 900 may take any shape, and the deposition of materials into the product mold 904 may be used to achieve facing zones 104 on any desired side of the product.

FIG. 29 shows how material may be supplied to a product mold 904 to achieve a multi-zoned cementitious product such as the product 100 shown in FIG. 1. A zoned feed carriage 920 is located relative to the product mold 904. The mold zone separator 900 is attached to the zoned feed carriage 920 and may extend from the zoned feed carriage 920 into the mold cavity 906. Zoned feed carriage 920 may contain two or more cementitious materials separated by a material supply zone separator 922 to thus provide a facing material supply cavity 924 and non-facing material supply cavity 926.

Figure 29A:
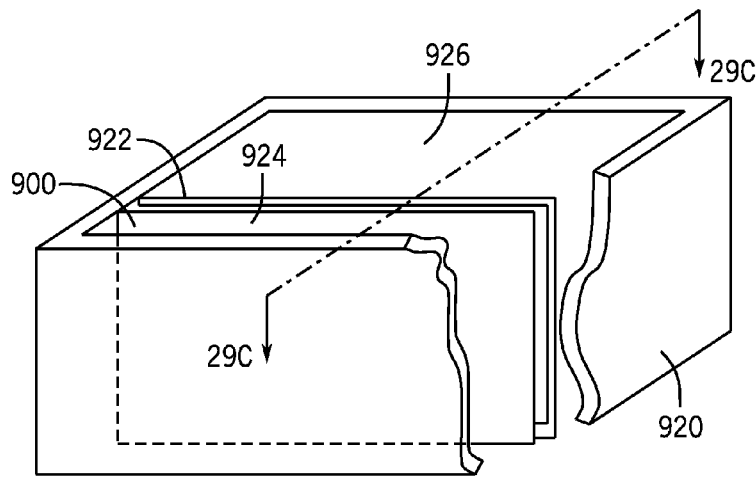
FIG. 29A is a perspective view of a zoned material supply system in accordance with the invention.
Figure 29B:
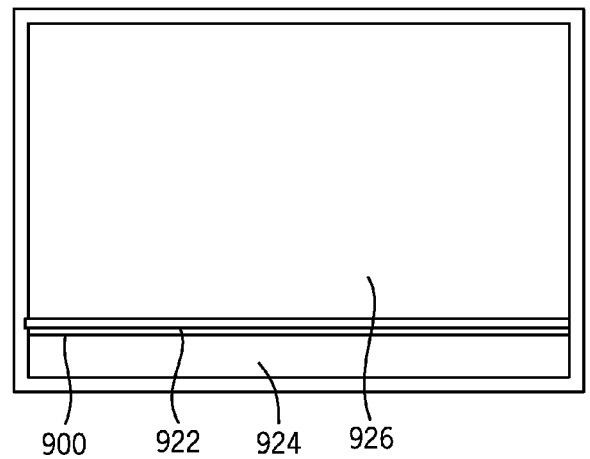
FIG. 29B is a top view of the zoned material supply system shown in FIG. 29A.
Figure 29C:
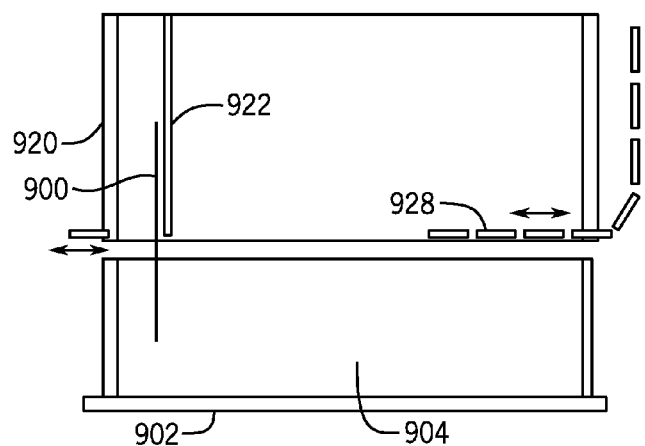
FIG. 29C is a section view of the zoned material supply system shown in FIG. 29A, taken generally along line 29C-29C.
Figure 30A:
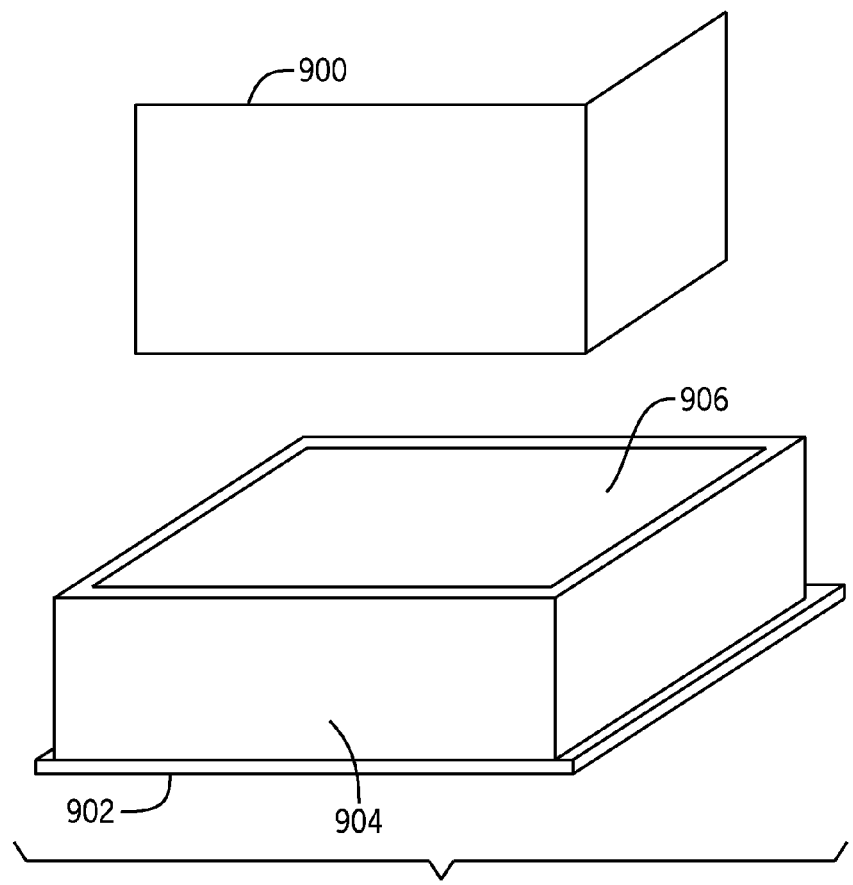
FIG. 30A is a perspective view of another embodiment of a mold in accordance with the invention.
Figure 30B:
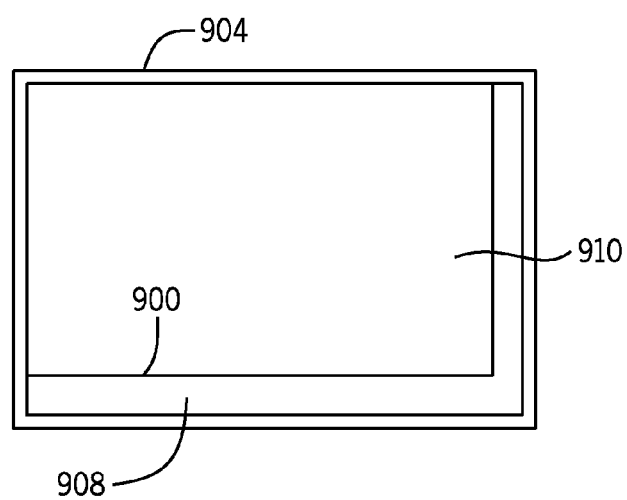
FIG. 30B is a top view of the mold shown in FIG. 30A.
Figure 31A:
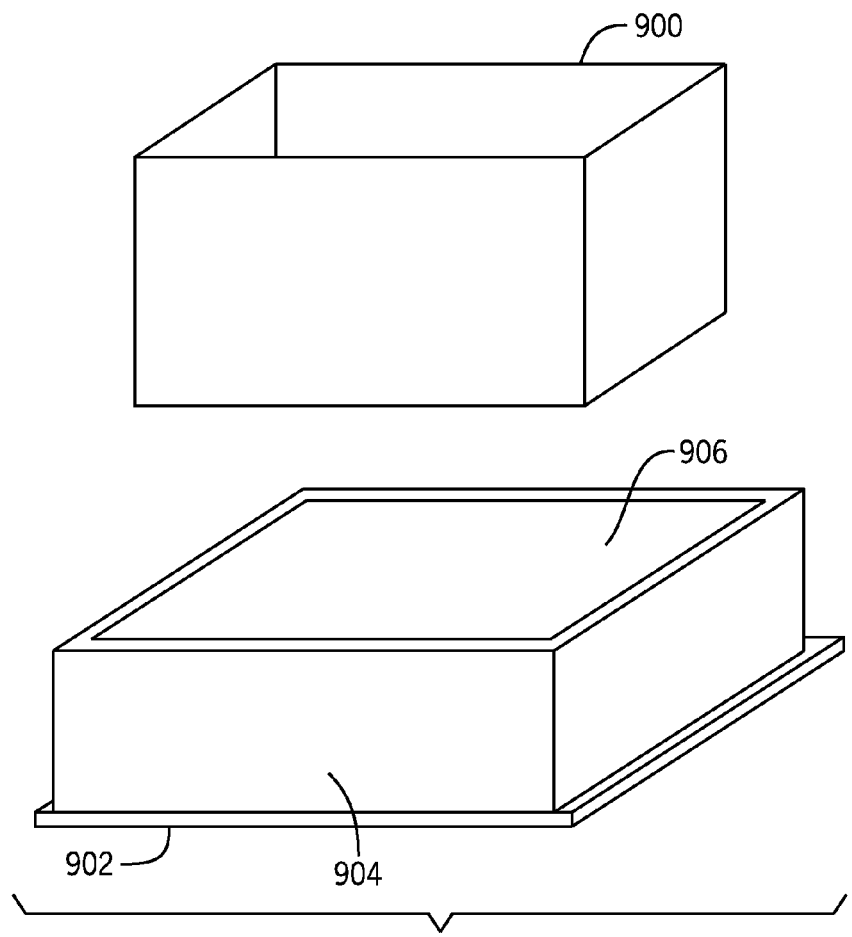
FIG. 31A is a perspective view of another embodiment of a mold in accordance with the invention.
Figure 31B:
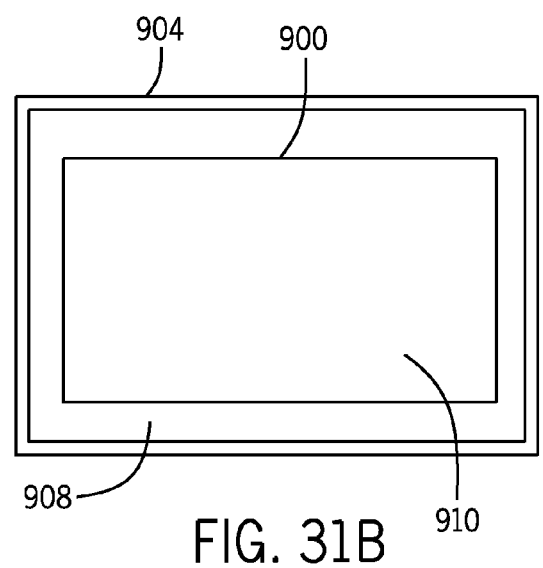
FIG. 31B is a top view of the mold shown in FIG. 31A.

The bottom of zoned feed carriage 920 may contain one or more material supply cavity seals 928 to enable the release, controlled release, and/or stoppage of one or more cementitious material from the system. Material supply cavity seals 928 may also be used to level cementitious materials to the top of the mold. Additionally, top material supply cavity seals (not shown) may enable the input, controlled input, and/or stoppage of one or more cementitious material into the system. Material supply cavity seals 928 are shown as linear in nature; they may also be louvers, shingles, and/or rotational in nature. FIGS. 30A, 30B, 31A and 31B show alternative configurations of the mold zone separator 900 to achieve products as described previously. FIGS. 29A-29C show a facing zone 104 on a front face, FIGS. 30A and 30B show an "L" shaped facing zone 104, and FIGS. 31A and 31B show a facing zone 104 that surrounds base zone 102. However, any bottom, side, and/or top of a zone molded product may have a facing side without departing from the invention.

Mold zone separator 900 may be used by inserting the mold zone separator into the mold and filling the mold cavity until approximately 50%-70% of the cavity is filled with undensified zone materials. Placing mold zone separator 900 at the bottom of the mold cavity provides superior visual boundary line definition but may limit initial zone materials intermingling as zone materials enter the mold cavity in an undensified state. This balance between visual boundary line definition and zone materials intermingling continues as zone separator 900 is withdrawn to the top of the mold cavity. To encourage zone materials intermingling, zone separator 900 could be initially placed in a range from near the bottom of the mold cavity up to 50% to 70% of the distance above the cavity bottom and then withdrawn near or above the top of the mold cavity as additional materials enter the mold cavity. Although this would increase zone materials intermingling it would also reduce visual boundary definition.

Figure 32:
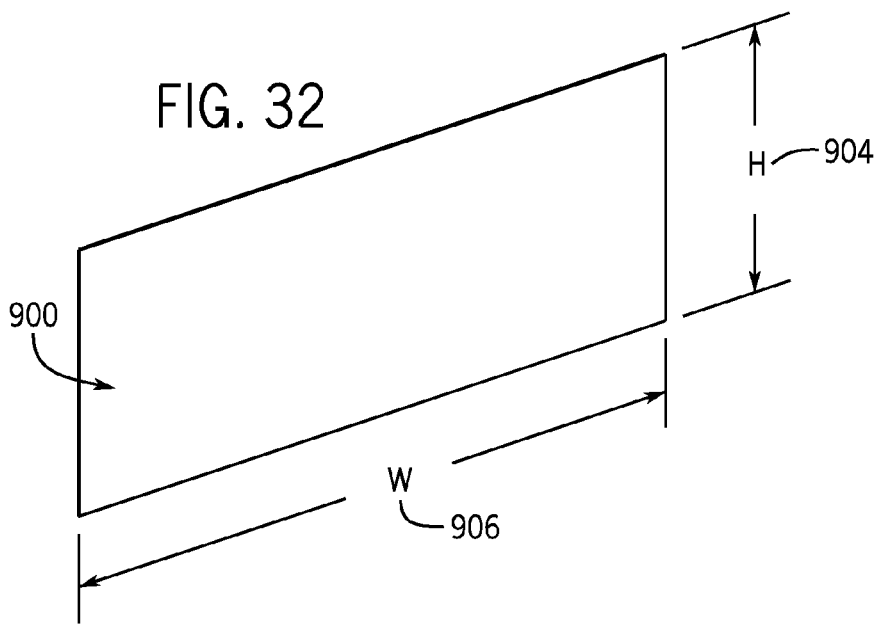
FIG. 32 is a perspective view of one embodiment of a mold zone separator in accordance with the invention.

FIGS. 32 to 35 show alternative configurations of mold zone separators. The embodiments shown may enhance zone material bonding at the boundary layer by allowing material to intermingle while the mold zone separator is inserted into the mold. FIG. 32 shows mold zone separator 900 having a solid panel having height 904 and width 906 to fit within mold cavity. In the embodiment shown, the mold zone separator 900 is made of corrosive resistant sheet metal, corrosive resistant metal, or plastic such as polypropylene, but any suitable material may be used without departing from the invention.

Figure 33:
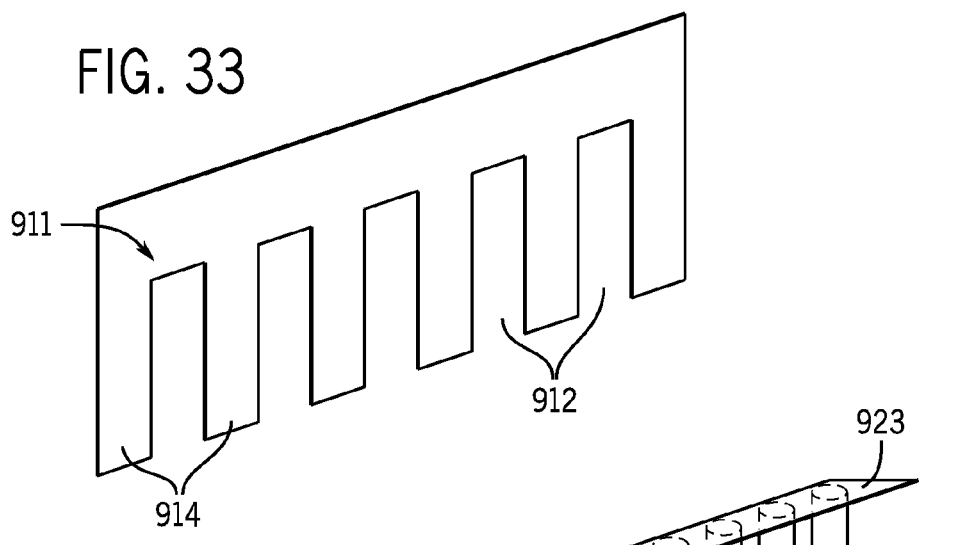
FIG. 33 is a perspective view of one embodiment of a mold zone separator in accordance with the invention.

FIG. 33 shows another embodiment of a mold zone separator 911. Mold zone separator 911 enhances zone material bonding by encouraging intermingling of material on either side of the mold zone separator prior to significant material densification. As shown, the mold zone separator 911 has one or more slot openings 912. As material enters the mold cavity 906, the slot openings 912 allow material on either size of the mold zone separator 911 to intermingle. Additionally, as the mold zone separator 911 is withdrawn from the mold cavity 906, the slot openings 912 may encourage increased comingling of material on either side of the mold zone separator both prior to and after the densification process. Visual boundary line definition is maintained to a large degree by the solid sections 914 of mold zone separator 911. Although the solid sections 914 are shown evenly spaced along the length of the mold zone separator 911, solid sections may be placed as desired to selectively achieve boundary line definition.

After initially placing mold zone separator 910 at or near the bottom of the mold cavity 906 the mold zone separator may then be raised to a position at or near the top of the mold cavity either prior to mold vibration or during initial vibration to further encourage the combination of visual boundary definition sections and sections of increased material intermingling.

Figure 34:
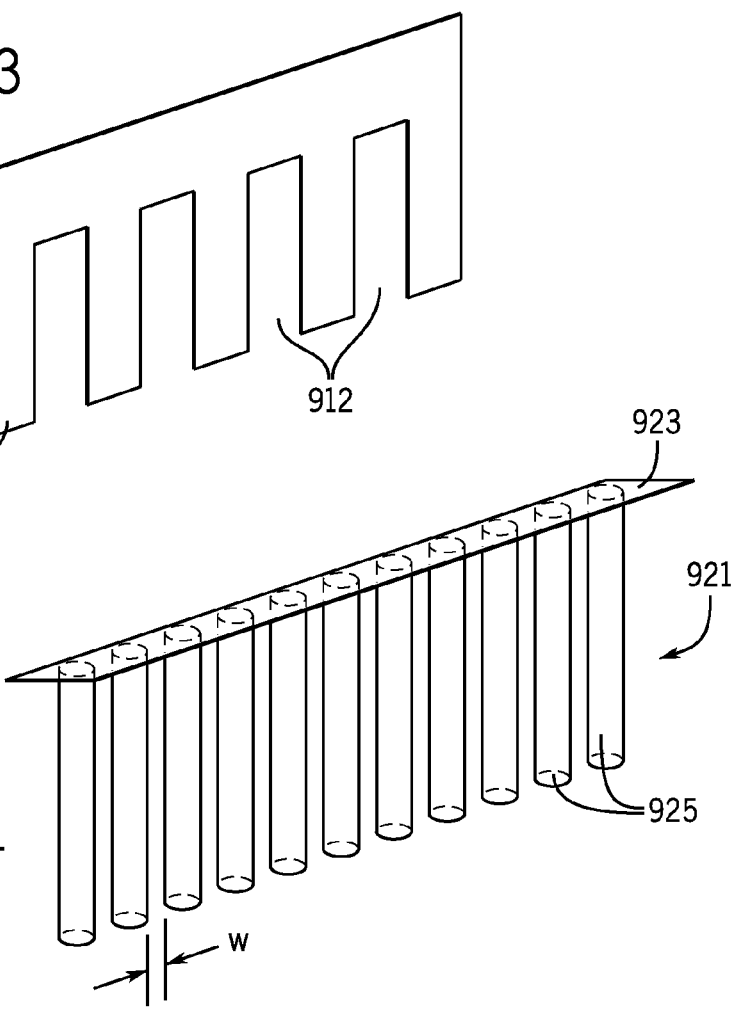
FIG. 34 is a perspective view of one embodiment of a mold zone separator in accordance with the invention.

FIG. 34 shows yet another embodiment of a mold zone separator 921 in accordance with the invention. Mold zone separator 921 includes a support base 923 attached to one or more separator rods 925. Like mold zone separator 911 described previously, open portions of mold zone separator 921 allow increased comingling of materials as they enter the mold cavity 906. The separator rods 925 provide increased visual boundary definition. In the embodiment shown in FIG. 34, the separator rods 925 are spaced evenly along the support base 923, and are all of equal length.

Figure 35:
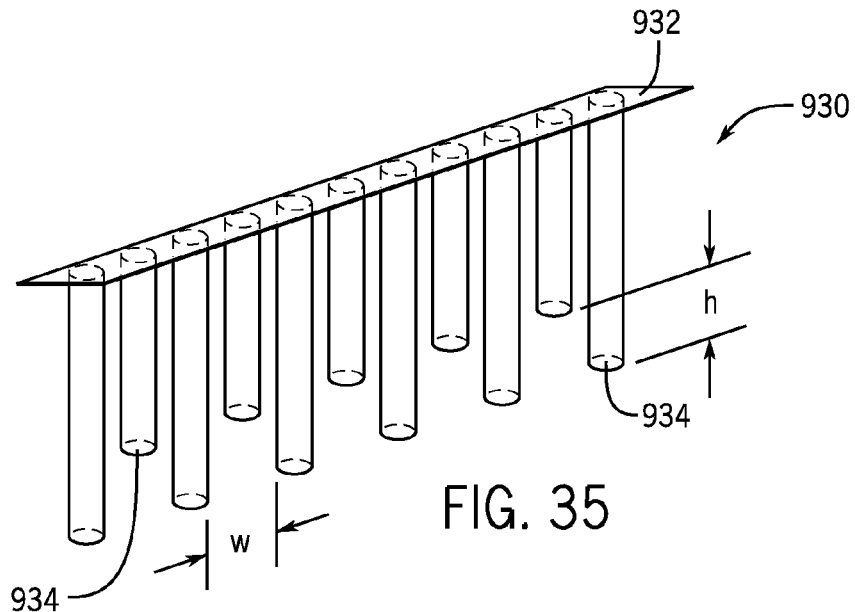
FIG. 35 is a perspective view of one embodiment of a mold zone separator in accordance with the invention.

FIG. 35 shows another embodiment of a mold zone separator 930 in accordance with the invention. Mold zone separator 930 has a very similar construction to mold zone separator 921, but mold zone separator 930 includes a plurality of separator rods 934 of varying lengths attached to a support base 932. Of course, alternative embodiments of mold zone separators may be used having separator rods or varying lengths, diameters, and spacing.

Each of the previously described embodiments of a zone mold separator 911, 921, 930 include openings 914 or space between rods. The proportion of open space to closed space in each mold zone separator 911, 921, 930 will be determined by the characteristics of specific uncured zero slump concrete and/or uncured slump concrete via aggregates used, cement used, moisture levels used, and additive used to form a given product. Other variables to be taken into consideration when selecting a mold zone separator to maximize material intermingling while maintaining desired boundary definition include but are not limited to: initial zone separator position when material enters the mold cavity 906, the timing of when the mold zone separator is retracted from the mold cavity, and the timing and duration of densification vibration.

Figure 36:
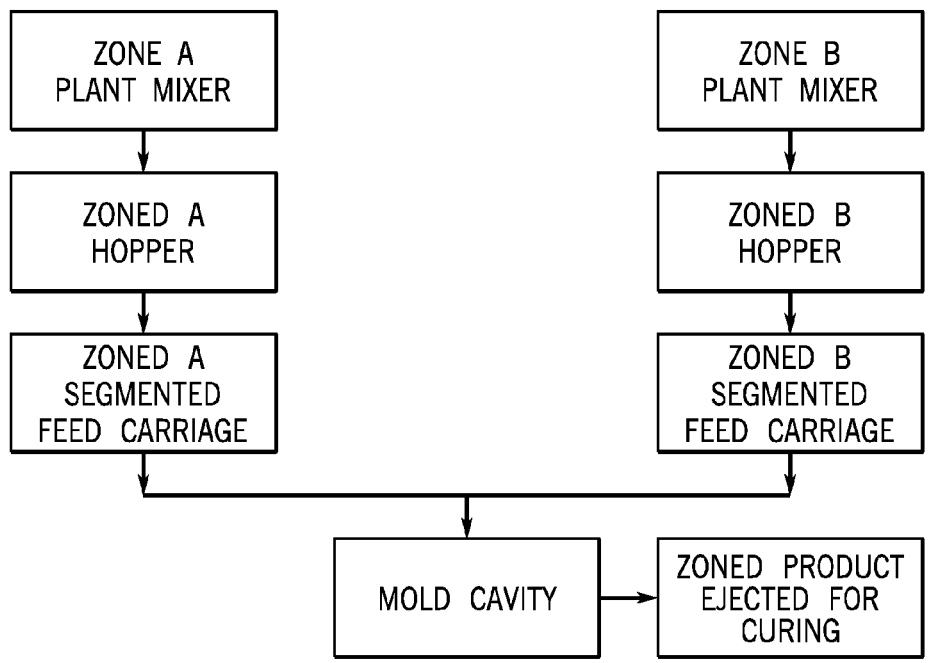
FIG. 36 is a flowchart showing the operation of a zone mold machine having two hoppers and two feed carriages.

The following is an example of two or more cementitious materials supplied approximately simultaneously to zoned mold cavities 906 with materials entering the mold cavity via gravity, agitation, vibration, and/or any other suitable method. FIG. 36 is a flow chart showing one embodiment of a mold zoning process starting from the mixing stage, wherein two zones of material are used. As shown, to achieve a zoned product having two distinct zones, zone A and zone B, using a molding process, material for each zone is mixed separately. Material from each mixer enters its own hopper before being deposited into a segmented feed carriage. Hopper gates control when each hopper opens and for how long to control the amount and flow rate of material into the segmented feed carriage. Finally, material from the segmented feed carriage is deposited into the mold cavity where it is molded to a final shape before being ejected from the mold.

Figure 37:
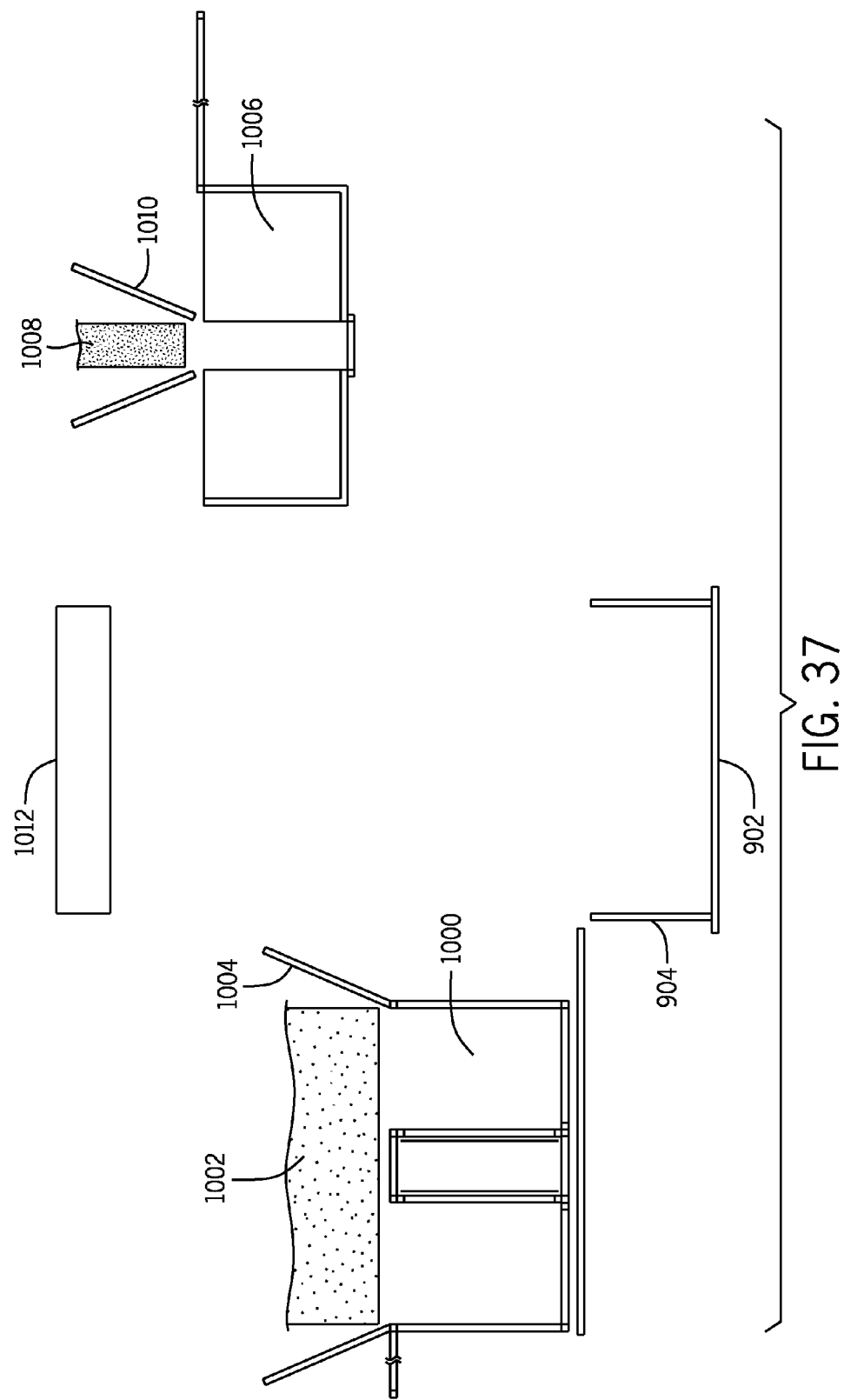
FIG. 37 is a schematic view of a multi-zone mold machine in accordance with the invention showing two hoppers, two feed carriages, a mold, and a ram.

Turning now to FIG. 37, the mold zoning process includes a product transfer plate 902, on top of which the product is formed, and then transferred for curing. The process further includes a product mold 904, a first feed carriage 1000 which supplies a first cementitious material 1002 from a first hopper 1004 to the product mold, and a second feed carriage 1006, which supplies a second cementitious material 1008 from a second hopper 1010 to the mold 904. Vibration and/or vacuum means aids in materials densification, and ram head 1012 aids product forming, providing product forming force. Ram head 1012 then ejects green product from the mold 904.

Figure 38:
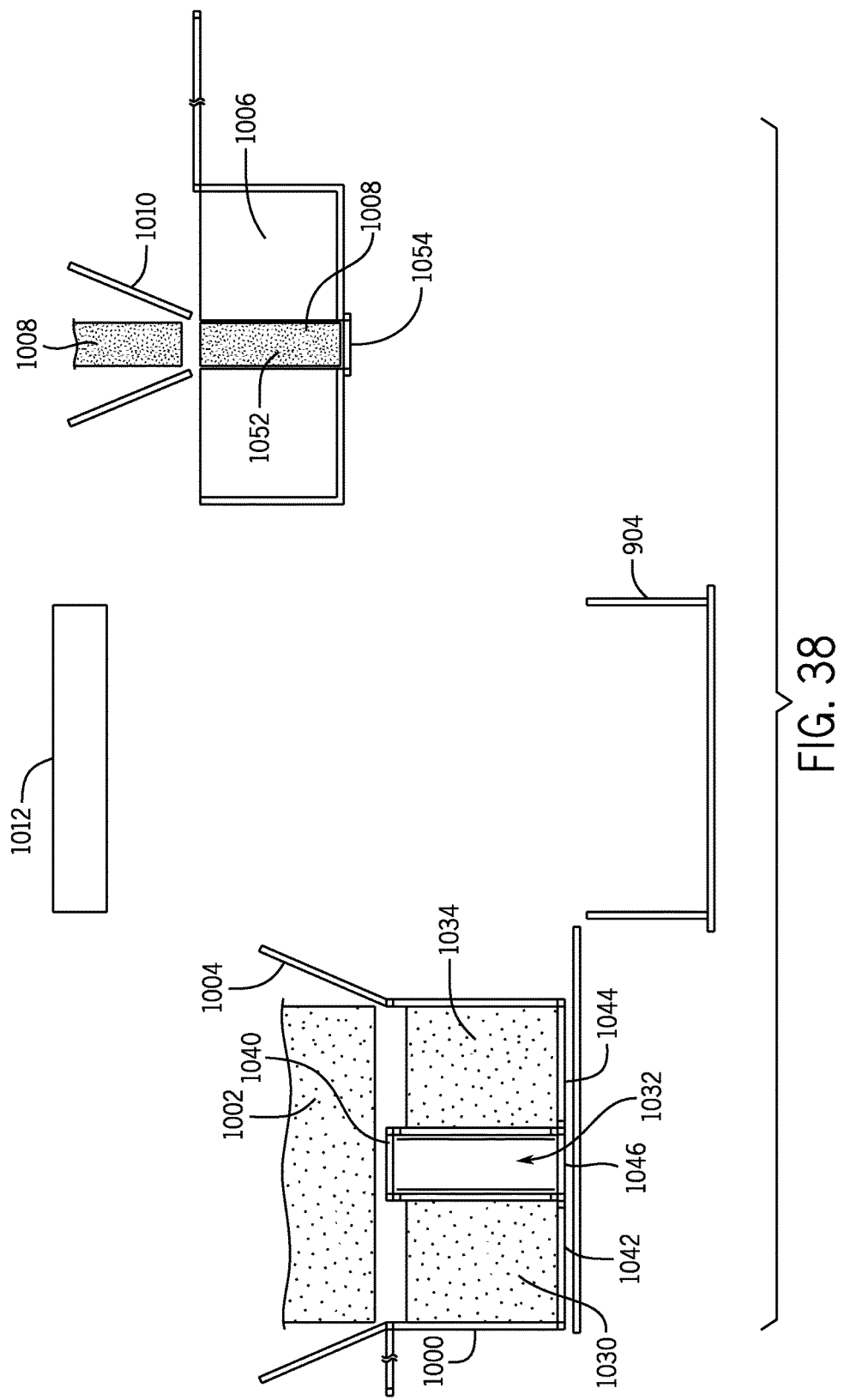
FIG. 38 is another schematic view of the multi-zone mold machine of FIG. 37.

FIG. 38 shows the filling of feed carriage material cavities. In the embodiment shown, zoning of facing material 1008 is desired in the center of the mold 904 such that the non-facing material 1002 is divided in two separate volumes. First feed carriage 1000 is divided or "segmented"

into first, second, and third feed carriage cavities 1030, 1032, 1034. First feed carriage cavity 1030 is filled with non-facing material 1002 via gravitational force, agitation within the feed carriage (not shown), and/or vibration on the feed carriage 1000. Second feed carriage cavity 1032 is not filled with non-facing material 1002 because a first feed carriage cavity seal 1040 prevents non-facing material 1002 from entering second feed carriage cavity, and third feed carriage cavity 1034 is filled with non-facing material 1002 via gravitational force, agitation within the feed carriage, vibration of the feed carriage, and/or any other suitable method. Non-facing material 1002 is prevented from leaving first and third feed carriage cavities 1030, 1034 respectively by second and third feed carriage cavity seals 1042, 1044. Also second feed carriage cavity 1032 is sealed by fourth feed carriage cavity seal 1046.

Similarly, second feed carriage 1006 contains a fourth feed carriage cavity 1052 which is filled with facing material 1008 via gravitational force, agitation within the feed carriage, and/or vibration of the feed carriage. Facing material 1008 is prevented from leaving fourth feed carriage cavity 1052 by fifth feed carriage cavity seal 1054.

In the embodiment shown, the feed carriages 1000, 1006 are filled by material that flows from a hopper 1004, 1010 by gravitational force. Alternatively, material may be forced into the feed carriages 1000, 1006 by an auger or other suitable means. Using an auger, for example, allows a more precise amount of material flow into the feed carriages 1000, 1006, which may result in more consistent products.

Figure 39:
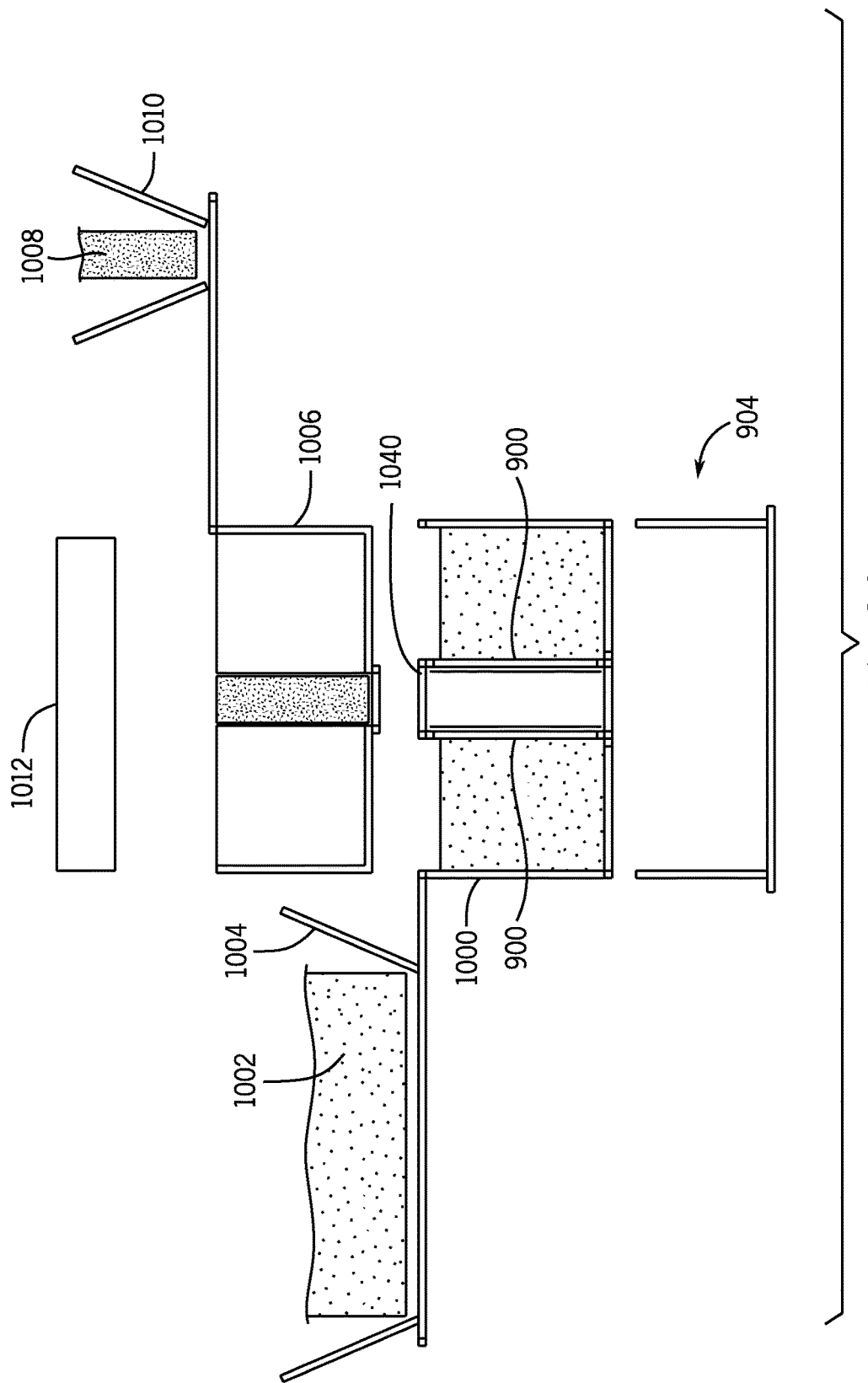
FIG. 39 is another schematic view of the multi-zone mold machine of FIG. 37.

FIG. 39 shows the extension of feed carriages 1000, 1006 over the mold 904. As the feed carriages 1000, 1006 move over the mold 904, first and second hoppers 1004 and 1010 are sealed in a manner common in the industry that prevents material from falling out of the hoppers as the carriages move into position over the mold.

One or more zone separator(s) 900 aids in creating zoned volumes and boundary layer bonding and extends from a device which is able to traverse over the mold 904 (as shown in this embodiment within the lower feed carriage), then extends the zone separators into the mold, retracts the zone separators from the mold, and then is able to traverse away from the mold. Extension/retraction means of zone separators 900 is not shown but may be mechanical, electro-mechanical, and/or pneumatic in nature. Of course, any other suitable method for extending or retracting the zone separators 900 may be used without departing from the invention.

Figure 40:
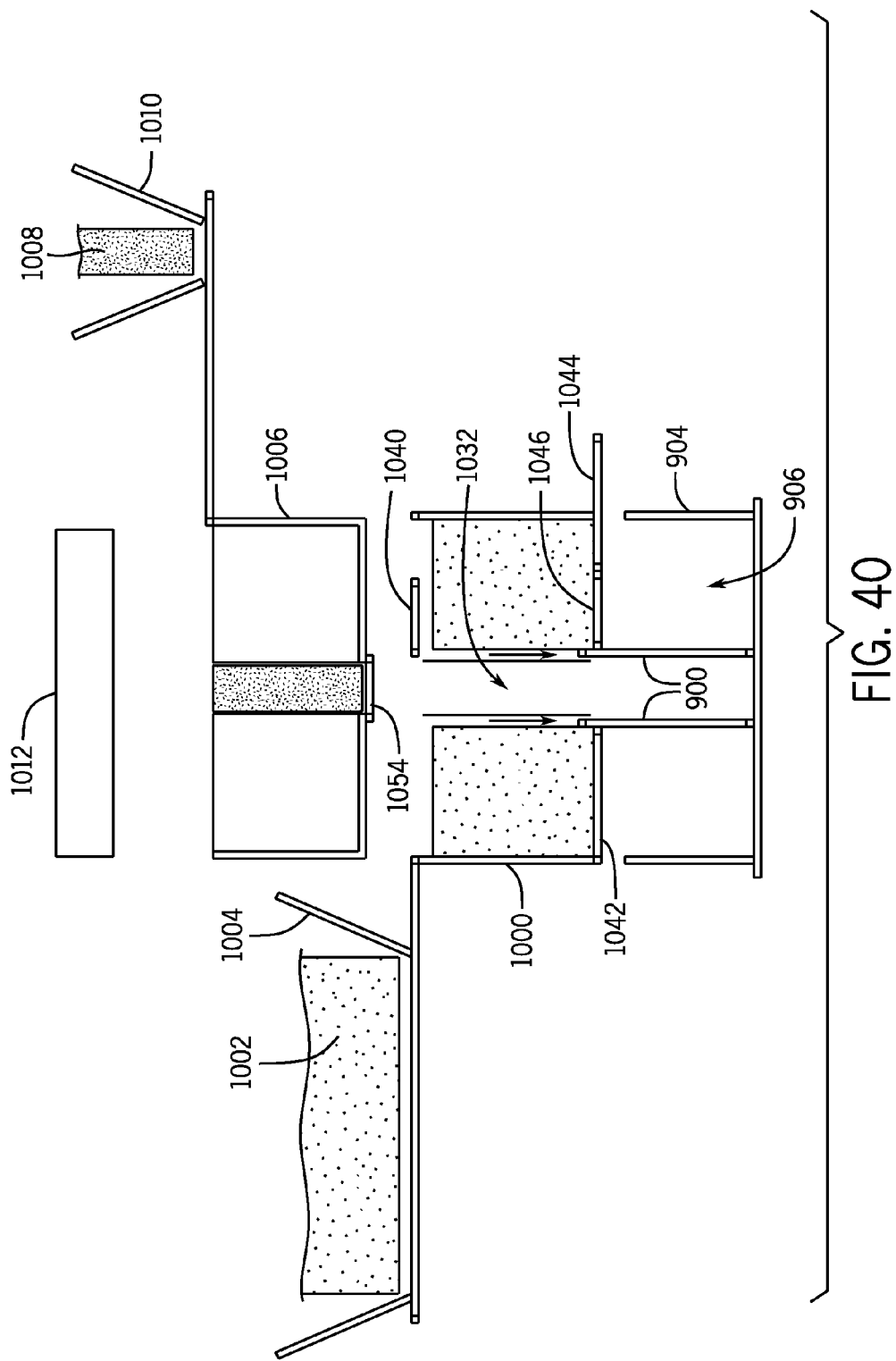
FIG. 40 is another schematic view of the multi-zone mold machine of FIG. 37.

FIG. 40 shows the zone separators 900 extending to the bottom of the mold cavity 906, but they may also extend within mold cavity short of the bottom of the mold cavity. Also first feed carriage cavity seal 1040 enables facing material 1008 to enter second feed carriage cavity 1032 and fourth feed carriage cavity seal 1046 (shown in retracted position) enables facing material to enter the mold cavity 906. In general, feed carriage seals have a translational and/or rotational motion and are manipulated by mechanical, electro-mechanical, and/or pneumatic in nature (not shown), but other means of actuation may be used without departing from the invention.

Figure 41:
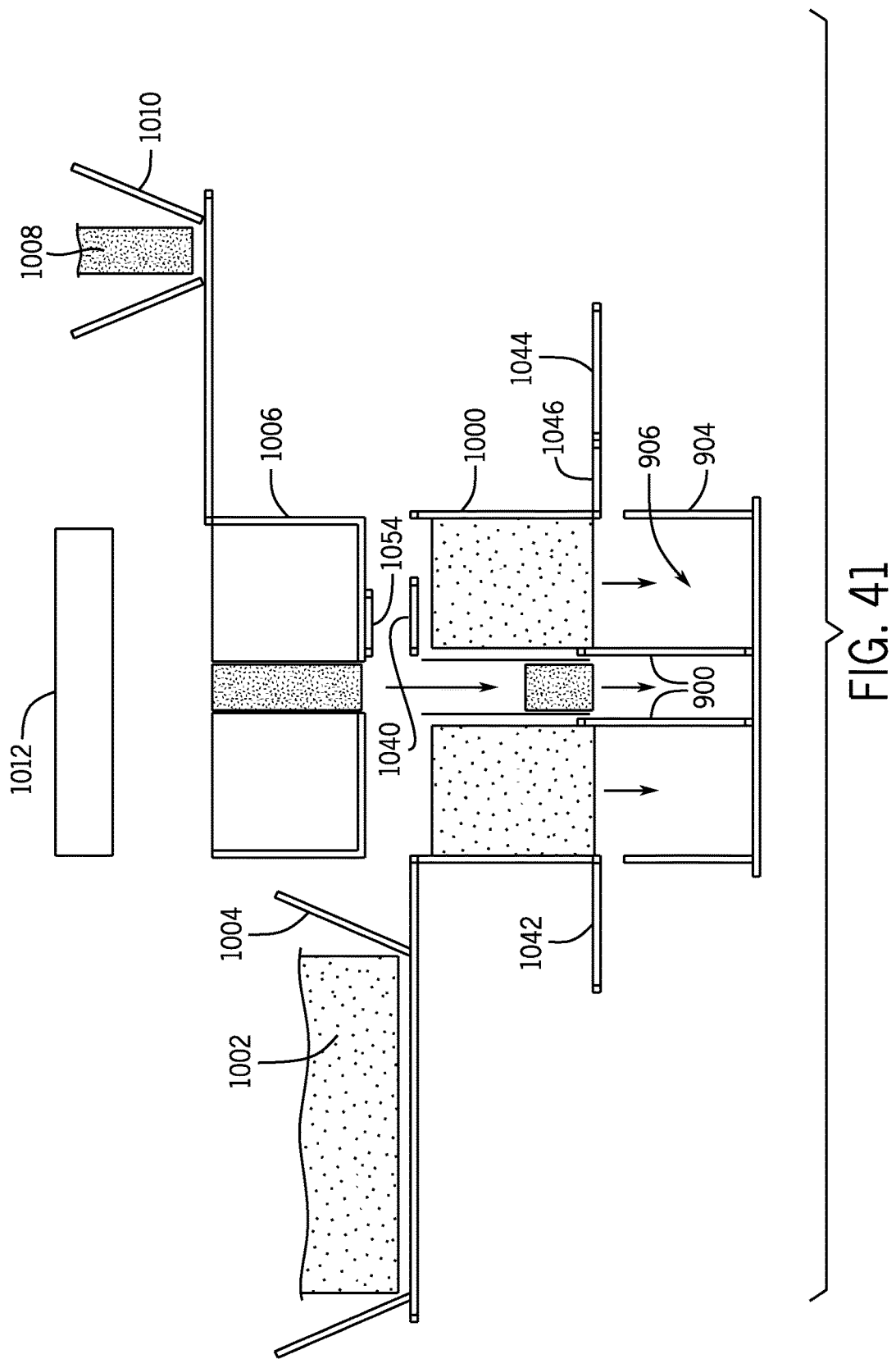
FIG. 41 is another schematic view of the multi-zone mold machine of FIG. 37.

FIG. 41 shows second feed carriage cavity seal 1042 and third feed carriage cavity seal 1044 in retracted positions, which enables non-facing material 1002 to enter the mold cavity 906. Similarly, fifth feed carriage cavity seal 1054 is retracted, which enables non-facing material 1002 to enter the mold cavity 906. It should be noted that less than fully unsealed feed carriage cavity openings may be utilized to control material supply rates to the zoned mold cavities.

Figure 42:
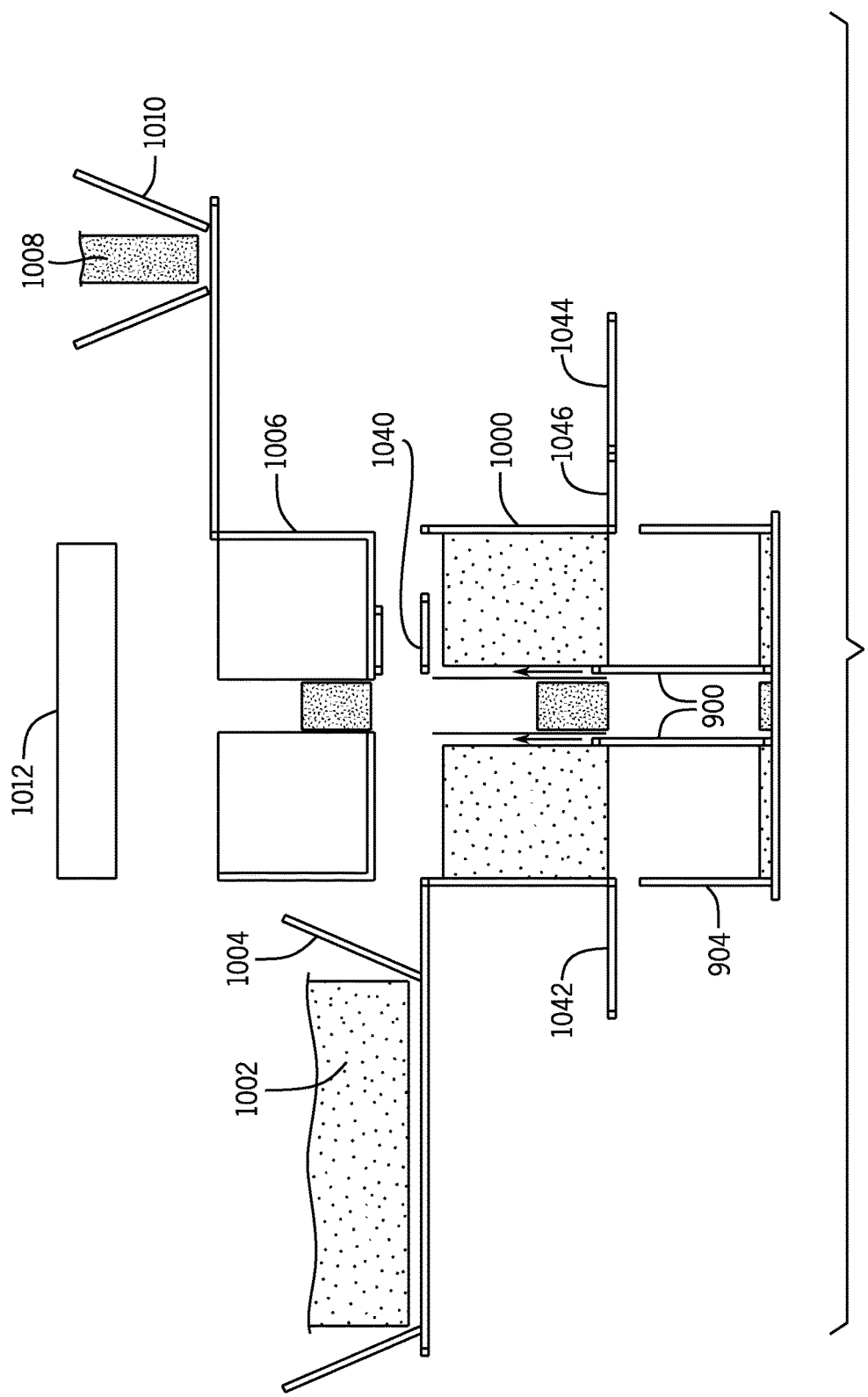
FIG. 42 is another schematic view of the multi-zone mold machine of FIG. 37.

FIG. 42 shows that at or about the time both materials 1002, 1008 enter the mold 904, the zone separators 900 may retract in a controlled manner that is consistent with: the viscosity of the mixture(s), vibration frequency, amplitude, and duration, less than fully unsealed feed carriage cavity openings, agitation of materials, material supply rates to the zoned mold cavities, and material levels in the zone mold cavities. The controlled retraction of zone separators 900 enhances boundary 105 disruption to form boundary layer 106 and bonding of materials 1002, 1008.

Placing the zone separators 900 at or near the bottom of the mold cavity 906 initially creates a defined separation of materials on the future exterior surface of the product being created. Once small amounts of materials have been deposited into the mold cavity 906, zone separator 900 can be refracted, if desired, to a height above the level of material(s) present in the mold cavity. This technique aids boundary disruption by having the materials intermingle prior to being exposed to significant vibration and/or forming force and consequent material densification to form a boundary layer between the materials. In other words, the materials should preferably be at least partially in contact with each other in a low density state before being exposed to vibration and/or forming force to achieve intermixing and densification together.

In the present example, two or more materials should be approximately at the same level with each respect to other. It should also be noted that vibration of the mold can vary from no vibration—if materials can enter the zone mold cavities without vibration, a small amount of vibration—to aid the zone mold cavities filling process, and a large amount a vibration—to enhance the zone mold cavities filling process.

Aberrations in material filling and boundary layer disruption can be offset by raking the material surface(s). Raking may be achieved by including prongs (not shown) protruding from the zone separator 900 into either one or all materials and in conjunction with the zone separators oscillating up and down, with a general retraction motion, can both break up any cementitious film (thus exposing aggregate) and mechanically intermix materials.

Figure 43:
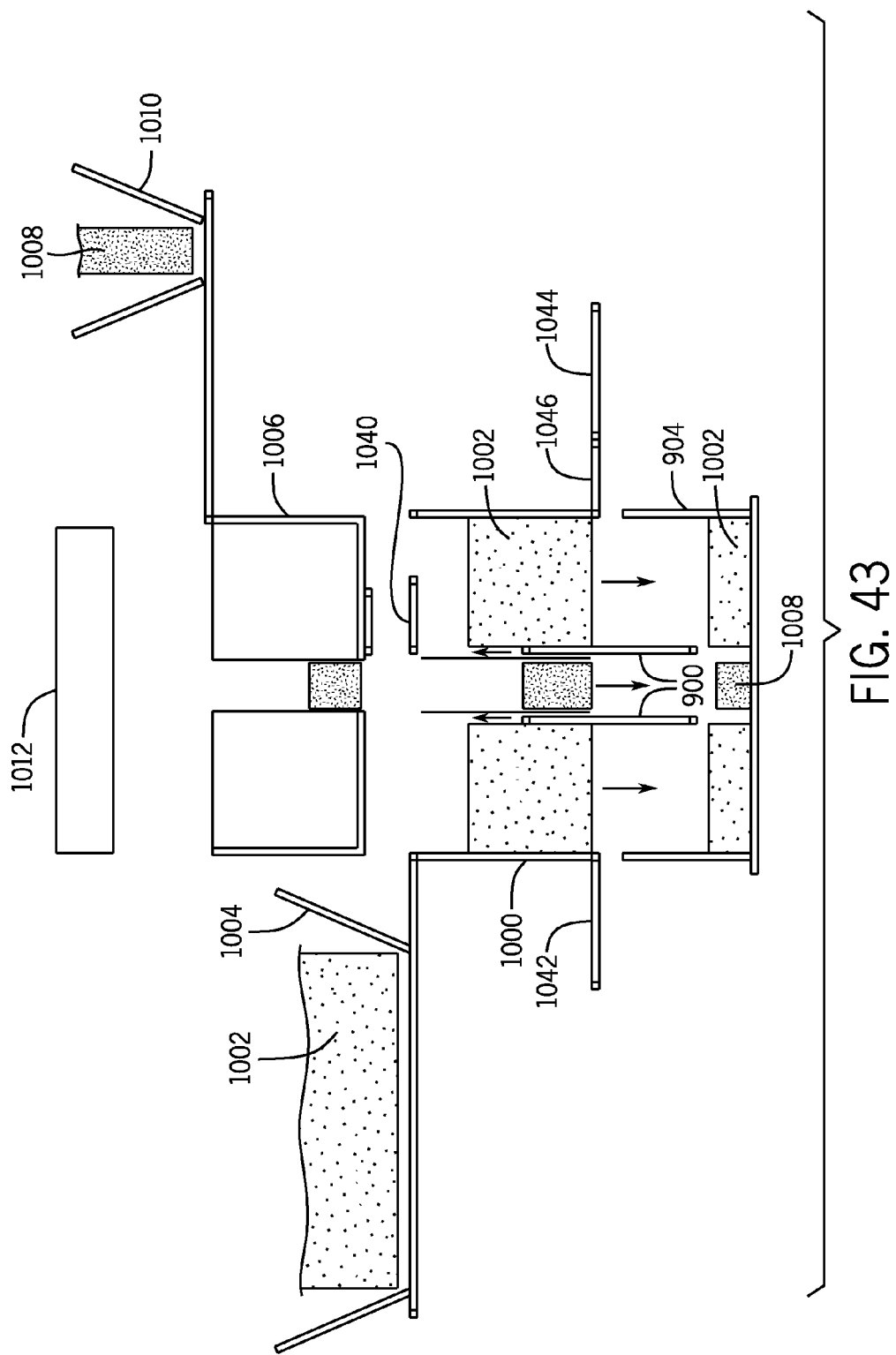
FIG. 43 is another schematic view of the multi-zone mold machine of FIG. 37.

FIG. 43 shows the zone separators 900 retracting ahead of new materials entering the mold cavity 906 and stopping at or near the top of the mold 904 or the future height of vibrated densified materials in the mold. Less dense material(s) from the feed carriages 1000, 1006 are added as materials become denser beneath them in the vibrating mold 904.

Figure 44:
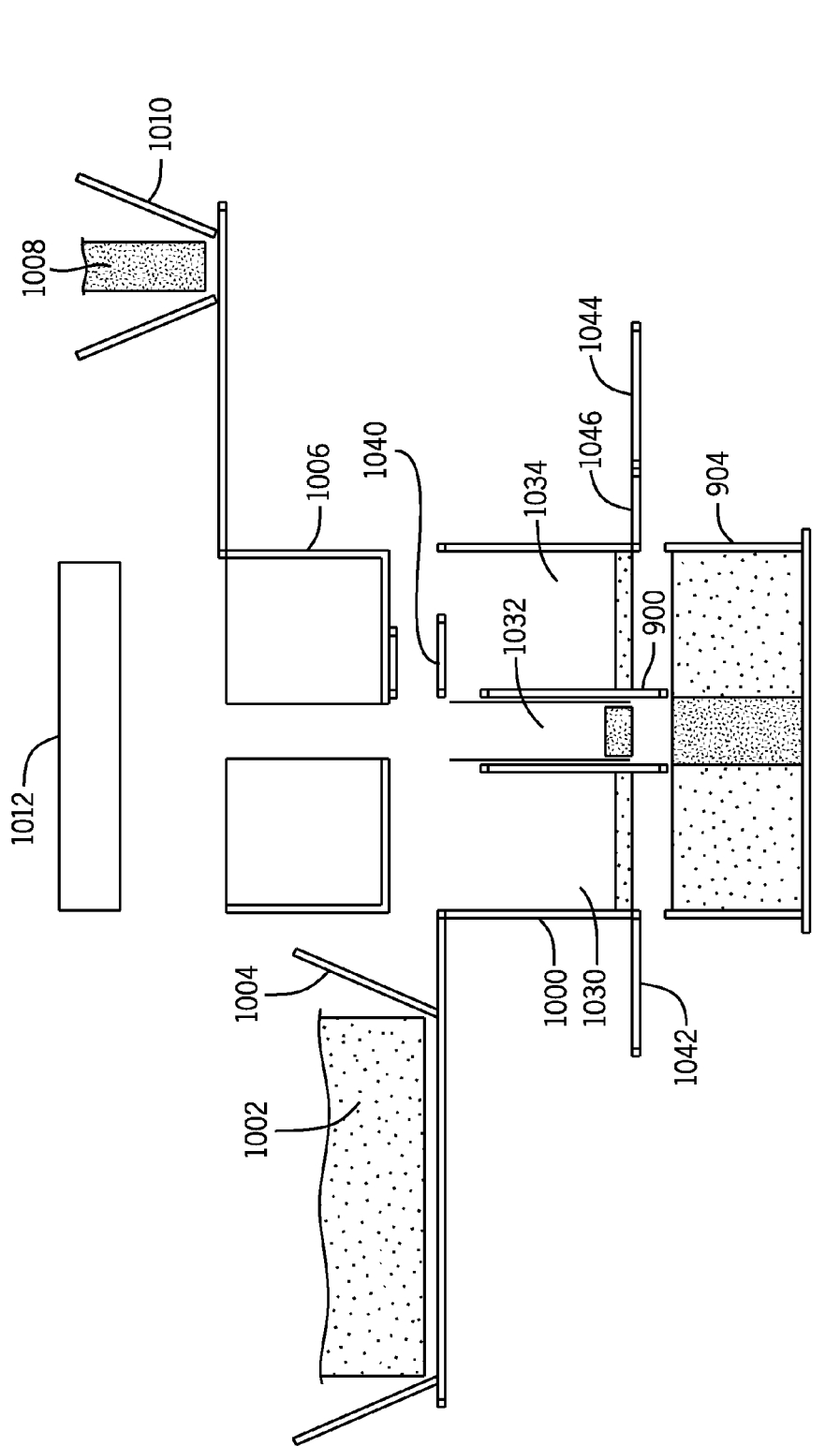
FIG. 44 is another schematic view of the multi-zone mold machine of FIG. 37.

FIG. 44 shows the approximate end of mold material(s) filing process. Here the zone separators 900 are located approximately at the future top of the product 100 or top of the mold as densified by vibration. Here less dense materials from the feed carriages 1000, 1006 moves into the mold cavity 906 as materials within the mold cavity go through final densification and material filling. There may be some clearance between the top of mold 904 and the bottom of feed carriage 1000 and there may also be some excess material left on top of mold 904 that is scraped off the mold as the feed carriage 1000 moves back into position under hopper 1004. It is necessary, therefore to prevent intermingling of materials 1002, 1008 at the top of mold 904 and material within each feed carriage cavity 1030, 1032, 1034 as the feed carriage 1000 retracts.

Figure 45:
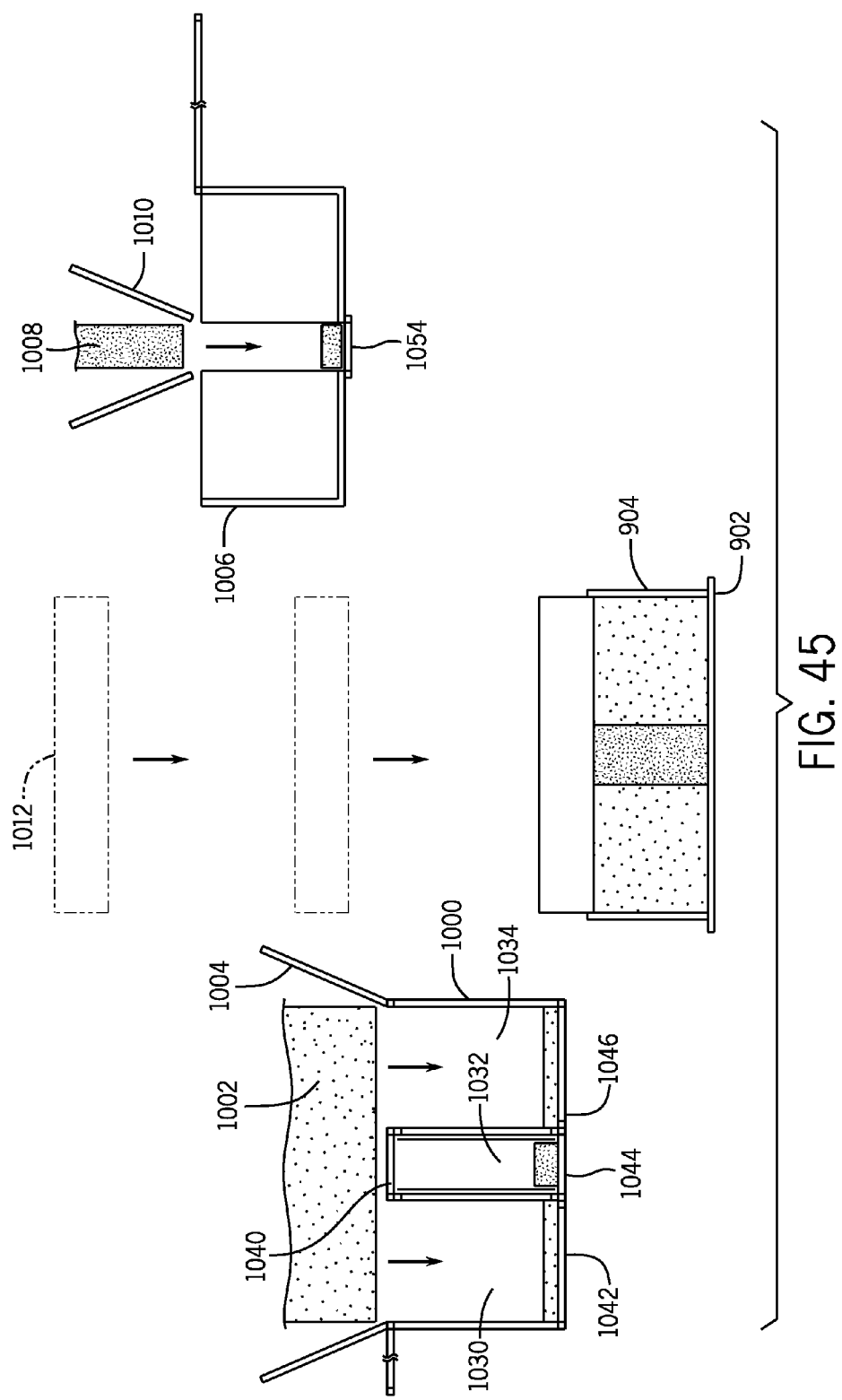
FIG. 45 is another schematic view of the multi-zone mold machine of FIG. 37.

As shown in FIG. 45, after the materials 1002, 1008 are deposited into the mold 904, feed carriage cavity seals 1042, 1044, 1046 close, and the feed carriages 1000, 1006 return to positions under their respective hoppers 1004, 1010 and ram head 1012 lowers onto the mold to provide forming force. The forming force is typically completed in conjunction with vibration of the mold. While the forming force is being applied to the mold 904, materials 1002, 1008 are being resupplied from hoppers 1004, 1010 to feed carriages 1000, 1006 so that the mold may be filled again.

Figure 46:
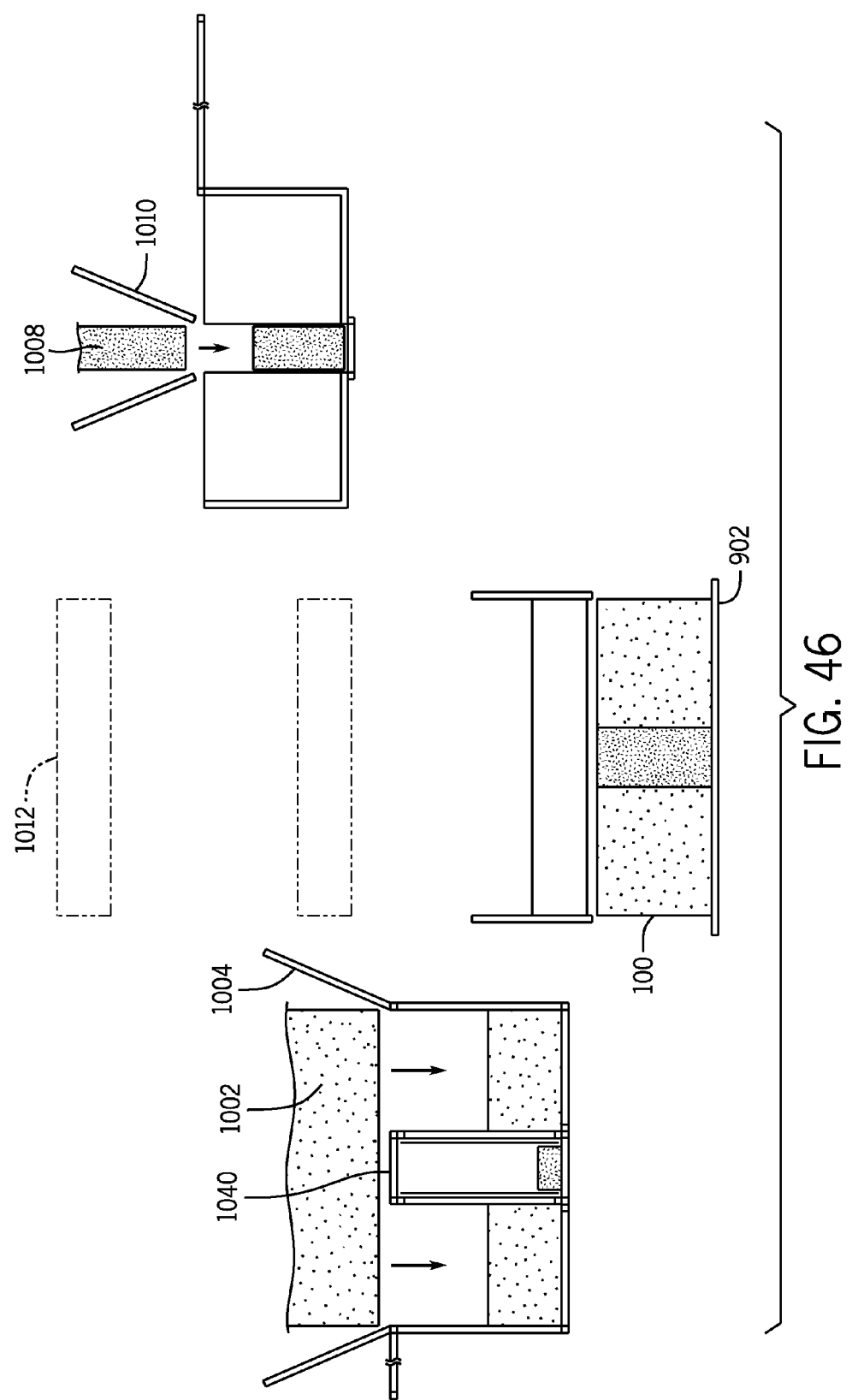
FIG. 46 is another schematic view of the multi-zone mold machine of FIG. 37.

Turning now to FIG. 46, after the forming force has been applied, the transfer plate 902 descends (relative to the mold) as the ram head 1012 ejects the formed green product from the mold. Next, the ram head 1012 retracts and a new transfer plate is inserted below the bottom of the mold. Meanwhile, the just formed green product moves to one or more curing area.

In an alternative embodiment, a mold may have a permanent bottom instead of a bottom created by the addition of a transfer plate. A mold with a permanent bottom likely includes an ejection plate to raise the formed product out of the mold that is placed in the mold cavity prior to filling and may also be utilized to transfer the product once the product is ultimately ejected from the mold.

Figure 47:
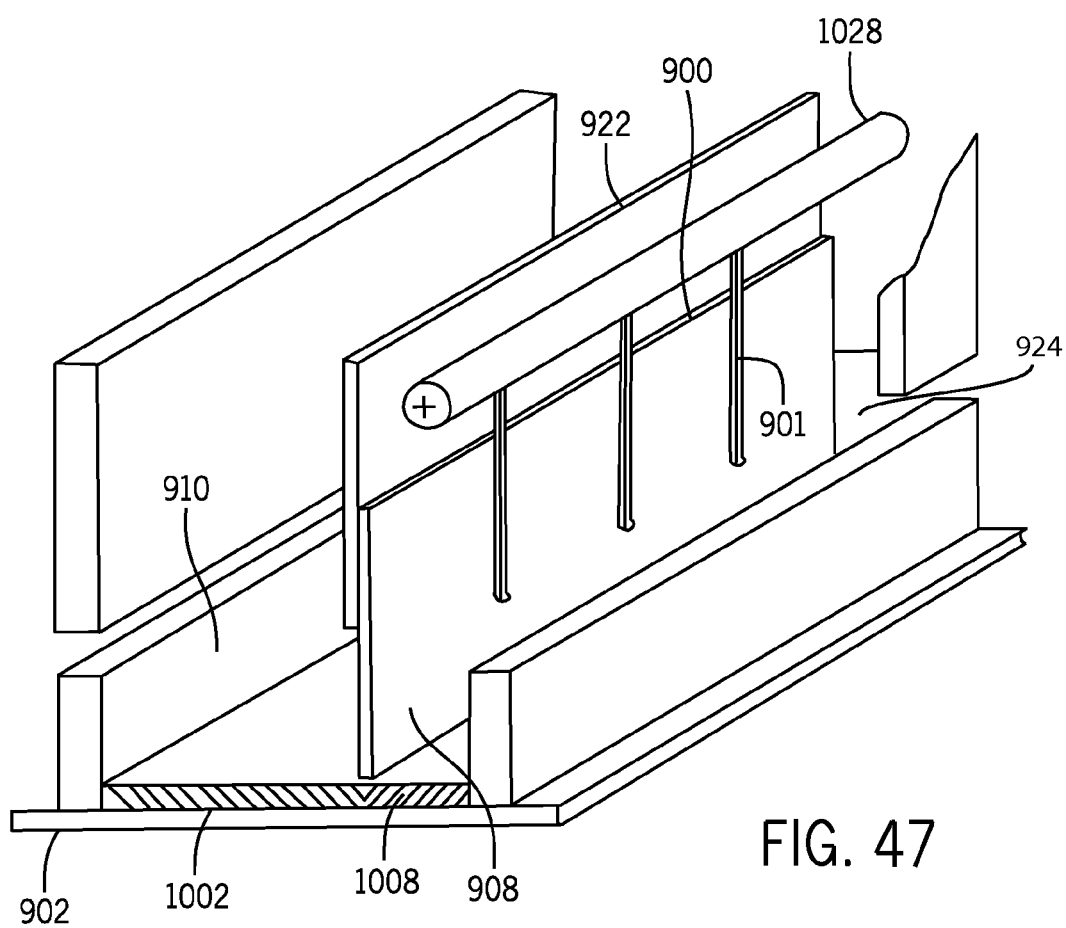
FIG. 47 is a perspective view of an agitator in accordance with the invention.

Agitators may be used to aid in the flow of materials 1002, 1008 from the carriages 1000, 1006 into the mold cavity 904. FIG. 47 shows detail of an agitator within the facing material supply cavity 924. The product is being formed on product transfer plate 902 within mold cavity 906. Within the mold 904, non-facing material 1002 is separated from facing material 1008 by zone separator 900 which extends and retracts into the mold cavity 906. In the embodiment shown, agitation of facing material 1008 is achieved through linear and/or orbital motion of an agitator 901 (linear shown). The agitator(s) 901 aids the entry of facing material 1008 from the facing material supply cavity 924 into facing mold cavity 908. Agitators may be similarly used with non-facing material from the non-facing material supply cavity 926 to aid entry of non-facing material into the non-facing mold cavity 910.

Figure 48E:
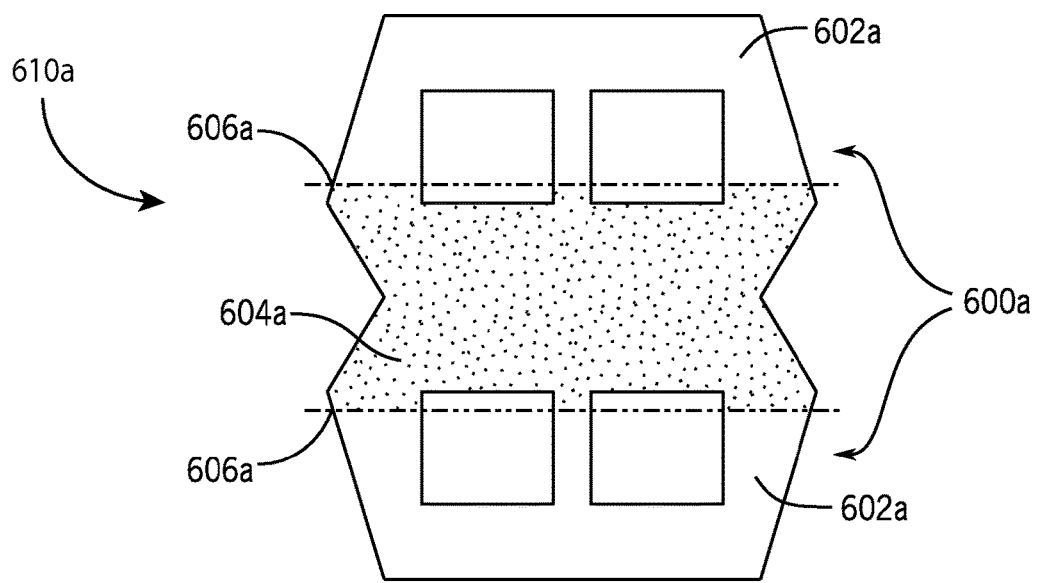
FIGS. 48E-F are top views of various embodiments of multi-zone split retaining wall blocks in accordance with the invention.

Turning now to FIGS. 48A-48F, six types of commonly available products molded on existing mold machines showing how each could be molded with multiple zones of material are shown. A common type of mold is used that produces a product capable of being split into two retaining wall blocks. By splitting two blocks molded together, the resultant blocks have front faces with irregular and more natural-looking surfaces. FIG. 48A shows a split retaining wall block multi-zone product 600a with base zone 602a, facing zone 604a, and boundary zone 606a. FIG. 48B shows a retaining wall block multi-zone product 650a with base zone 652a, facing zone 654a, and boundary zone 656a. FIG. 48C shows a split block multi-zone product 700a with base zone 702a, facing zone 704a, and boundary zone 706a. FIG. 48D shows a block multi-zone product 750a with base zone 752a, facing zone 754a, and boundary zone 756a.

FIG. 48E shows a double un-split retaining wall block multi-zone product 600a in the as-molded form 610a, two base zones 602a, a single, common, facing zone 604a, and two boundary zones 606a. After the as-molded form 610a is cured, it is split into two split retaining wall blocks wherein the facing zone 604a becomes the visible surface of the block upon installation. As shown, the facing zone 604a material is thick enough to allow the product's partial top, and product's partial side surfaces of the facing zone to be visible after product installation. Of course, alternative shapes may require differing thicknesses of the facing zone 604a, and such may be specified as desired.

Figure 48F:
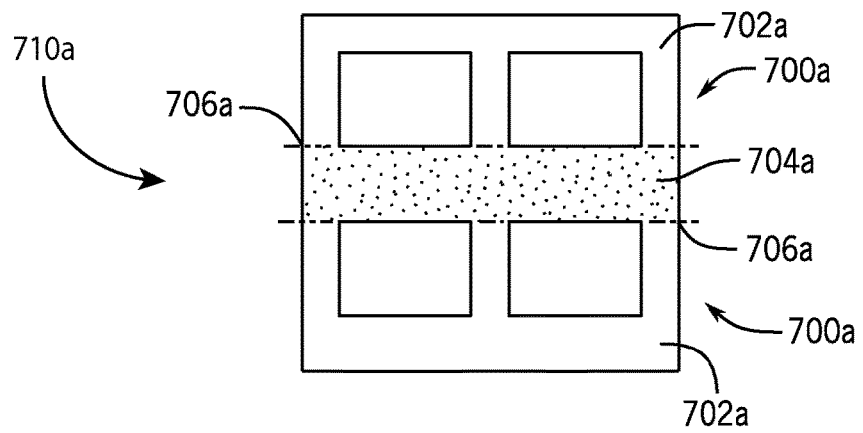

FIG. 48F shows a double un-split block multi-zone product 700a in the as-molded form, with two base zones 702a, a single, common, facing zone 704a, and two boundary zones 706a. After the as-molded form is cured, it is split into two split retaining wall blocks wherein the facing zone 704a becomes the visible surface of the block upon installation. As shown, the facing zone 704a is thick enough to provide the product's partial top and side surfaces of the facing zone to be visible after product installation. As in the previously described embodiment, alternative shapes may require differing thicknesses of the facing zone 704a, and such may be specified as desired.

Figure 49:
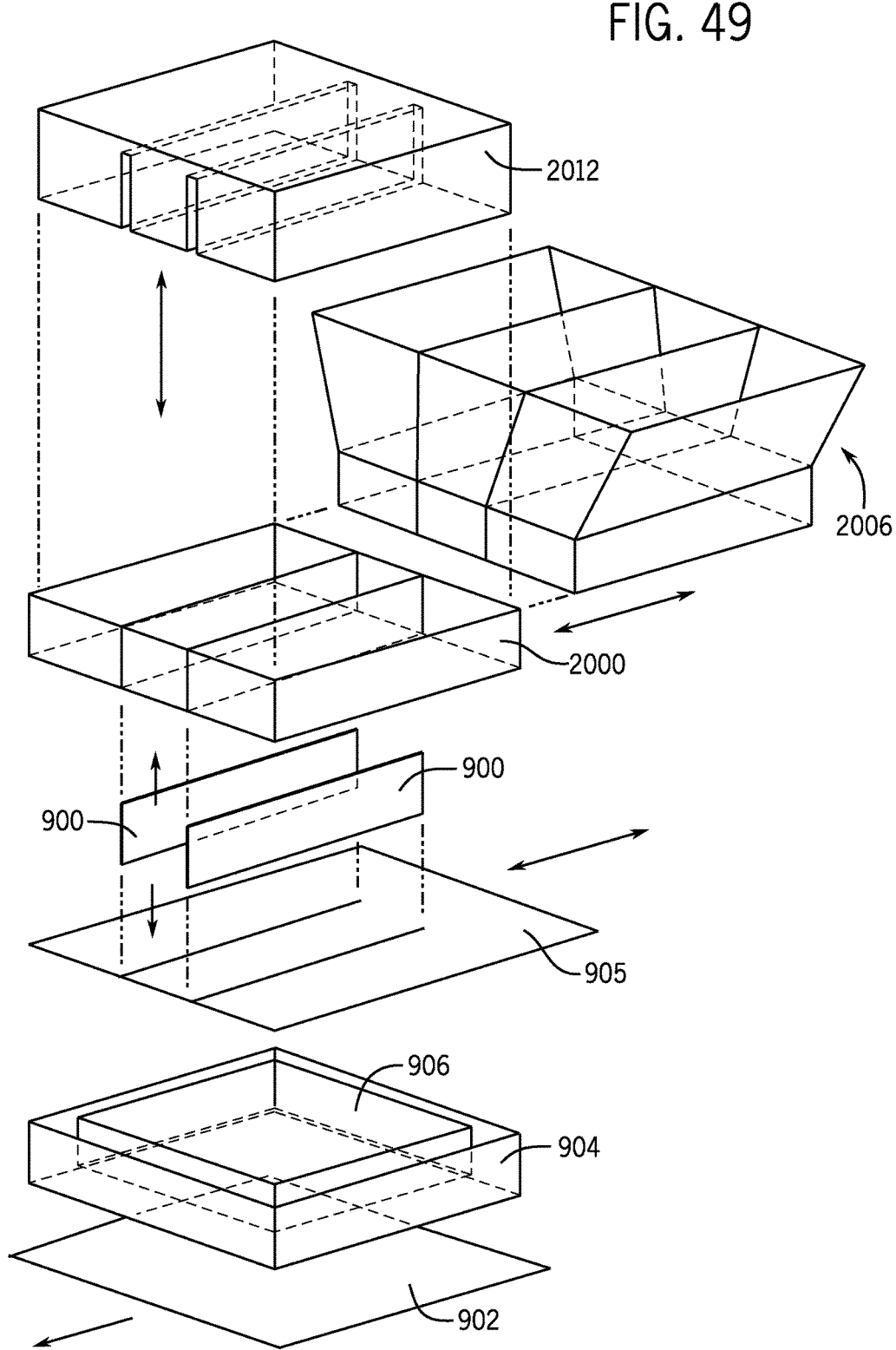
FIG. 49 is a schematic view of a retro-fit to a typical zone mold machine to enable the mold machine to produce multi-zoned cementitious products in accordance with the invention.

It may also be advantageous to retro-fit zone mold capability to an existing mold machine. However, such a retro-fit requires the use of only one hopper and only one feed carriage because existing mold machines are only configured to accept one material, and thus, only have one hopper and one feed carriage. The embodiment shown in FIGS. 49-55 is one example of a retro-fit for multi-zone molding to an existing mold machine such as the Besser V-3/12 block machine. Although the existing hopper and feed carriage are used, both are divided into sections as desired to allow multiple zones of material to enter the mold cavity. In this embodiment, two or more cementitious materials are supplied approximately simultaneously to zoned mold cavity 906 with materials entering the mold cavity via gravity, agitation, and/or vibration. FIG. 49 is a schematic showing the major components of a retro-fit mold zoning system. The mold zoning system includes a product transfer plate 902, on top of which the product is formed, and then transferred for curing. The system further includes a product mold 904, mold cavity 906, one or more feed carriage cavity seals 905, a zoned segmented feed carriage 2000 which supplies a first cementitious material and a second cementitious material from a zoned segmented hopper 2006 to the product mold 904. Levels of first cementitious material 1002 and second cementitious material 1008 within feed carriage 2000 are controlled by one or more zone segmented hopper gates 2005 (see FIG. 55). Vibration and/or a vacuum may aid in materials densification. A ram head 2012 is provided to aid in product forming by providing product forming force and to aid in green product ejection from the mold 904.

Figure 50:
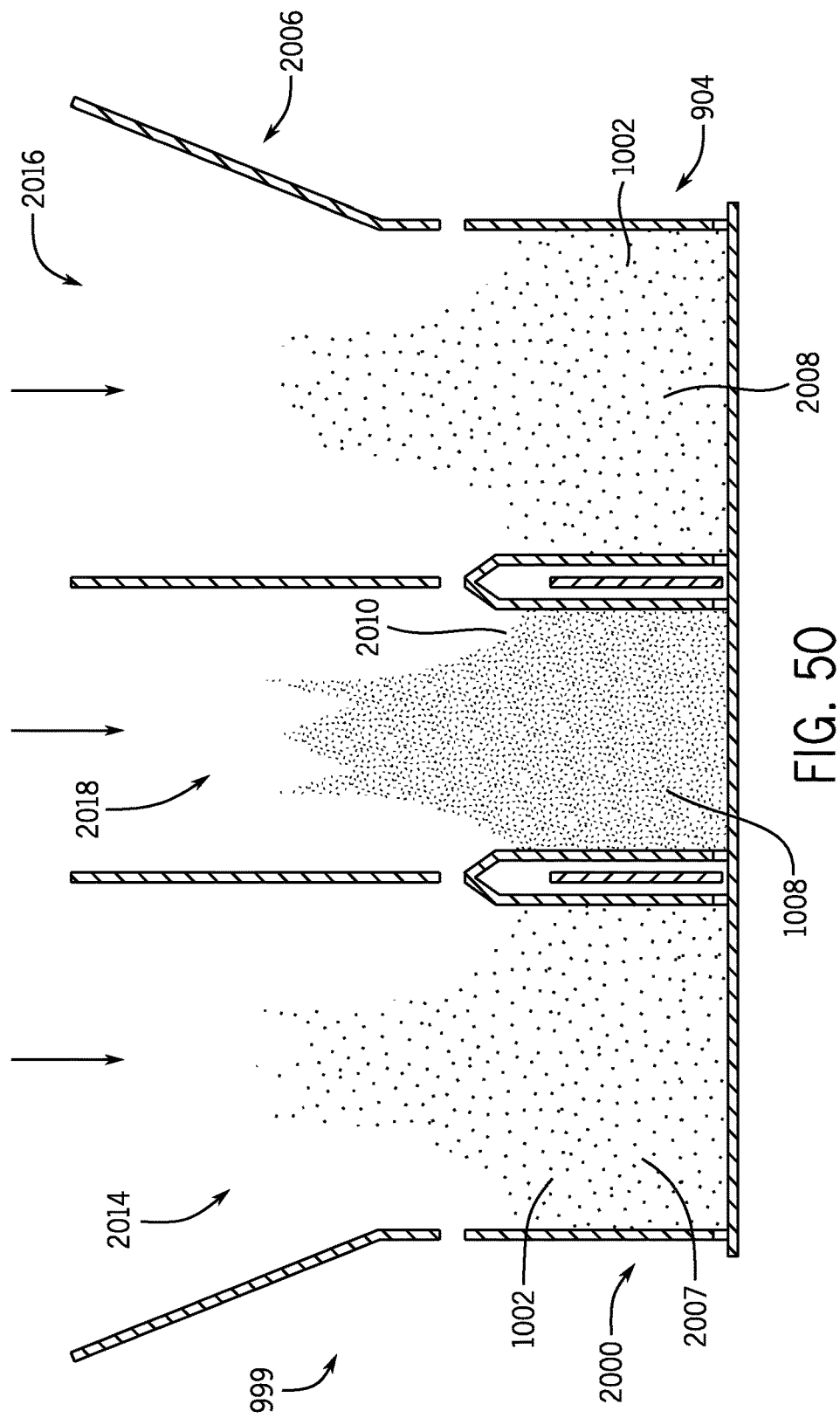
FIG. 50 is a schematic view of the retro-fitted typical mold machine of FIG. 49.

FIG. 50 is a diagrammatic sectional view of a retro-fit zone mold machine 999 in accordance with the invention and shows the cementitious materials filling feed carriage cavities. In the embodiment shown, zoning of facing material 1008 is desired in the center of the mold 904, parallel to the direction of feed carriage travel, such that the non-facing material 1002 is divided in two separate volumes. The feed carriage 2000 is divided into first, second, and third feed carriage cavities 2007, 2008, 2010 and the zoned segmented hopper 2006 is divided into first, second, and third hopper cavities 2014, 2016, 2018, respectfully. Feed carriage cavities 2007 and 2008 are filled with non-facing material 1002 from hopper cavities 2014 and 2016, via gravitational force, and/or agitation, and/or vibration within the feed carriage 2000. Feed carriage cavity 2010 is filled with facing material 1008 from the second hopper cavity 2018 via gravitational force, and/or agitation within the feed carriage, and/or vibration of the feed carriage.

Figure 51:
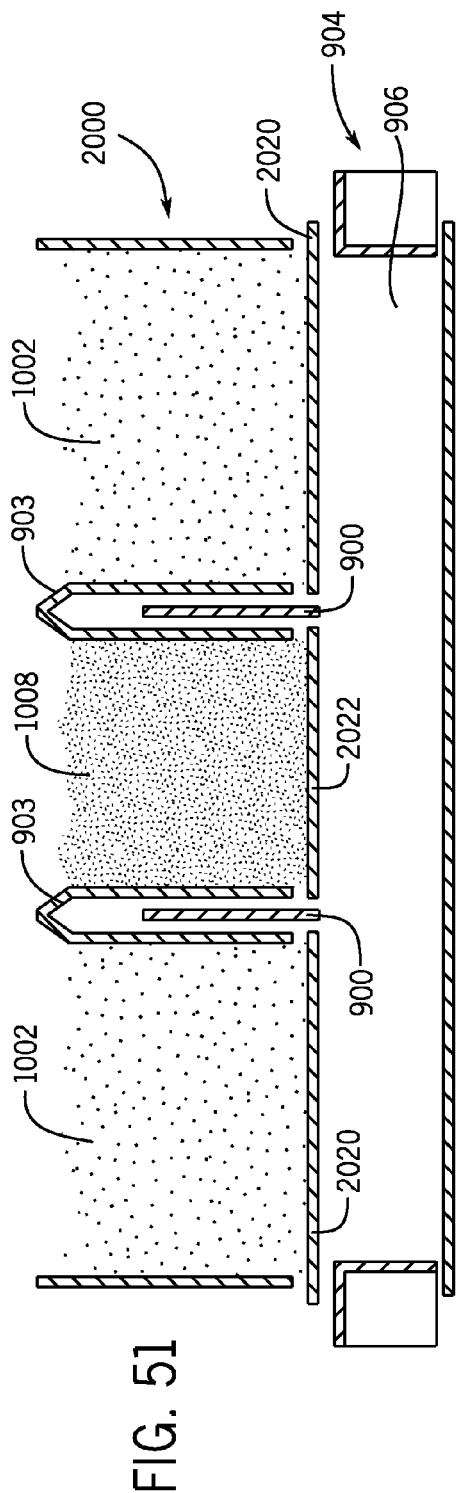
FIG. 51 is another schematic view of the retro-fitted typical mold machine of FIG. 49 showing mold zone separators in a retracted position.
Figure 52:
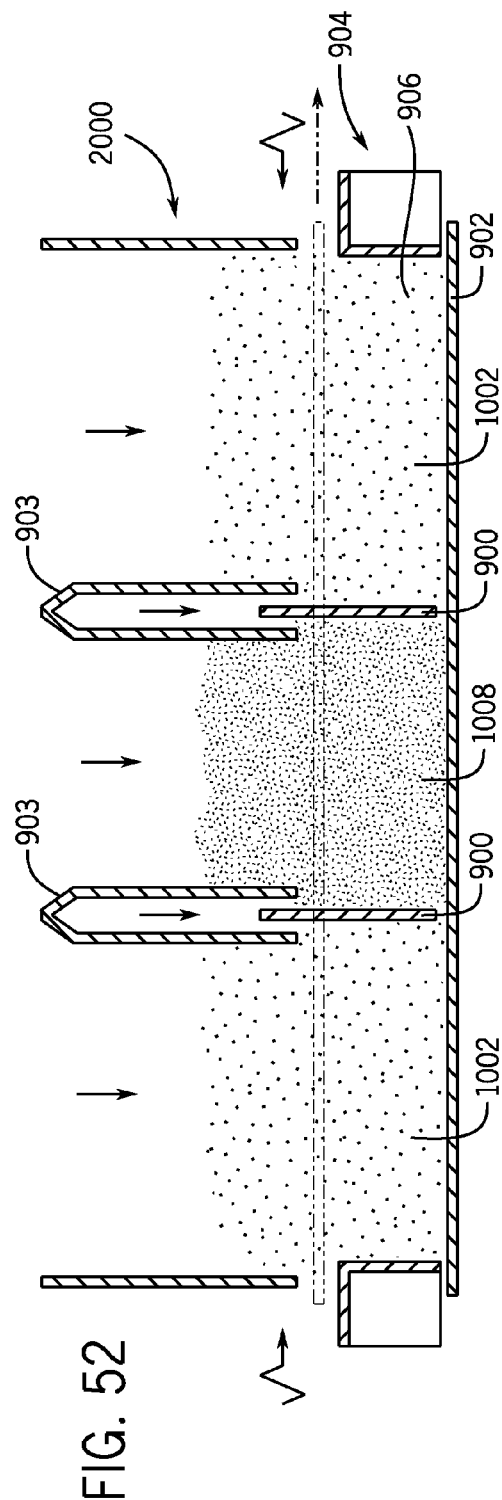
FIG. 52 is another schematic view of the retro-fitted typical mold machine of FIG. 49 showing mold zone separators in an extended position.

As shown in FIGS. 51-52, material is prevented from leaving the feed carriage 2000 by feed carriage cavity seals 2020, 2022. FIG. 51 shows the extension of feed carriage 2000 over the mold 904. One or more zone separator(s) 900 aid in creating boundary layer bonding, and extend in this embodiment from the feed carriage 2000 which is able to traverse over the mold 904. The mold zone separator(s) 900 extend and retract from one or more zone separator housing(s) 903. The zone separator housing(s) 903 maintain separation of the feed carriage cavities 2007 and 2008 when the mold zone separator(s) 900 extend into the mold cavity 906. Alternatively, the mold zone separators 900 may extend from a device or assembly that is distinct from the feed carriage 2000. When the feed carriage 2000 is in position over the mold 904, the zone separators 900 extend into the mold. In the embodiment shown, zone separators 900 may be extended or retracted by mechanical, electro-mechanical, and/or pneumatic means. Of course, any other suitable method for extending or retracting the zone separators 900 may be used without departing from the invention.

Zone separators 900 extend through feed carriage cavity seals 2020, 2022 into mold cavity 906 at or near the top of transfer plate 902. It may also be possible to achieve a zoned product by using only a zoned feed carriage 2000, and omitting the zone separators 900. In such an embodiment, material heights are approximately the same across zones, and as the feed carriage cavity seals 2020, 2022 retract, the different materials could naturally form respective zones within the mold cavity, in the areas where the different materials are deposited. Using only a zoned feed carriage 2000, but omitting the zone separators 900 would result in decreased zone boundary definition compared to using a zoned feed carriage that includes zone separators, but improved boundary layer disruption and bonding.

FIG. 53 shows the retraction of feed carriage cavity seals 2020, 2022 and the approximately simultaneous release of cementitious materials 1002, 1008 into the mold cavity 906. In general, feed carriage seals 2020, 2022 are actuated by mechanical, electro-mechanical, and/or pneumatic means, but other means may be used without departing from the invention.

As shown in FIG. 54, at or about the time both materials 1002, 1008 enter the mold 904, the zone separators 900 may retract in a controlled manner that is consistent with: the viscosity of the mixture(s), vibration frequency, amplitude, and duration, less than fully unsealed feed carriage cavity openings, agitation of materials, material supply rates to the zoned mold cavities, and material levels in the zone mold cavities. The controlled retraction of zone separators 900 enhances boundary disruption to form a boundary layer 106 and encourage bonding of materials 1002, 1008.

Placing the zone separators 900 at the bottom or near the bottom of the mold cavity 906 initially creates a defined separation of materials on the future exterior surface of the product being created. Once small amounts of materials are present, zone separators 900 can retract, if desired, to a level above the level of material in the mold cavity 906 and continue to retract as more material enters the mold cavity. This technique of rapid zone separator retraction further aids boundary disruption by having two or more materials intermix prior to being exposed to significant vibration and/or forming force and consequent material(s) densification to form boundary layer 106. In other words, the materials should preferably be in contact with each other in a low density state and then exposed to vibration and/or forming force to achieve intermixing and densification together.

In the present example, once the mold 906 is filled with materials 1002, 1008, both should be at approximately the same level with each respect to other so that vibration results in a block of desired dimensions. It should also be noted that vibration of the mold 904 can vary from no vibration if materials can enter the zone mold cavities without vibration, a small amount of vibration to aid the zone mold cavities filling process, and a large amount a vibration to enhance the zone mold cavities filling process.

Additionally, a vibration force that includes a short duration of horizontal direction aids boundary disruption by having the materials 1002, 1008 intermix prior to being exposed to significant vibration of a vertical direction or combination of vertical and horizontal directions and/or forming force and consequent material(s) densification to form a boundary layer.

Boundary layer disruption may also be improved by raking the material surface(s). Raking may be achieved by including prongs 262 as shown in FIGS. 13 and 13A, protruding from zone separator 900 into either one or all materials and in conjunction with the zone separators oscillating up and down, with a general retraction motion, can both break up any cementitious film (thus exposing aggregate) and mechanically intermix materials.

Additionally, as described in the previous embodiments, one or more zone separators may be disposed at an angle relative the direction of vibration in the retro-fit embodiment as well, which would result in angled material placement to aid disruption of the boundary layer 106.

FIG. 54 shows the approximate end of mold material(s) filing process. Here the zone separators 900 have refracted and are located approximately at or near the top of the mold 906 as densified by vibration. Here less dense materials from the feed carriage 1000 and related feed carriage cavities moves into the mold cavity 906 as materials within the mold cavity go through final densification and material filling due to vibration.

Figure 55A:
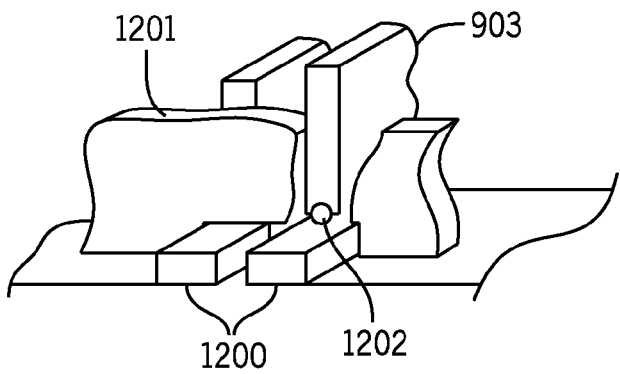
FIG. 55A is a detail schematic view of the retro-fitted typical mold machine of FIG. 49 taken generally along the line A-A in FIG. 55.
Figure 55B:
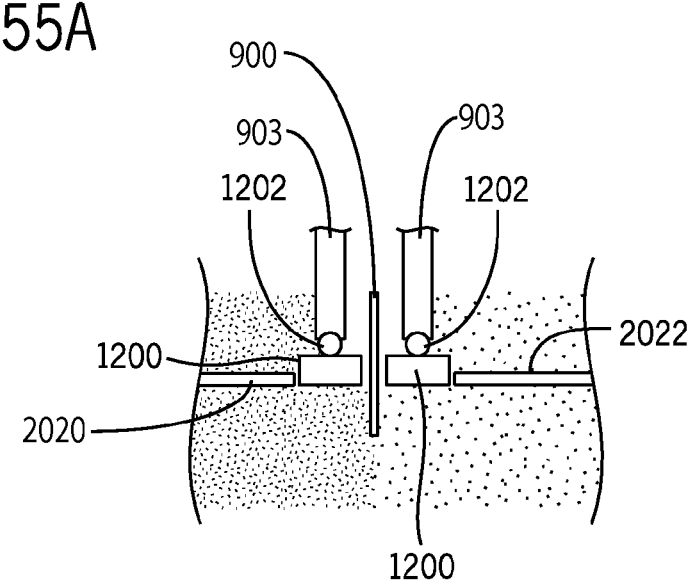
FIG. 55B is a detail schematic view of the retro-fitted typical mold machine of FIG. 49 taken generally along the line B-B in FIG. 55.
Figure 55C:
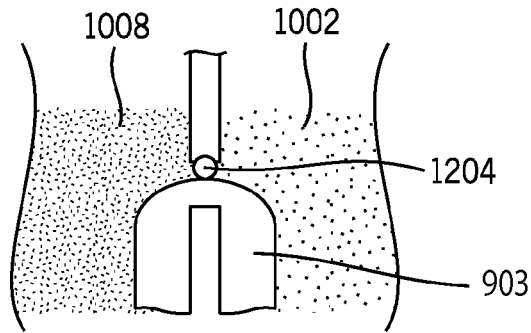
FIG. 55C is a detail schematic view of the retro-fitted typical mold machine of FIG. 49 taken generally along the line C-C in FIG. 55.

After the mold 904 has been filled with material 1002, 1008, the feed carriage 2000 returns to its position under hopper 2006. However, there is some clearance between the top of the mold 904 and the bottom of the feed carriage 2000. After filling is complete, there may be some excess material left above the top surface of the mold 904 that is scraped off the mold as the feed carriage 2000 moves into position under the hopper 2006. It is necessary, therefore, to prevent intermingling of materials 1002, 1008 at the top of the mold and with materials within each feed carriage cavity as the feed carriage 2000 retracts. FIGS. 55-56 show how mold bars 1200 may be used to prevent such undesired intermingling. In FIG. 55, a preferred embodiment having stationary mold bars 1200 that are removably attached across the mold 904 in alignment with zone separator housings 903 is shown. The mold bars bridge any gap between the top of the mold 904 and the bottom of the feed carriage 2000. As shown in FIGS. 55A and 55B, two mold bars 1200 are used to provide a channel through which the mold zone separators 900 may pass to extend from the feed carriage 2000 into the mold cavity 906. Alternatively, single mold bars 1200 having a slot through which the zone separator 900 may pass could also be used. Seals 1202 are provided between the zone separator housing 903 and the mold bars 1200. As shown, the seals 1202 may be made of horsehair, plastic, rubber, or any other suitable material. As further shown in FIG. 55A, a stripper plate 1201 may be attached to the feed carriage 2000 to strip material 1002, 1008 from the top of the mold 904. It may also be advantageous to attach mold cores (not shown) to the mold bars 1200. FIG. 55C shows a hopper seal 1204 that seals the boundaries between the hopper cavities 2014, 2016, 2018 and the zone separator housings 903. Like seals 1202, hopper seal 1204 may be made of horsehair, plastic, rubber, or any other suitable material.

Figure 56A:
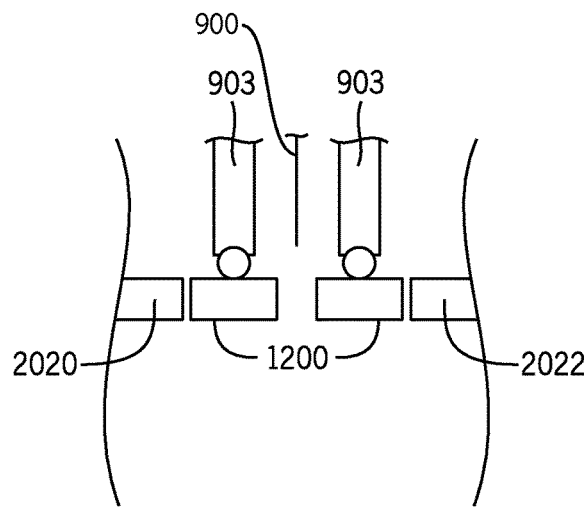
FIG. 56A is a schematic view of one embodiment of a feed carriage for a retro-fitted typical mold machine showing a feed carriage that moves relative to a plurality of mold bars.
Figure 56B:
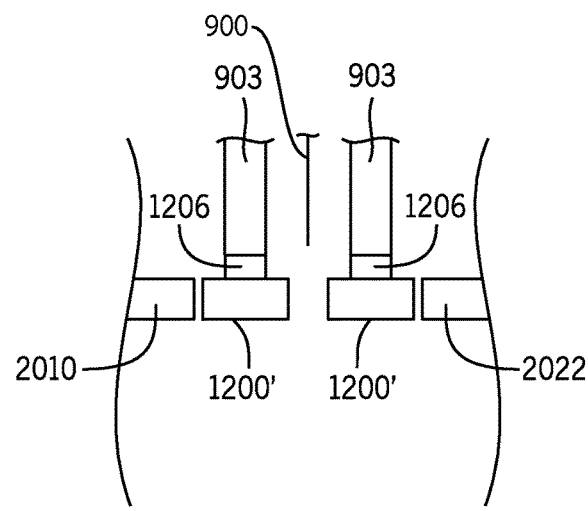
FIG. 56B is a schematic view of one embodiment of a feed carriage for a retro-fitted typical mold machine showing a feed carriage that moves with a plurality of mold bars.
Figure 56C:
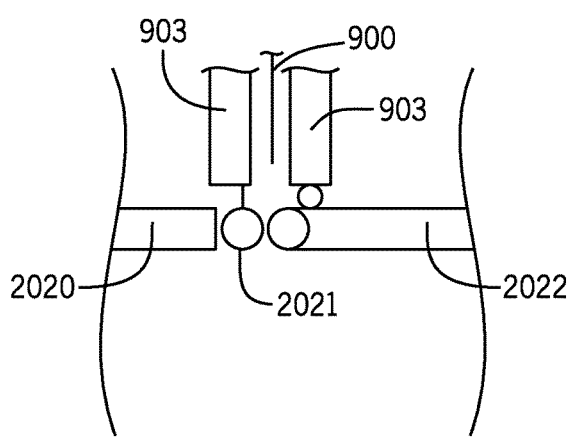
FIG. 56C is a schematic view of one embodiment of a feed carriage for a retro-fitted typical mold machine showing a feed carriage that moves relative to a plurality of mold bars.

FIGS. 56A-C show three embodiments of mold bars that may be used in accordance with the invention. FIG. 56A shows an embodiment where mold bars 1200 are fixed to the top of the mold 904 and the feed carriage 2000 moves in relation to the mold bars. FIG. 56B shows another embodiment where mold bars 1200' are attached to the feed carriage 2000. Mold bars 1200' may include flexible portions 1206 to bias the mold bars against the top of the mold 904 as the feed carriage 2000 travels over the mold. FIG. 56C shows yet another embodiment that achieves sufficient material separation without the use of mold bars. In the embodiment shown in FIG. 56C, the feed carriage cavity seals 2020, 2022 include separator seals 2021 that prevent material from intermingling as the feed carriage 2000 retracts from its position over the mold 904. One or both of the separator seals 2021 may attached to the zone separator housing so that the separator seals are biased against the top surface of the mold 904. The separator seals 2021 also allow the zone separators 900 to penetrate through the seal to extend into the mold cavity 906 prior to and during filling of the mold 904. Of course, the embodiments shown in FIGS. 56A-C are merely examples, and other configurations may be used without departing from the invention.

As previously indicated, after the materials 1002, 1008 are deposited into the mold 904, the feed carriage 2000 returns to its position under hopper 2006 and ram head 2012 lowers onto the mold to provide forming force. The forming force is typically completed in conjunction with vibration of the mold. While the forming force is being applied to the mold 904, materials 1002, 1008 are being resupplied from hopper 2006 to feed carriage 2000 so that the mold may be filled again.

As in the previously described embodiments, and as shown in FIG. 57, after the forming force has been applied, the transfer plate 902 descends relative to the mold as the ram head 2012 ejects the formed green product from the mold. Next, the ram head 2012 retracts and a new transfer plate is inserted below the bottom of the mold. Meanwhile, the just formed green product 2025 is moved to one or more curing areas.

Figure 58:
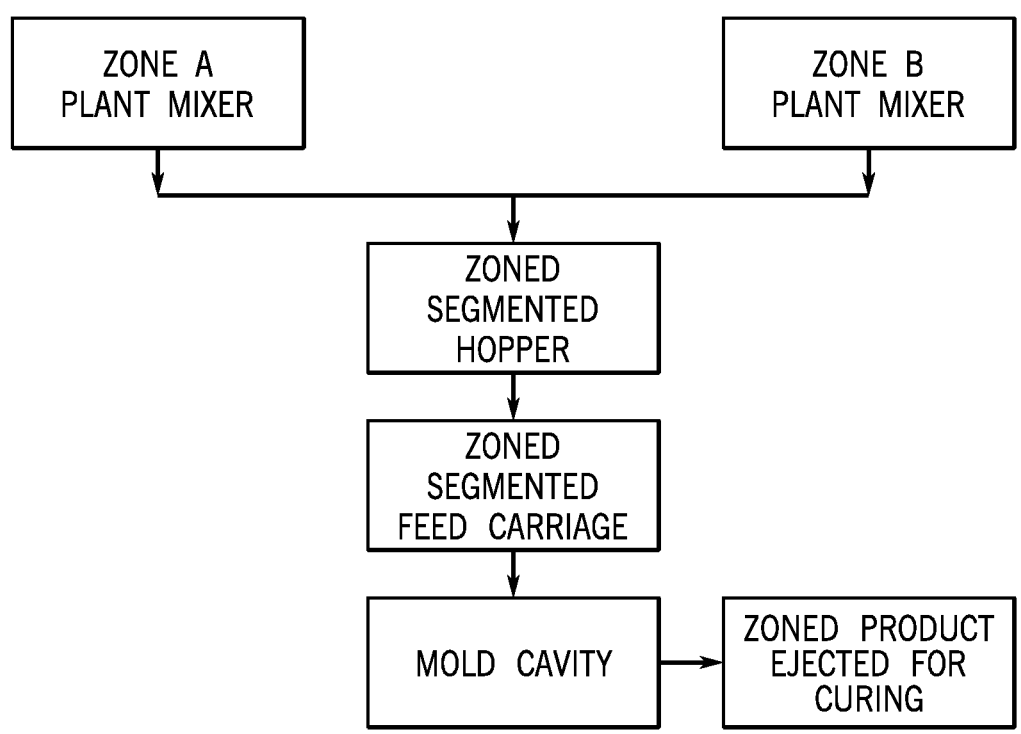
FIG. 58 is a flow chart showing the flow of material into a mold machine having a single segmented hopper and single segmented feed carriage.

FIG. 58 is a flow chart showing how a mold machine with a multi-zone hopper and feed carriage operates. Material from multiple mixers is deposited into a single hopper having multiple zones. The material then flows into a zoned feed carriage, and before flowing into the mold where it is formed and ultimately ejected for curing.

Figure 59B:
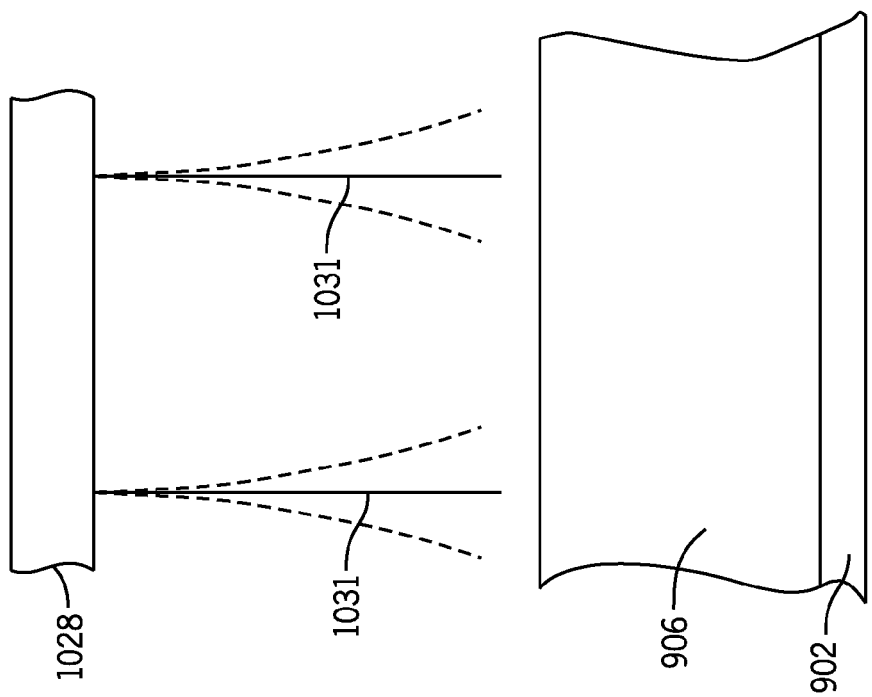
FIGS. 59A-59B are schematic views of additional embodiments of agitators in accordance with the invention.
Figure 59A:
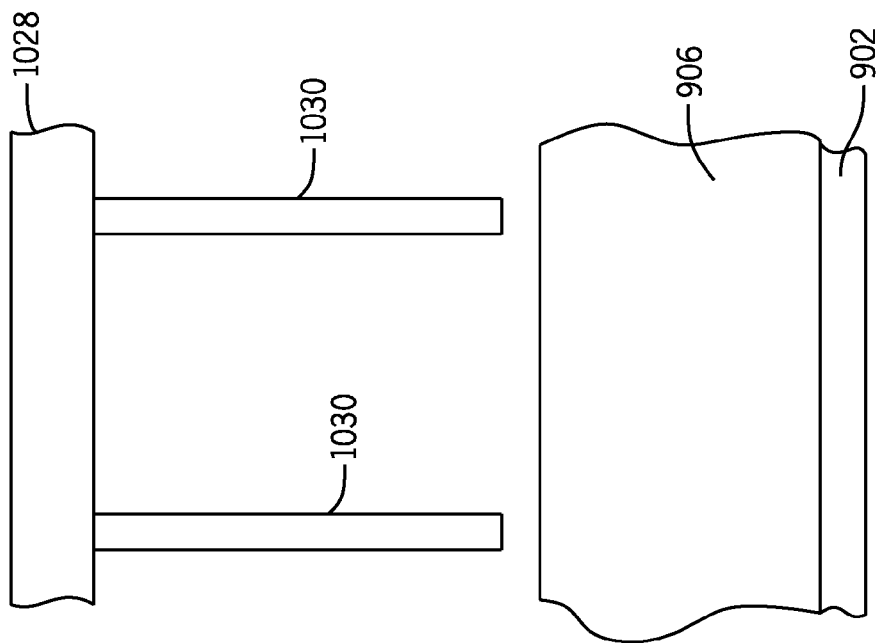

As in the previous embodiments, one or more agitators may be used to aid in the flow of more uniform density materials 1002, 1008 from the feed carriage 2000, into first, second, and third feed carriage cavities 2007, 2008, 2010, and into the mold cavity 904. FIGS. 59A and 59B show two different styles of agitators. FIG. 59A shows an agitator arm 1028 holding rigid pin agitators 1030 used to aid material filling of the facing mold cavity. As the width of facing mold cavity decreases, material filling may be inhibited. FIG. 59B shows flex blade agitators 1031 which may aid material flow into facing mold cavities by "pumping" material with each agitation motion cycle. In the embodiment shown, flex blade agitator 1031 is made of stiff yet flexible material such as thick spring steel and flexes in the opposite direction of arm motion, but any other suitable material may also be used. This flexing against the resistance of a zero to low slump cementitious material aids the displacement of material into the facing mold cavity 908. The width of the flex blade agitator 1031 may be a significant percentage of the width of the facing mold cavity 908 and thus directly displace materials from the facing material supply cavity 924 into the facing mold cavity with agitation motion. Additionally, to aid material filling of mold, agitator arm 1028 may be lowered to enable an agitator 1030, 1031 to enter the mold cavity.

Figures 60, 61:
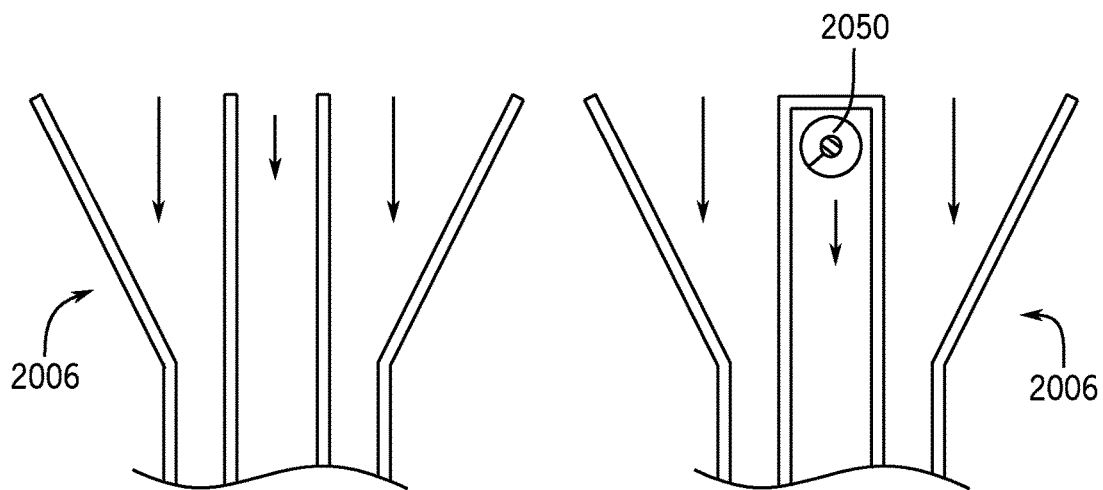
FIG. 60 is a schematic view of the inside of one embodiment of a zone segmented hopper in accordance with the invention.
FIG. 61 is a schematic view of the inside of one embodiment of a zone segmented hopper having a center zone that is fed by an auger.
Figure 62:
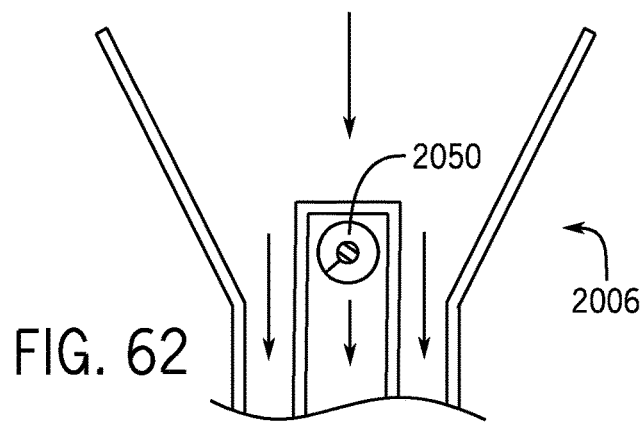
FIG. 62 is a schematic view of the inside of one embodiment of a zone segmented hopper having a center zone that is fed by an auger.
Figure 63:
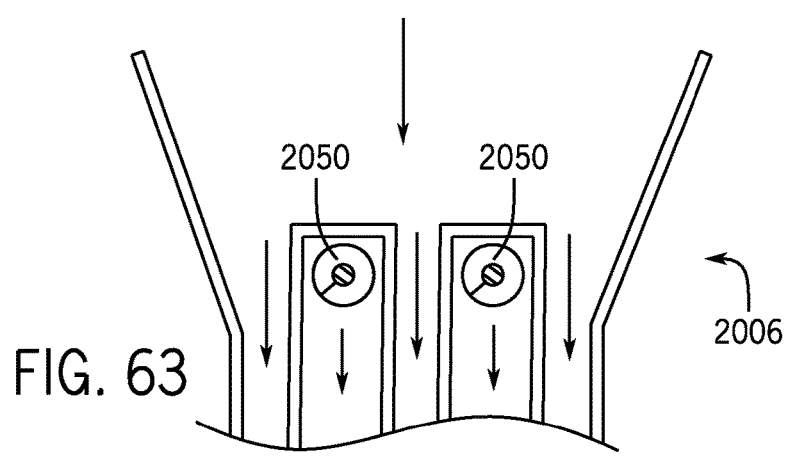
FIG. 63 is a schematic view of the inside of one embodiment of a zone segmented hopper having two internal zones that are fed by augers.

FIG. 60 shows a zone segmented hopper 2006 that fills a zone segmented feed carriage with material that flows by gravitational force, but material may also be forced into any or all of the feed carriage cavities by an auger or other suitable means. FIGS. 61-63 show examples of how an auger 2050 may be used to insert a second material into a segmented hopper. FIG. 61 shows an auger 2050 located toward the top of the hopper 2006. FIG. 62 shows auger 2050 located lower in the hopper 2006, which allows more of a first material to be held in the hopper during use. Finally, FIG. 63 shows an embodiment of a hopper 2006 that has two augers 2050 so that three separate materials may be used. Using an auger 2050, to provide material allows a more precise amount of material flow into the feed carriage 2000, which may result in more consistent products with less wasted material.

Figure 64:
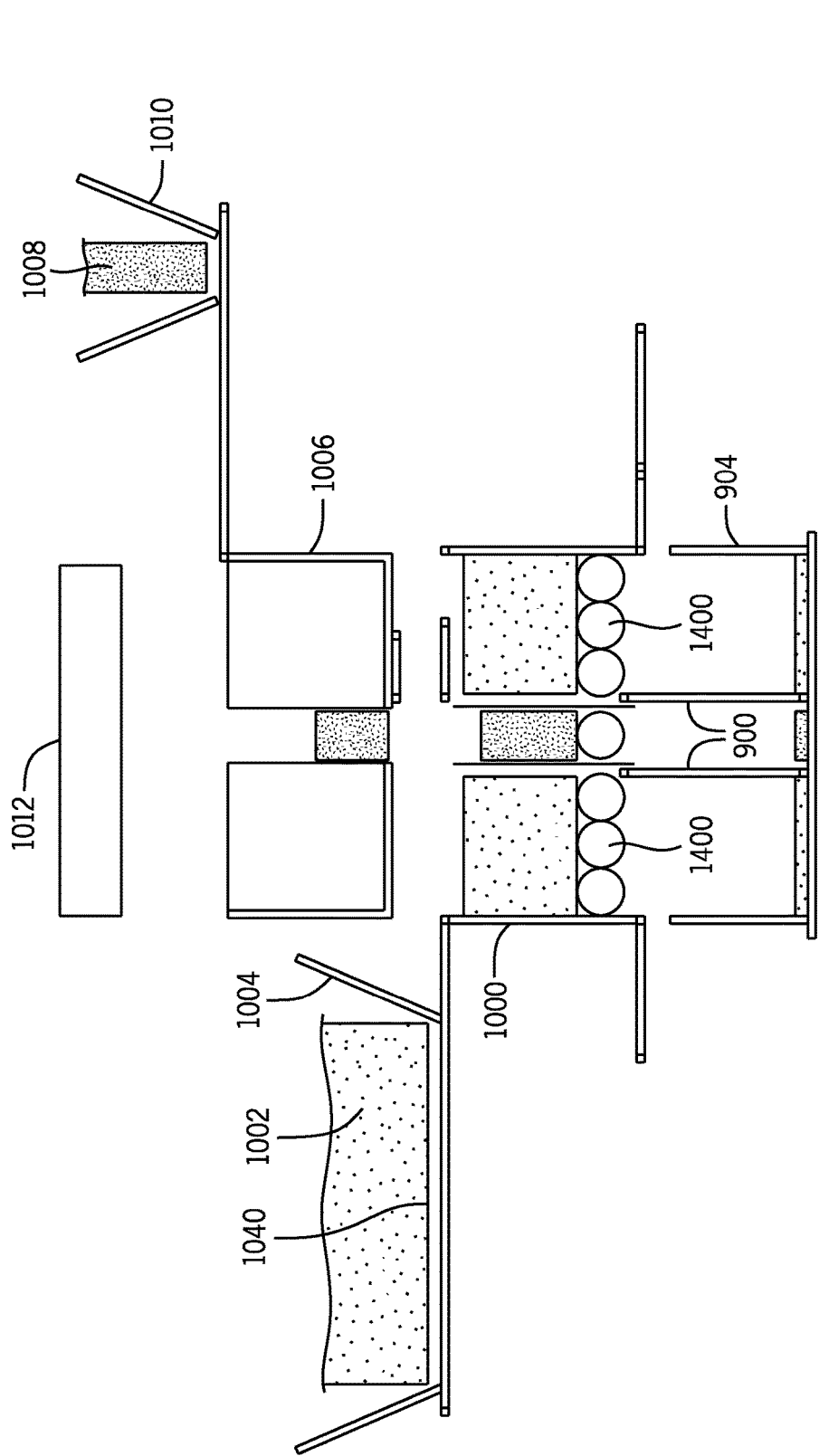
FIG. 64 is a schematic view of another embodiment of a multi-zone mold machine in accordance with the invention showing two hoppers, a first feed carriage, a second feed carriage having metering rollers, a mold, and a ram.

Turning now to FIG. 64, another embodiment of a molding process is shown. In FIG. 64, material is deposited from the feed carriages 1000, 1006 by metering rollers 1400. Metering rollers 1400 are known in the art to allow a precise amount of material to be deposited in a mold, which decreases waste and may result in a more consistent product. In the embodiment shown, the metering rollers 1400 are driven by at least one electric motor (not shown). Other means of driving metering rollers 1400 may also be used without departing from the invention. Additionally, material level sensors (not shown) may be located in one of more mold zone cavity to provide real-time feedback to feed carriage cavity seal positions to adjust feed carriage cavity openings, vibration parameters, and/or agitation parameters, and control the metering rollers 1400, and zone separator 900 positioning.

In the embodiment shown, metering rollers 1400 are deployed across the entire mold, but metering rollers may also be deployed to deposit cementitious material into only one or more zones as needed without departing from the invention. To aid filling, metering rollers 1400 may rotate in the same direction, a different direction, and/or be stationary. Additionally, baffles may aid material flow through the metering rollers 1400. Alternatively, material may be fed into the feed carriages 1000, 1006 using an auger system such as the one described in U.S. Pat. No. 3,955,907, which is incorporated herein by reference in its entirety.

Figure 65:
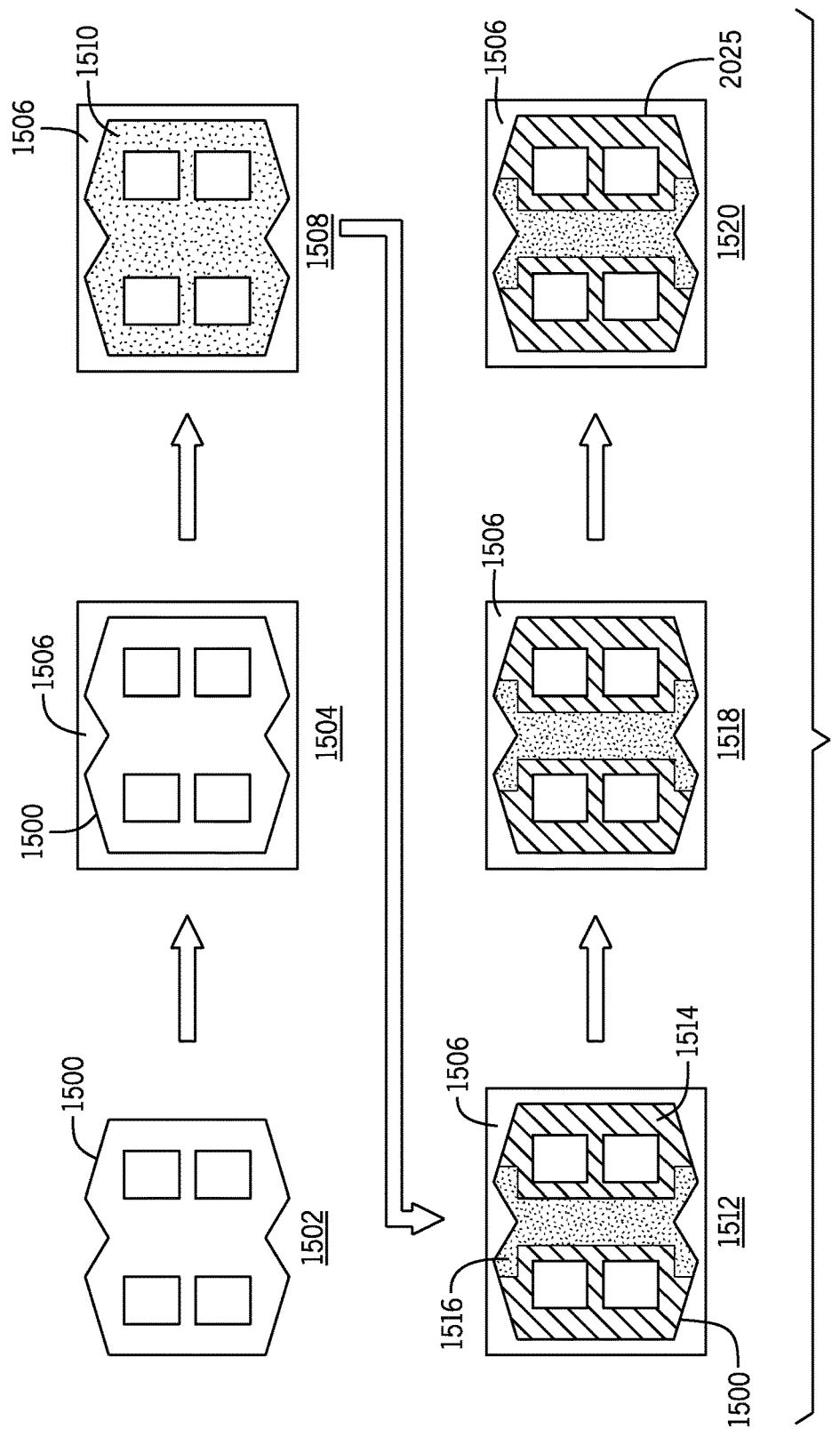
FIG. 65 is a schematic view of one embodiment of an indexed assembly line for producing multi-zone cementitious products.
Figure 66:
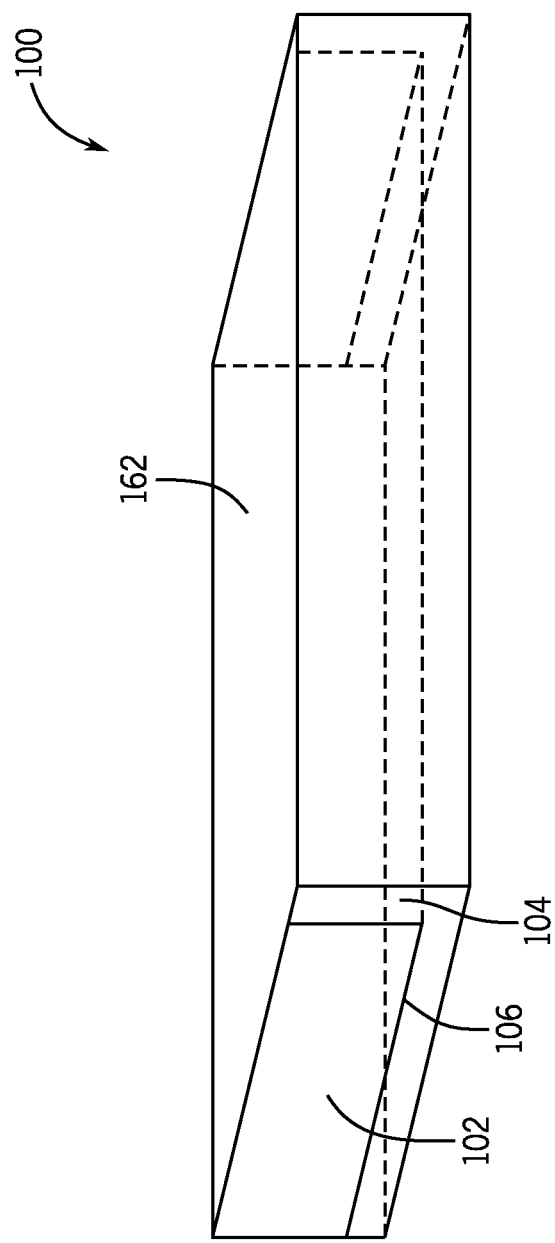
FIG. 66 is a perspective view of a multi-zone slab in accordance with the invention.
Figure 67:
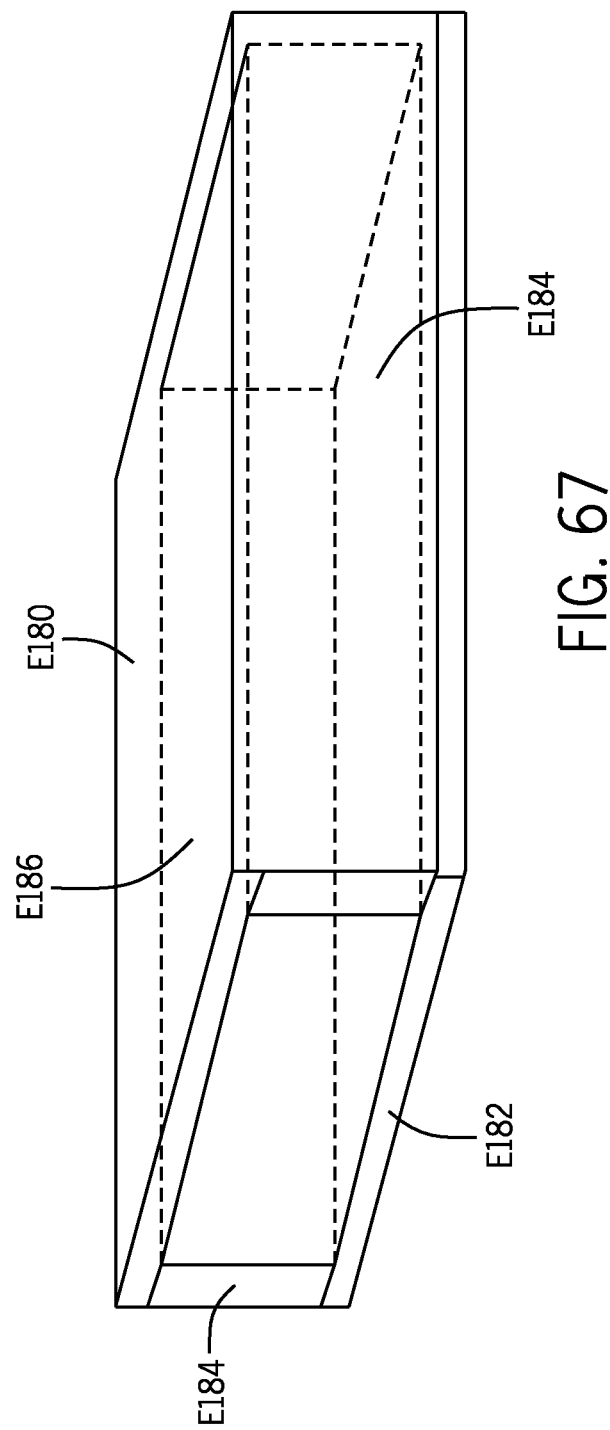
FIG. 67 is a schematic perspective view of an extrusion chamber in accordance with the invention.

It may also be advantageous to use an indexed process to create a zoned cementitious product. Such an indexed process means that a zoned cementitious product is formed by transferring or "indexing" a mold through a plurality of stations, with each station performing a particular aspect of the forming process. An indexed process may be preferred to a zone mold process wherein all steps are performed by one machine because separating the steps allows additional zones of material that would not be able to be formed using a multi-form or traditional mold machine as previously described. FIG. 65 shows a material process flow for a zone mold machine that indexes through a plurality of operation stations. Here one or more molds index from operation station to operation station to complete a final product. As shown, the operation stations are shown in a schematic view, but the stations may be oriented in a rotary or linear fashion, or any suitable orientation without departing from the invention.

One example shown in FIG. 65 is a way to mold a product such as illustrated in FIG. 8D using an indexed process, which is a retaining wall block having facing material on the top, front, and partial sides of the product. As described above, a common type of mold is used that produces a product capable of being split into two retaining wall blocks. By splitting two blocks molded together, the resultant blocks have front faces with irregular and more natural-looking surfaces.

The indexed molding operation starts with an empty mold 1500 at a first operation station 1502. Second index operation station 1504 shows a transfer plate 1506 covering the bottom of the mold 1500. Third index operation station 1508 shows a bottom facing layer 1510 being placed into the bottom of the mold. The facing layer 1510 on the bottom of the mold is actually the top face of the finished retaining wall block. Using a typical mold machine, the material for bottom facing layer 1510 is supplied by a feed carriage and hopper (not shown). A small level of vibration may be used to distribute the bottom facing layer 1510 approximately evenly on the mold bottom. Fourth index operation station 1512 shows the mold 1500 being filled with base material 1514 and facing material 1516. In the present embodiment, fourth index operation 1512 is performed by a zone mold machine like the one described previously. Alternatively, fourth index operation 1512 may be broken into two operations, each of which would provide the base material 1514 and facing material 1516, respectively. Although not shown in this schematic, the mold 1500 may also contain a mold apron.

Each index operation may include a vibration and/or densification process as determined by the desired attributes of the finished product. The facing layer may be supplied by a feed carriage having a single zone and filled by a zone segmented hopper. Alternatively, the layers in the mold 1500 may be supplied by one of more zoned feed carriages and a separate base material hopper and facing material hopper (not shown). Also, the mold cavity could be filled with material from a multi-formed or extruded slab rather than from a hopper/feed carriage.

One or more zone separators may be used to achieve the desired facing zone dimensions and zone mold separators may be placed just below, at, or near the top of the bottom facing layer 1510 to provide an aesthetic continuity of facing material.

Using an indexed system also allows multiple machines to be used to produce a product. Using multiple machines allows a set-up wherein feed carriages may traverse over the mold in any direction to prevent smearing of base and facing material as the feed carriages withdraw from over the mold.

At fifth index operation station 1518, compression force is applied to the product with or without additional vibration to densify the material in the mold. Finally, at sixth index operation station 1520, the product is ejected from the mold. After being ejected from the mold, the green block 2025 may merge with the remaining process operations of an existing or new cementitious plant by being transported on transfer plate 1506 to any location.

In an alternative embodiment, the mold may have a permanent bottom instead of a bottom created by the addition of a transfer plate. A mold with a permanent bottom likely has an ejection plate to raise the formed product out of the mold that is placed in the mold cavity prior to filling may also be utilized to transfer the product once the product is ultimately ejected from the mold.

Additional index operation stations may be added to achieve differing product facing surfaces using zoning, such as adding facing material on the top of a near full mold cavity or achieving unusual shapes or positioning of facing material.

As described earlier, the multi-zone cementitious product 100 may be formed by any suitable means, including but not limited to multi-forming, molding, or extrusion. Extrusion of a slab 162 may enhance production efficiency by allowing slabs 162 to be made on a multi-forming machine 150 without core mandrels 170. Then, in a secondary process, the slab 162 is extruded through a die to create core holes 410 in the slab.

Figure 68:
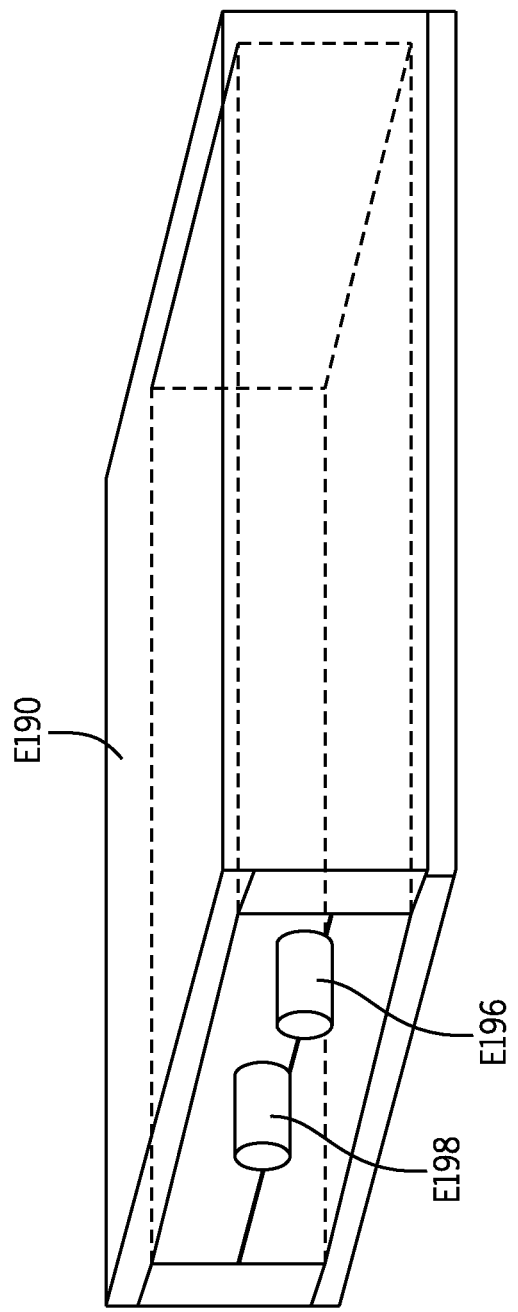
FIG. 68 is another schematic perspective view of the extrusion chamber shown in FIG. 67.
Figure 69:
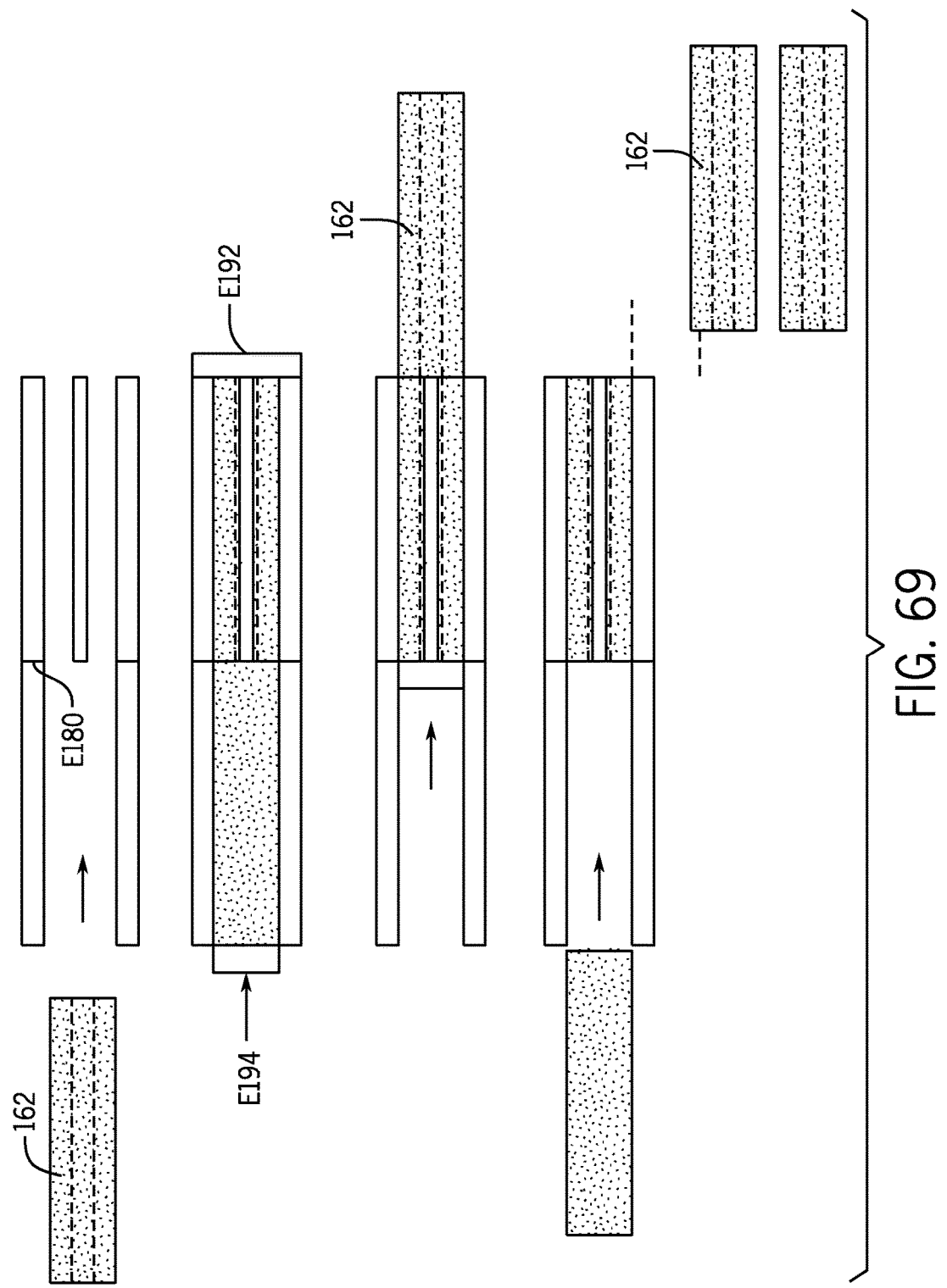
FIG. 69 is a side schematic view of an extrusion chamber shown in FIG. 67 showing the process for extruding a slab through the extrusion chamber.

In the system shown in FIGS. 68-69, a slab 162 without cored holes pass through an extrusion chamber E180, which encases slab 162 and achieves final densification via vibration, vacuum, and/or forming force. Chamber base E182 is stationary and chamber side walls E184 and chamber top E186 are moveable to allow for slab 162 insertion. Once inserted, chamber side walls E184 and chamber top E186 are then set for green product length and width dimensions. Note that in another embodiment of the extrusion chamber the settings for green product length and width dimensions are completed prior to slab 162 insertion.

One end of the extrusion chamber E180 communicates with an extrusion die E190 which in turn receives an end cap E192 and the other end of the extrusion chamber receives a ram E194 to supply final forming force. Chamber side walls E184 may also adjust for smaller or larger product lengths and one or more spacer may be added on the chamber base E182 or chamber top E186 for smaller and larger product widths. Any transfer plate would be removed either before or after slab insertion to the extrusion chamber. The extrusion die E190 would be sized for each product type and the inside height and width of the die would match the inside height and width of the extrusion chamber, potentially with spacers.

In the embodiment shown, the extrusion die E190 has extrusion mandrels E196 held in place by mandrel extrusion support bar E198. Of course, the extrusion die E190 may be any shape or profile depending on the application without departing from the invention.

FIG. 69 shows one example of the operation of an extrusion chamber E180 in accordance with the invention, which includes the following steps: (1) The slab 162 is inserted onto the chamber base E182, (2) the chamber side walls E184, and chamber top E186 are adjusted for desired green dimensions, (3) the chamber end cap E192 is placed over one end of the extrusion die, and a ram E194 is placed within the other side of the extrusion chamber, (4) a combination of forming vibration, vacuum, and/or forcing force complete product slab densification, (5) the end cap is withdrawn and the product slab is forced through the die to obtain core holes, (6) the ram is withdrawn, (7) the slab 162, now having the shape of the extrusion die, is ejected, potentially on to a transfer plate, and accumulated for cutting. Of course, the dimension of the extrusion chamber E180 may also be fixed without departing from the invention.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A machine for molding a multi-zone cementitious product comprising:
    a hopper having a plurality of hopper sections, each section capable of containing cementitious material;
    a mold having at least one mold cavity;
    a feed carriage having a plurality of feed carriage cavities, at least some of the carriage cavities corresponding to at least some of the hopper sections, the teed carriage being capable of being selectively aligned with the hopper and the mold; and the feed carriage further including at least one mold zone separator to guide material from the feed carriage to particular locations within the mold cavity as material is transferred from the feed carriage into the mold cavity;

wherein the at least one mold zone separator is capable of being extended into the mold cavity, and the at least one mold zone separator is capable of being retracted back into the feed carriage once filling of the mold cavity is complete.

2. The mold machine of claim 1, wherein the machine further includes least one compression ram for densifying material within the mold cavity.

3. The mold machine of claim 1, wherein the machine further includes at least one vibrator for densifying material within the mold cavity.

4. The mold machine of claim 1, wherein the mold is open on the top and bottom and rests on a transfer plate that provides a bottom surface of the mold, for use in transferring an uncured multi-zone cementitious product to a remote location for curing.

5. The mold machine of claim 1, wherein at least one agitator aids the flow of materials from the feed carriage into the mold cavity.

6. The mold machine of claim 1, wherein the mold zone separator is a solid plate.

7. The mold machine of claim 1, wherein the mold zone separator includes at least one opening to encourage intermingling of material on either side of the mold zone separator.

8. The mold machine of claim 1, wherein the mold zone separator includes a support base and a plurality of rods spaced along the support base.

9. The mold machine of claim 1, wherein material flows from the hopper to the feed carriage by gravity.

10. The mold machine of claim 1, wherein material is forced from the hopper to the feed carriage by at least one auger.

11. The mold machine of claim 1, wherein the mold zone separator extends and retracts by mechanical means.

12. The mold machine of claim 1, wherein the mold zone separator extends and retracts by hydraulic means.

* * * * *